(12) United States Patent
Yamada et al.

(10) Patent No.: US 12,422,652 B2
(45) Date of Patent: Sep. 23, 2025

(54) ZOOM LENS AND IMAGE PICKUP APPARATUS

(71) Applicant: CANON KABUSHIKI KAISHA, Tokyo (JP)

(72) Inventors: Tomoya Yamada, Tochigi (JP); Yonghee Lee, Tochigi (JP); Yu Inomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 420 days.

(21) Appl. No.: 18/189,265

(22) Filed: Mar. 24, 2023

(65) Prior Publication Data

US 2023/0350168 A1    Nov. 2, 2023

(30) Foreign Application Priority Data

May 2, 2022    (JP) .................................. 2022-076139

(51) Int. Cl.
*G02B 13/00* (2006.01)
*G02B 13/02* (2006.01)
*G02B 15/14* (2006.01)

(52) U.S. Cl.
CPC ....... *G02B 13/009* (2013.01); *G02B 13/0045* (2013.01); *G02B 13/02* (2013.01); *G02B 15/145125* (2019.08)

(58) Field of Classification Search
None
See application file for complete search history.

(56) References Cited

U.S. PATENT DOCUMENTS

| | | | |
|---|---|---|---|
| 5,526,187 A * | 6/1996 | Lee | G02B 15/1421 359/689 |
| 7,706,081 B2 * | 4/2010 | Chang | G02B 13/006 359/683 |
| 8,111,467 B2 * | 2/2012 | Iwasawa | G02B 13/009 359/716 |
| 8,130,451 B2 * | 3/2012 | Saito | G02B 15/145121 359/683 |
| 9,261,681 B2 * | 2/2016 | Kuwashiro | G02B 15/177 |
| 9,264,638 B2 | 2/2016 | Nakamura et al. | |
| 9,268,120 B2 | 2/2016 | Shimomura et al. | |
| 9,291,800 B2 | 3/2016 | Inomoto et al. | |

(Continued)

FOREIGN PATENT DOCUMENTS

JP    2017-203912 A    11/2017

*Primary Examiner* — Ryan Crockett
(74) *Attorney, Agent, or Firm* — Carter, DeLuca & Farrell LLP

(57) ABSTRACT

A zoom lens includes, in order from object side, a positive first lens unit not moving for zooming, three or more intermediate lens units moving for zooming and a positive rear lens unit, in which each interval between adjacent lens units changes during zooming, an aperture stop is arranged in the rear lens unit, in a lens unit adjacent to the rear lens unit, or between the lens unit adjacent to the rear lens unit and the rear lens unit, the first lens unit includes, in order from the object side, negative subunit not moving for focusing, positive subunit moving for focusing, and positive subunit, a focal length of the first lens unit, a length on optical axis from most image-side surface to a rear principal point of the first lens unit, focal lengths of the zoom lens at wide angle end and at telephoto end are appropriately set.

19 Claims, 26 Drawing Sheets

(56) References Cited

U.S. PATENT DOCUMENTS

| | | | |
|---|---|---|---|
| 9,310,592 | B2 | 4/2016 | Wakazono et al. |
| 9,715,092 | B2 | 7/2017 | Inomoto |
| 9,897,803 | B2 | 2/2018 | Sanjo et al. |
| 9,958,654 | B2 * | 5/2018 | Abe .................... G02B 27/646 |
| 10,338,359 | B2 | 7/2019 | Kuwashiro et al. |
| 10,551,599 | B2 | 2/2020 | Yamada et al. |
| 10,678,031 | B2 | 6/2020 | Inomoto |
| 11,061,212 | B2 | 7/2021 | Yamada et al. |
| 11,294,156 | B2 | 4/2022 | Inomoto |
| 11,307,400 | B2 | 4/2022 | Takemoto et al. |
| 2016/0124199 | A1 | 5/2016 | Sanjo et al. |
| 2017/0108677 | A1 * | 4/2017 | Shimomura ........... G02B 15/20 |
| 2021/0141197 | A1 | 5/2021 | Lee |
| 2021/0405336 | A1 * | 12/2021 | Yamada ......... G02B 15/145125 |
| 2023/0350173 | A1 | 11/2023 | Lee |
| 2025/0123472 | A1 * | 4/2025 | Shinzato ........ G02B 15/144515 |

* cited by examiner

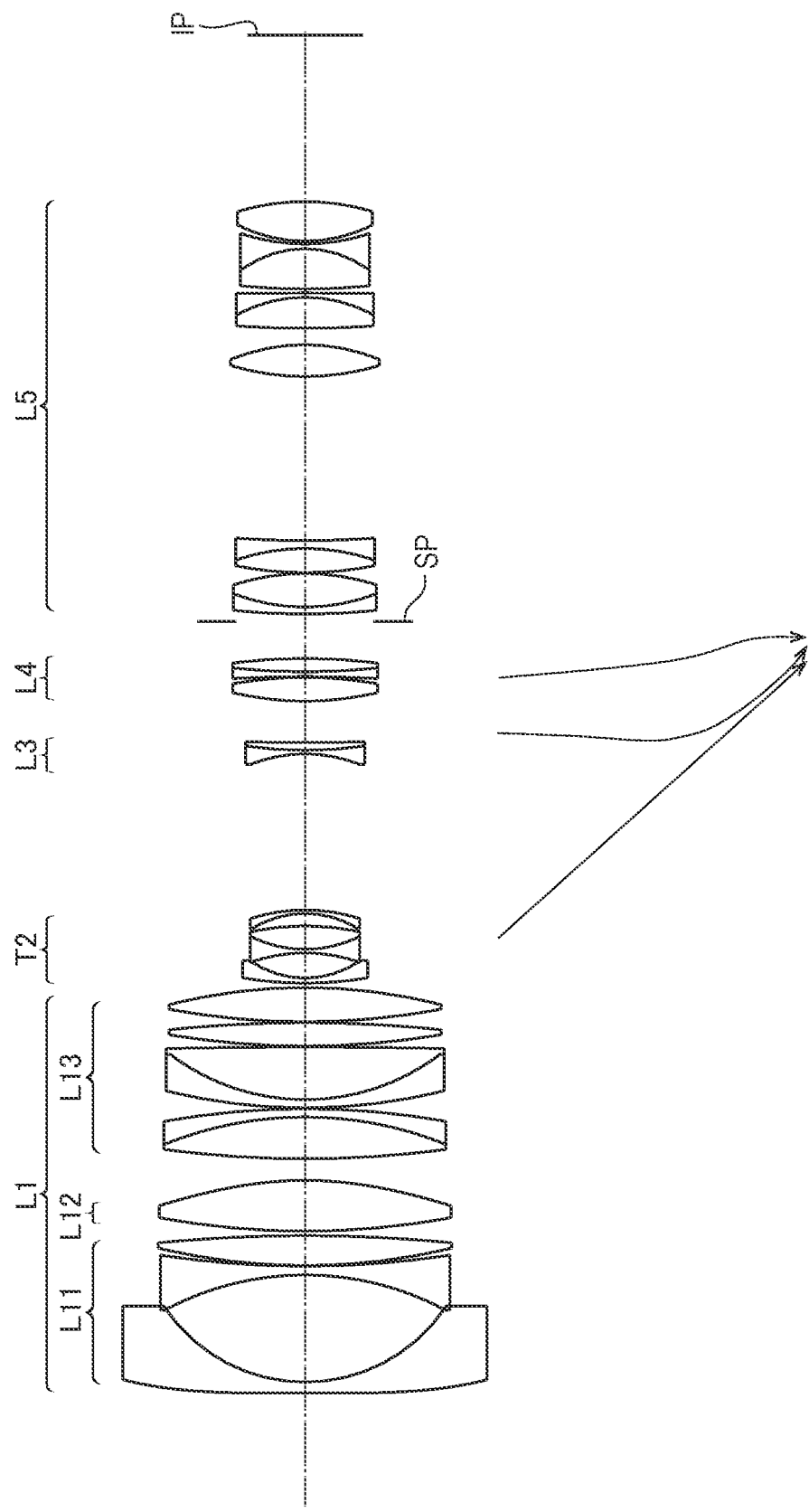

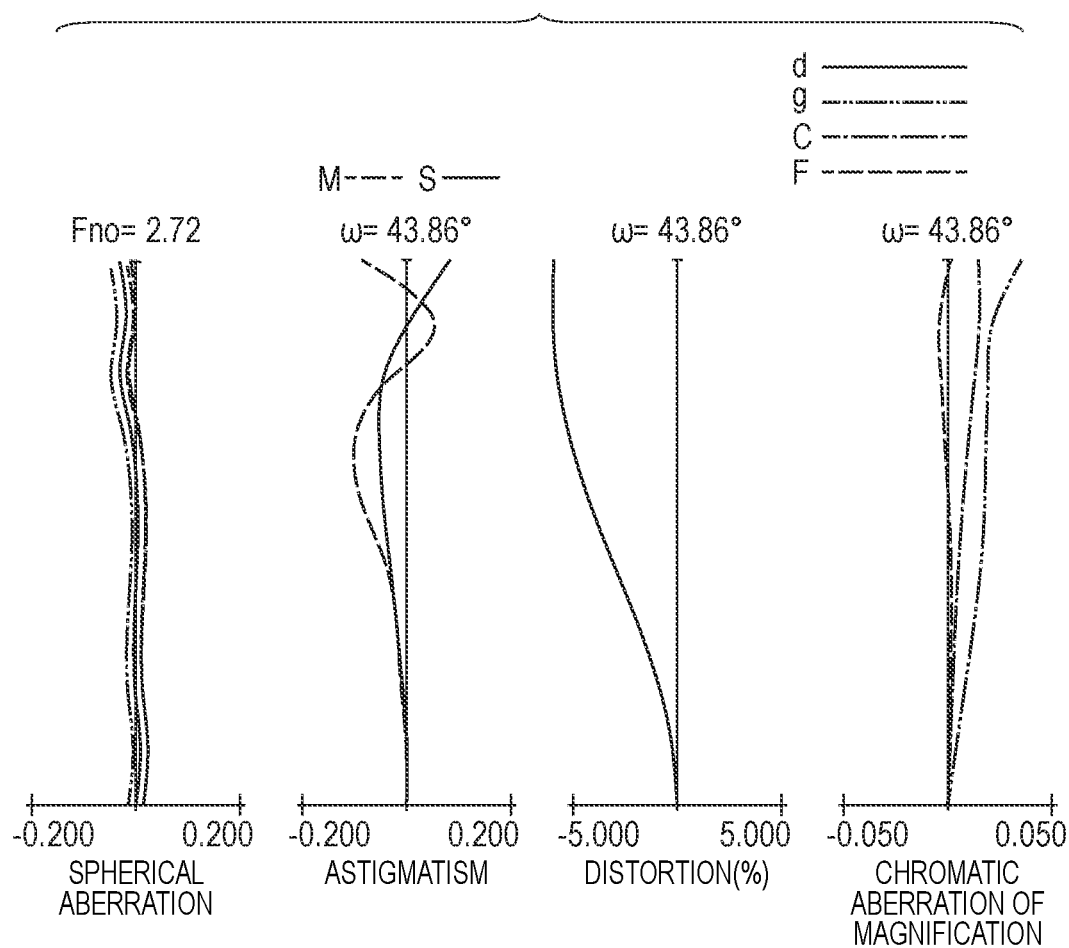

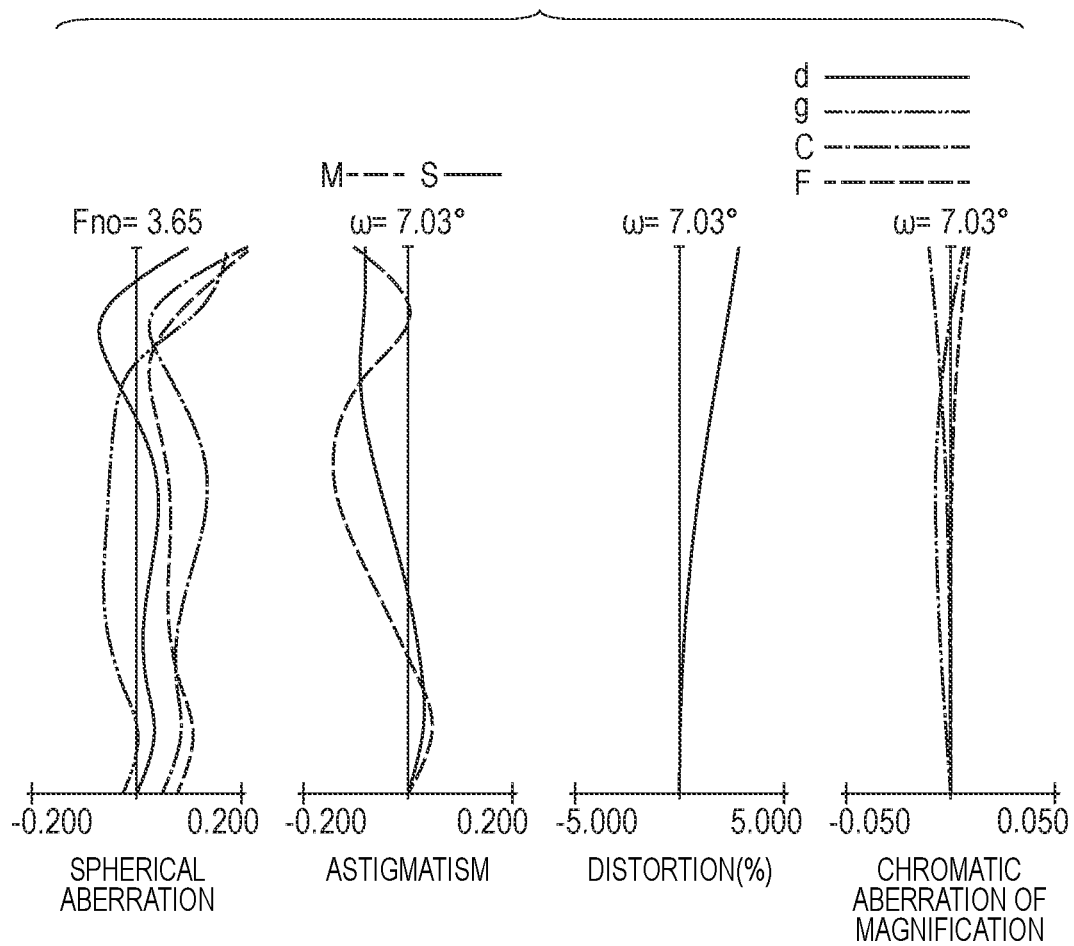

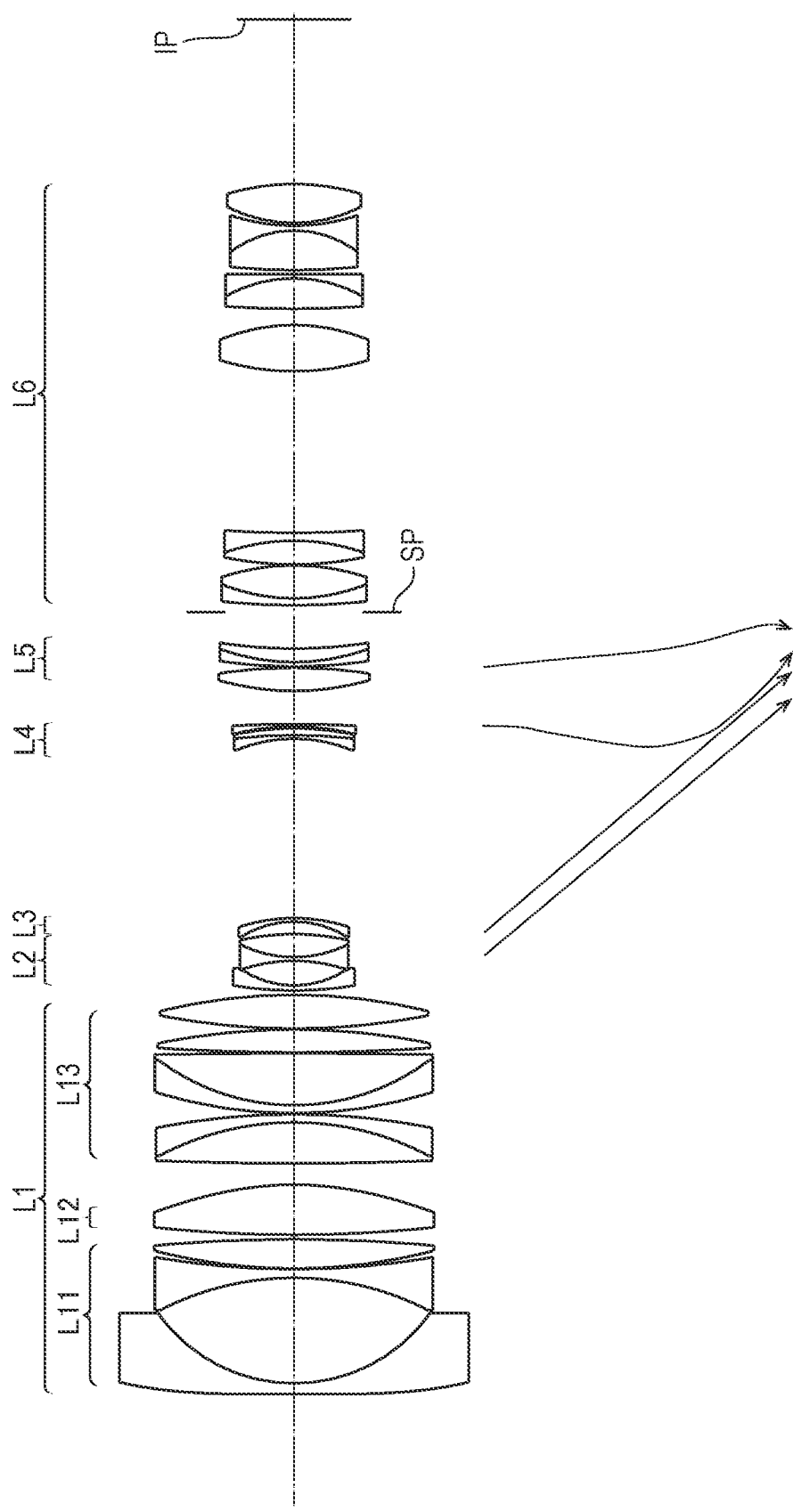

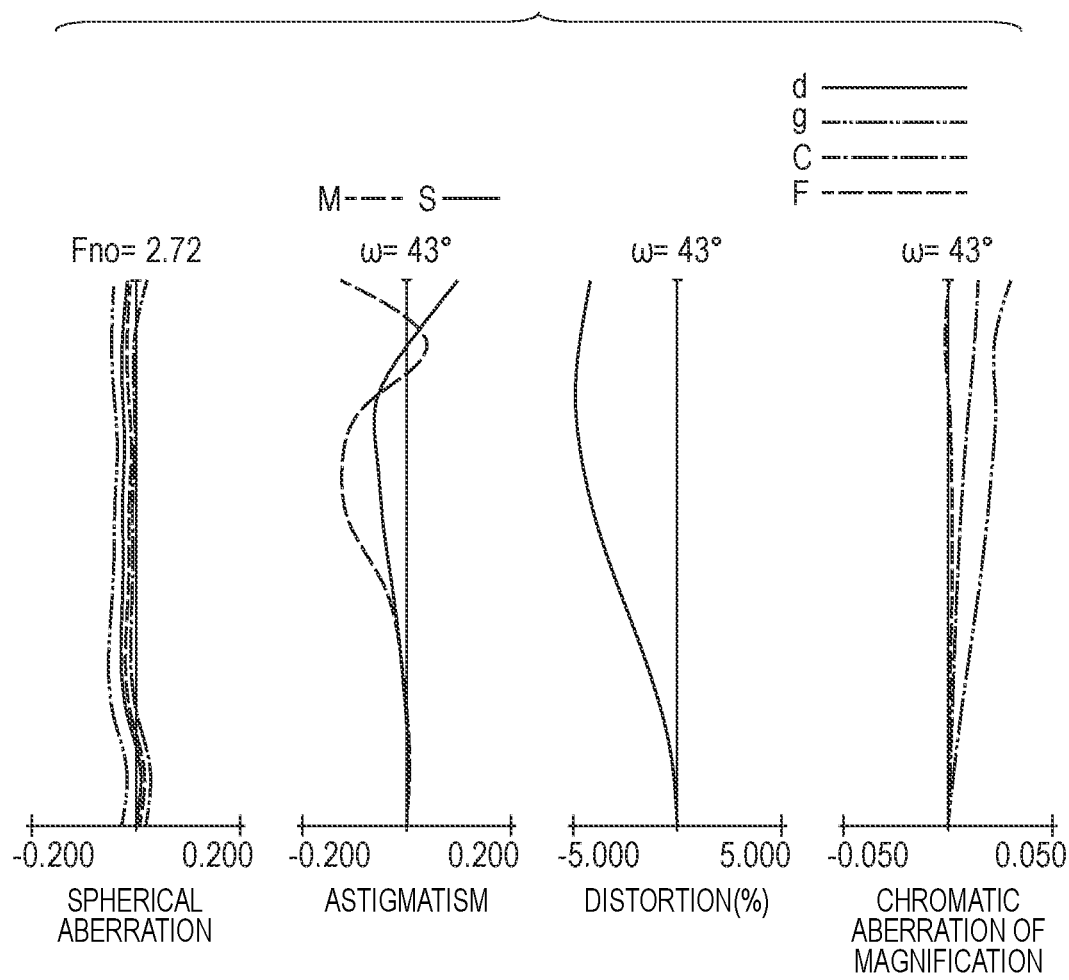

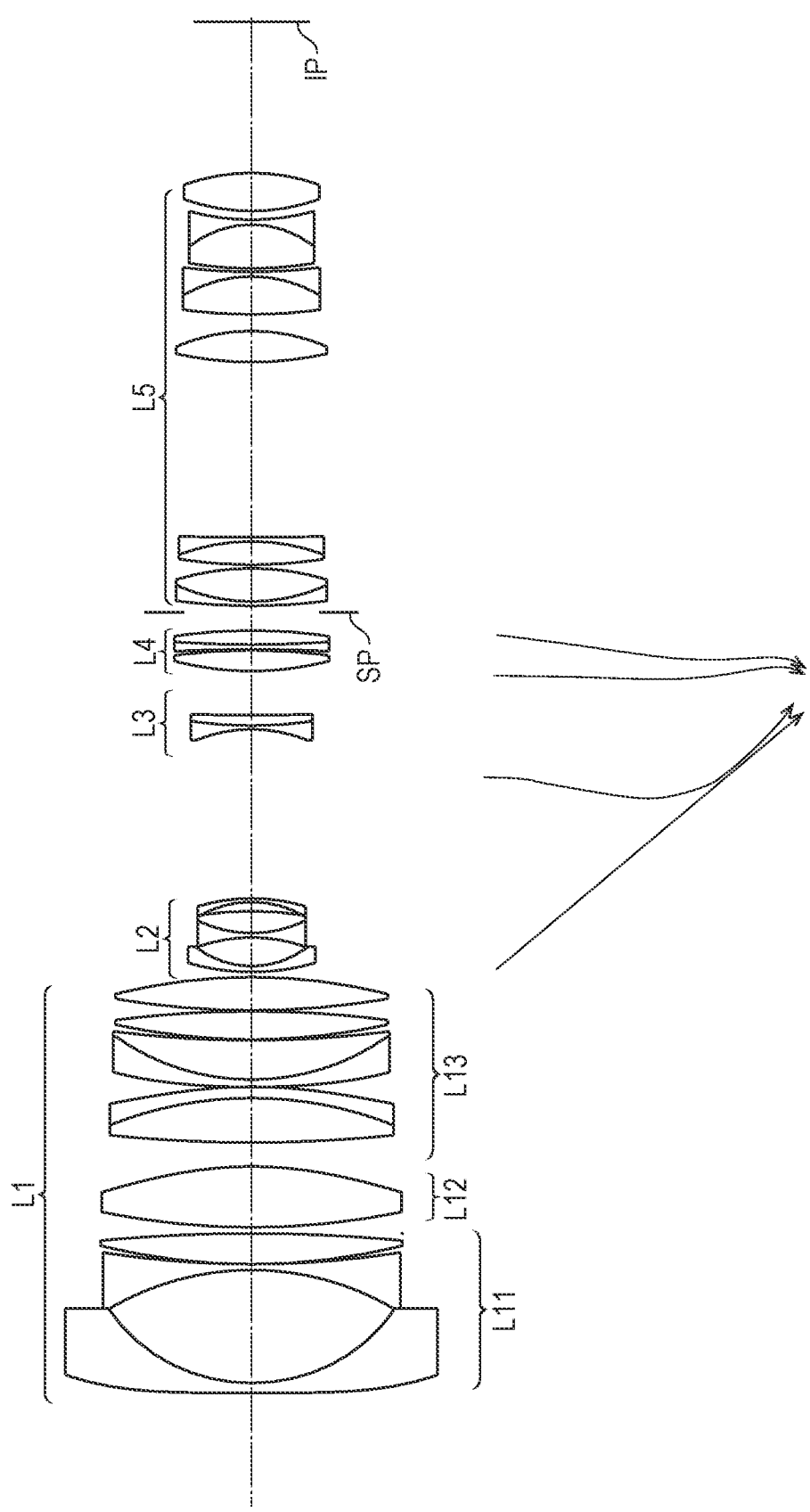

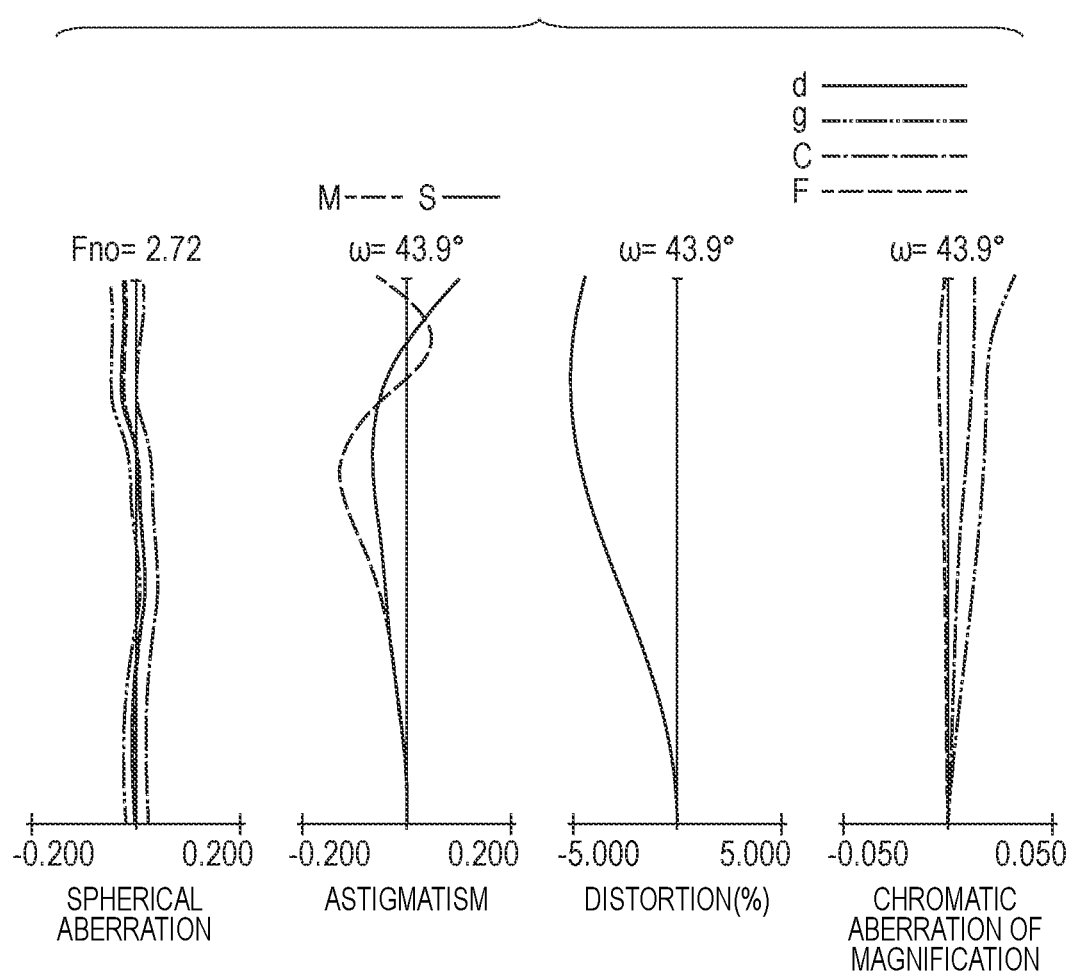

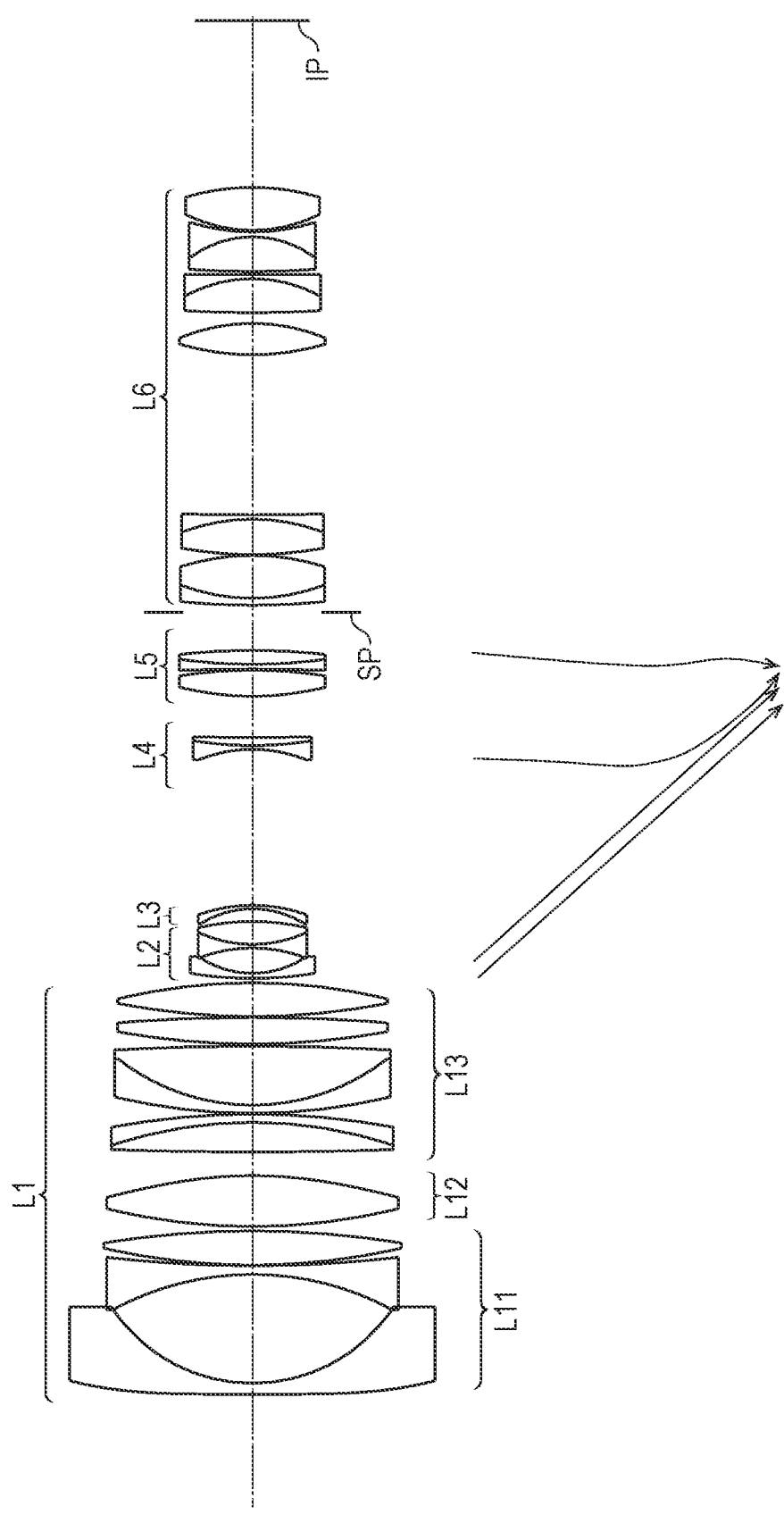

ZOOM LENS AND IMAGE PICKUP APPARATUS

BACKGROUND OF THE INVENTION

Field of the Invention

The present invention relates to a zoom lens and an image pickup apparatus.

Description of the Related Art

Zoom lenses used in image pickup apparatuses such as TV cameras, movie cameras, digital still cameras, and video cameras are required to be compact and lightweight for high operability, and to have a wide angle of view, a high zoom ratio, and high optical performance. In addition, along with the use of an image pickup element compatible with a high resolution such as 4K or 8K, it is required that the resolution is high from the center to the periphery of the image and that chromatic aberration is small.

Japanese Patent Application Laid-Open No. 2017-203912 discloses a zoom lens including, in order from an object side to an image side, a first lens unit having a positive refractive power that does not move for zooming, a plurality of movable lens units that move for zooming, and a rear lens unit having a positive refractive power that does not move for zooming. The first lens unit includes a first lens subunit having a negative refractive power, a second lens subunit having a positive refractive power, and a third lens subunit having a positive refractive power, and the second lens subunit moves for focusing.

Japanese Patent Application Laid-Open No. 2017-203912 discloses a zoom lens having a half angle of view of about 35° and a zoom ratio of about 6. When an attempt is made to increase the angle of view or zoom ratio of the zoom lens, the diameter of the first lens unit increases, and the zoom lens may be enlarged.

SUMMARY OF THE INVENTION

The present invention provides a zoom lens beneficial in terms of, for example, a wide angle of view, a high zoom ratio, a small size and light weight, and high optical performance.

A zoom lens according to the present invention includes in order from an object side to an image side, a first lens unit having a positive refractive power that does not move for zooming, three or more intermediate lens units that move during zooming, and a rear lens unit having a positive refractive power, in which each interval between adjacent lens units changes during zooming, the zoom lens includes an aperture stop in the rear lens unit, in a lens unit arranged adjacent to the rear lens unit, or between the lens unit arranged adjacent to the rear lens unit and the rear lens unit, the first lens unit includes in order from the object side to the image side, a first lens subunit having a negative refractive power that does not move for focusing, a second lens subunit having a positive refractive power that moves for focusing, and a third lens subunit having a positive refractive power, following inequalities are satisfied, $$1.700 \leq (f1+bok1)/f1 \leq 2.200$$

$$1.50 \leq f1/fw \leq 4.00$$

$$7.1 \leq ft/fw \leq 10.0$$

where f1 represents a focal length of the first lens unit, bok1 represents a length on an optical axis from a surface arranged at a most image-side of the first lens unit to a rear principal point of the first lens unit, fw represents a focal length of the zoom lens at a wide angle end, and ft represents a focal length of the zoom lens at a telephoto end.

According to the present invention, it is possible to provide a zoom lens advantageous in terms of, for example, a wide angle of view, a high zoom ratio, a small size and light weight, and high optical performance.

Further features of the present invention will become apparent from the following description of exemplary embodiments with reference to the attached drawings.

BRIEF DESCRIPTION OF THE DRAWINGS

FIG. 1 is a cross-sectional view of a zoom lens according to Embodiment 1 when focused on an object at infinity at a wide angle end.

FIG. 2A is a diagram showing aberrations of the zoom lens according to Embodiment 1 when focused on the object at infinity at the wide angle end.

FIG. 2B is a diagram showing aberrations of the zoom lens according to Embodiment 1 when focused on the object at infinity at the telephoto end.

FIG. 7 is a cross-sectional view of the zoom lens according to Embodiment 4 when focused on the object at infinity at the wide angle end.

FIG. 12A is a diagram showing aberrations of the zoom lens according to Embodiment 6 when focused on the object at infinity at the wide angle end.

FIG. 13 is a cross-sectional view of the zoom lens according to Embodiment 7 when focused on the object at infinity at the wide angle end.

FIG. 14A is a diagram showing aberrations of the zoom lens according to Embodiment 7 when focused on the object at infinity at the wide angle end.

FIG. 15 is a cross-sectional view of the zoom lens according to Embodiment 8 when focused on the object at infinity at the wide angle end.

DESCRIPTION OF THE EMBODIMENTS

Figure 3:
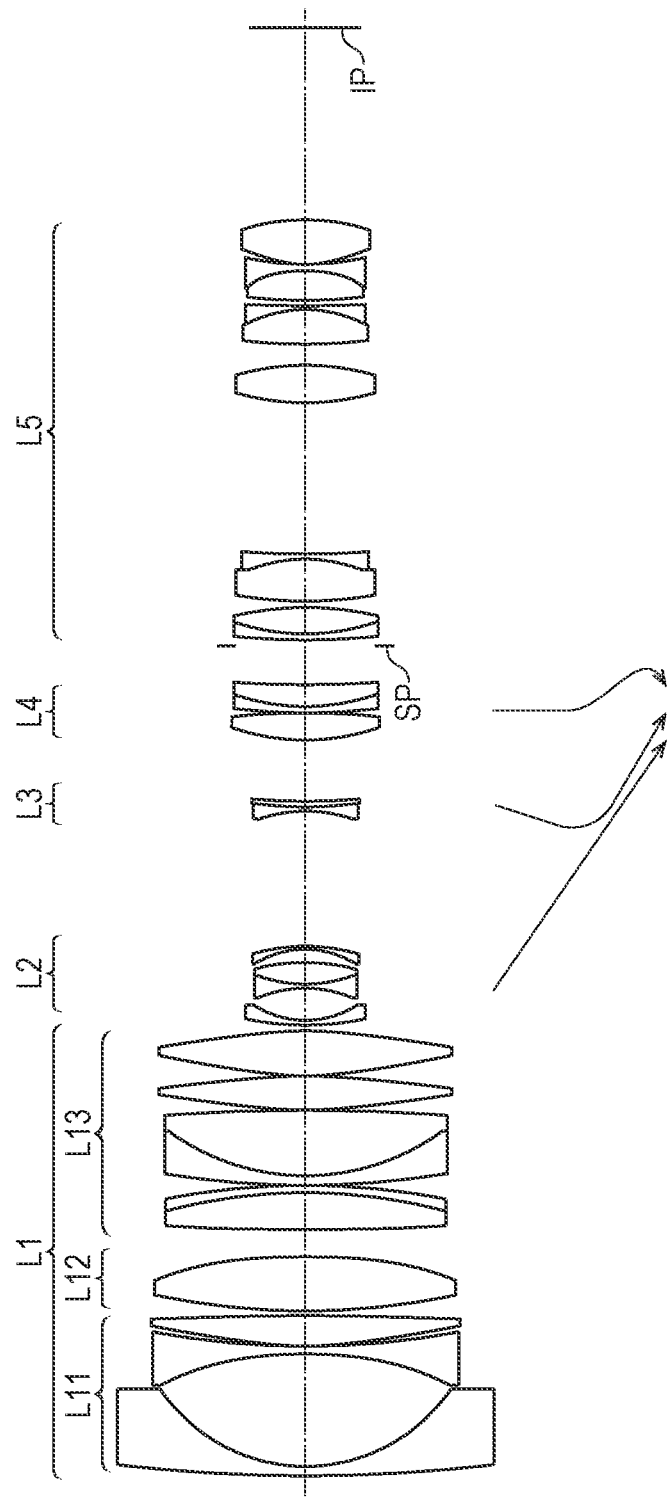
FIG. 3 is a cross-sectional view of the zoom lens according to Embodiment 2 when focused on the object at infinity at the wide angle end.

Embodiments of the present invention will now be described with reference to the accompanying drawings. In addition, throughout the drawings for explaining the embodiments, in principle (unless otherwise stated), the same members and the like are denoted by the same reference numerals, and repetitive description thereof will be omitted.

The zoom lens of the present invention includes, in order from the object side to the image side, a first lens unit L1 having a positive refractive power that does not move for zooming, three or more intermediate lens units that move during zooming, and a rear lens unit having a positive refractive power. In a zoom lens, the distance between adjacent lens units changes during zooming. The aperture stop SP of the zoom lens is disposed in the rear lens unit, in the lens unit adjacent to the rear lens unit, or between the lens unit adjacent to the rear lens unit and the rear lens unit. The first lens unit L1 includes, in order from the object side to the image side, a first lens subunit L11 having a negative refractive power that does not move for focusing, a second lens subunit L12 having a positive refractive power that moves for focusing, and a third lens subunit L13 having a positive refractive power.

The zoom lens of the present invention satisfies the following inequalities, $$1.700 \leq (f1+bok1)/f1 \leq 2.200 \quad (1)$$

$$1.50 \leq f1/fw \leq 4.00 \quad (2)$$

$$7.1 \leq ft/fw \leq 10.0 \quad (3)$$

where f1 represents a focal length of the first lens unit L1, bok1 represents a length on the optical axis from the last surface of the first lens unit L1 to the rear principal point of the first lens unit L1, fw represents the focal length of the zoom lens at the wide angle end, and ft represents the focal length of the zoom lens at the telephoto end.

Here, technical significance of the above described inequalities will be described.

The inequality (1) defines a condition for obtaining a zoom lens having a wide angle of view and a small size and light weight. (f1+bok1)/f1 is a retro ratio of the first lens unit L1. When the retro ratio is increased, it is advantageous for a wide angle of view, whereas the diameter of the third lens subunit L13 increases and the number of lenses in the first lens unit L1 increase. When the retro ratio exceeds the upper limit of the inequality (1), the retro ratio of the first lens unit L1 becomes excessively large, so that the diameter of the third lens subunit L13 becomes too large, which is disadvantageous for obtaining a zoom lens with a small size and light weight. Further, since the number of lenses in the first lens unit L1 is excessively increased, it is disadvantageous to obtain a zoom lens with a small size and light weight. When the retro ratio falls below the lower limit of the inequality (1), the retro ratio of the first lens unit L1 becomes excessively small, so that it becomes difficult to obtain a zoom lens having a wide angle of view. Further, the diameter of a lens arranged closest to the object side in the first lens unit L1 increases, which is disadvantageous for obtaining a zoom lens with a small size and light weight.

The inequality (2) defines a condition for obtaining a zoom lens having a wide angle of view, small size and light weight, and high optical performance. When the ratio exceeds the upper limit of the inequality (2), the diameter of the first lens unit L1 becomes large, and it becomes difficult to obtain a small zoom lens. When the ratio falls below the lower limit of the inequality (2), it becomes difficult to obtain a zoom lens with a wide angle of view or to suppress aberrations (coma aberration, curvature of field, etc.) at the wide angle end within an allowable range.

The inequality (3) defines a condition for obtaining a zoom lens having a high zoom ratio and high optical performance. When the ratio exceeds the upper limit of the inequality (3), the focal length at the telephoto end becomes too large, and it becomes difficult to obtain a zoom lens having a small size and light weight and high optical performance. When the ratio falls below the lower limit of the inequality (3), it becomes difficult to obtain a zoom lens having a high zoom ratio. The zoom lens of the present invention satisfies the inequalities (1) and (2) in the zoom lens that satisfies the inequality (3), thereby exhibiting particularly high effects.

It is preferable that the zoom lens according to an embodiment of the present invention further satisfies the following inequality.

$$2.10 \leq ft/f1 \leq 8.00 \quad (4)$$

The inequality (4) defines a condition for obtaining a zoom lens having a high zoom ratio, small size and light weight, and high optical performance. When ft/f1 is increased, it is advantageous to obtain a zoom lens of a telephoto type (high zoom ratio) and, on the other hand, aberration generated by the first lens unit L1 is enlarged at the telephoto end, so that it becomes difficult to suppress aberration within an allowable range. When the ratio exceeds the upper limit of the inequality (4), the focal length of the first lens unit L1 becomes excessively short, so that it becomes difficult to suppress the aberration caused by the first lens unit L1 at the telephoto end within the allowable range. Alternatively, since the number of lenses becomes excessively large, it is disadvantageous to obtain a zoom lens with a small size and light weight. When the ratio falls below the lower limit of the inequality (4), the focal length of the first lens unit L1 becomes excessively long, so that it becomes difficult to obtain a zoom lens of a telephoto type (high zoom ratio). Alternatively, since the amount of movement of the intermediate lens unit becomes excessively large, it is disadvantageous to obtain a zoom lens with a small size and light weight.

In the zoom lens according to the embodiment of the present invention, the first lens unit L1 includes a lens G1 having a negative refractive power arranged closest to the object side. It is preferable that the zoom lens according to the embodiment of the present invention satisfies the following inequality, $$-5.50 \leq fG1/fw \leq -1.60 \quad (5)$$

where fG1 represents a focal length of the lens G1.

The inequality (5) defines a condition for configuring the first lens unit L1 small. When the ratio exceeds the upper limit of the inequality (5), the focal length of the lens G1 becomes excessively short, so that a diameter of the axial light beam at the telephoto end increases. As a result, a diameter of the third lens subunit L13 increases, and it becomes difficult to configure the first lens unit L1 small. When the ratio falls below the lower limit of the inequality (5), the focal length of the lens G1 becomes excessively long, so that the entrance pupil of the zoom lens is positioned excessively on the object side, the diameter of the first lens subunit L11 increases, and it becomes difficult to configure the first lens unit L1 small.

It is preferable that the zoom lens according to the embodiment of the present invention includes a lens Gp that satisfies the following inequality, $$5.80 \leq fGp/fw \leq 20.60 \quad (6)$$

where fGp represents a focal length of the lens Gp.

The inequality (6) defines a condition for obtaining the first lens unit L1 in which chromatic aberration is satisfactorily corrected. When the ratio exceeds the upper limit of the inequality (6), the focal length of the lens G1p becomes excessively long, and the chromatic aberration of the first lens subunit L11 is not satisfactorily corrected, so that it becomes difficult to obtain the first lens unit L1 in which the chromatic aberration is satisfactorily corrected. When the ratio falls below the lower limit of the inequality (6), the focal length of the lens G1p becomes excessively short, so that it becomes difficult to correct spherical aberration at the telephoto end. As a result, it becomes difficult to obtain the first lens unit L1 in which aberration is satisfactorily corrected.

Further, it is preferable that the zoom lens according to the embodiment of the present invention satisfies the following inequality, $$-2.10 \leq fG1/f1 \leq -0.80 \quad (7)$$

where fG1 represents a focal length of the lens G1.

The inequality (7) defines a condition for configuring the first lens unit L1 small.

When the ratio exceeds the upper limit of the inequality (7), the focal length of the lens G1 becomes excessively short, so that the diameter of the axial light beam at the telephoto end increases. As a result, the diameter of the third lens subunit L13 increases, and it becomes difficult to configure the first lens unit L1 small. When the ratio falls below the lower limit of the inequality (7), the focal length of the lens G1 becomes excessively long, so that the entrance pupil of the zoom lens is positioned excessively on the object side, the diameter of the first lens subunit L11 increases, and it becomes difficult to configure the first lens unit L1 compact.

Further, it is preferable that the zoom lens according to the embodiment of the present invention satisfies the following inequalities (8) to (10), $$-1.50 \leq f11/f1 \leq -0.75 \quad (8)$$

$$2.00 \leq f12/f1 \leq 4.40 \quad (9)$$

$$1.30 \leq f13/f1 \leq 1.80 \quad (10)$$

where f11 represents the focal length of the first lens subunit L11, f12 represents the focal length of the second lens subunit L12, and f13 represents the focal length of the third lens subunit L13.

The inequalities (8) to (10) define conditions for obtaining a zoom lens having high optical performance.

When the inequality (8) is not satisfied, since the focal length f1 of the first lens unit L1 or the focal length f11 of the first lens subunit L11 becomes excessively small, it becomes difficult to suppress the aberration generated by the first lens unit L1 or the first lens subunit L11 within an allowable range.

When the inequality (9) is not satisfied, since the focal length f1 of the first lens unit L1 or the focal length f12 of the second lens subunit L12 becomes excessively small, it becomes difficult to suppress the aberration generated by the first lens unit L1 or the second lens subunit L12 within an allowable range.

When the inequality (10) is not satisfied, since the focal length f1 of the first lens unit L1 or the focal length f13 of the third lens subunit L13 becomes excessively small, it becomes difficult to suppress the aberration generated by the first lens unit L1 or the third lens subunit L13 within an allowable range.

Further, it is preferable that the zoom lens according to the embodiment of the present invention satisfies the following inequality, $$2.00 \leq Fnow \leq 3.50 \quad (11)$$

where Fnow represents an F number of the zoom lens at the wide angle end.

The inequality (11) defines a condition for obtaining a bright zoom lens. When Fnow falls below the lower limit of inequality (11), it is difficult to suppress aberrations (spherical aberration, astigmatism, and the like) at the wide angle end within an allowable range. Alternatively, each lens unit becomes excessively large to obtain high optical performance, and it becomes difficult to obtain a zoom lens with a small size and light weight.

Further, it is preferable that the zoom lens according to the embodiment of the present invention satisfies the following inequality, $$1.75 \leq nd1n \leq 2.00 \quad (12)$$

where nd1n represents an average value of the refractive indices of all negative lenses included in the first lens unit L1 with respect to the d-line (wavelength: 587.6 nm).

The inequality (12) defines a condition for obtaining a zoom lens having a small size and light weight and high optical performance. When nd1n exceeds the upper limit of the inequality (12), the specific gravity of an optical material (glass material) having a high refractive index tends to be large, so that it becomes difficult to configure the first lens unit L1 lightweight. If nd1n falls below the lower limit of inequality (12), the refractive index becomes excessively small, and it becomes difficult to suppress the aberration within an allowable range.

Further, it is preferable in the zoom lens according to the embodiment of the present invention that the first lens subunit L11 includes a positive lens L11p that satisfies the following inequality, $$17.0 \le vd11p \le 25.0 \quad (13)$$

where vd11p represents an Abbe number with respect to d-line of the positive lens L11p.

Further, it is preferable in the zoom lens according to the embodiment of the present invention that the third lens subunit L13 includes a negative lens L13n that satisfies the following inequality, $$20.0 \le vd13n \le 50.0 \quad (14)$$

where vd13n represents an Abbe number with respect to d-line of the negative lens L13n.

Further, it is preferable in the zoom lens according to the embodiment of the present invention that the first lens subunit L11 includes a positive lens L11p and the third lens subunit L13 includes a negative lens L13n and that the following inequality is satisfied, $$3.0 \le vd13n - vd11p \le 25.0 \quad (15)$$

where vd11p represents an Abbe number with respect to d-line of the positive lens L11p and vd13n represents an Abbe number with respect to d-line of the negative lens L13n.

The inequalities (13) to (15) define conditions for suppressing the axial chromatic aberration at the telephoto end and the variation of the axial chromatic aberration caused by focusing within an allowable range.

Figure 18:
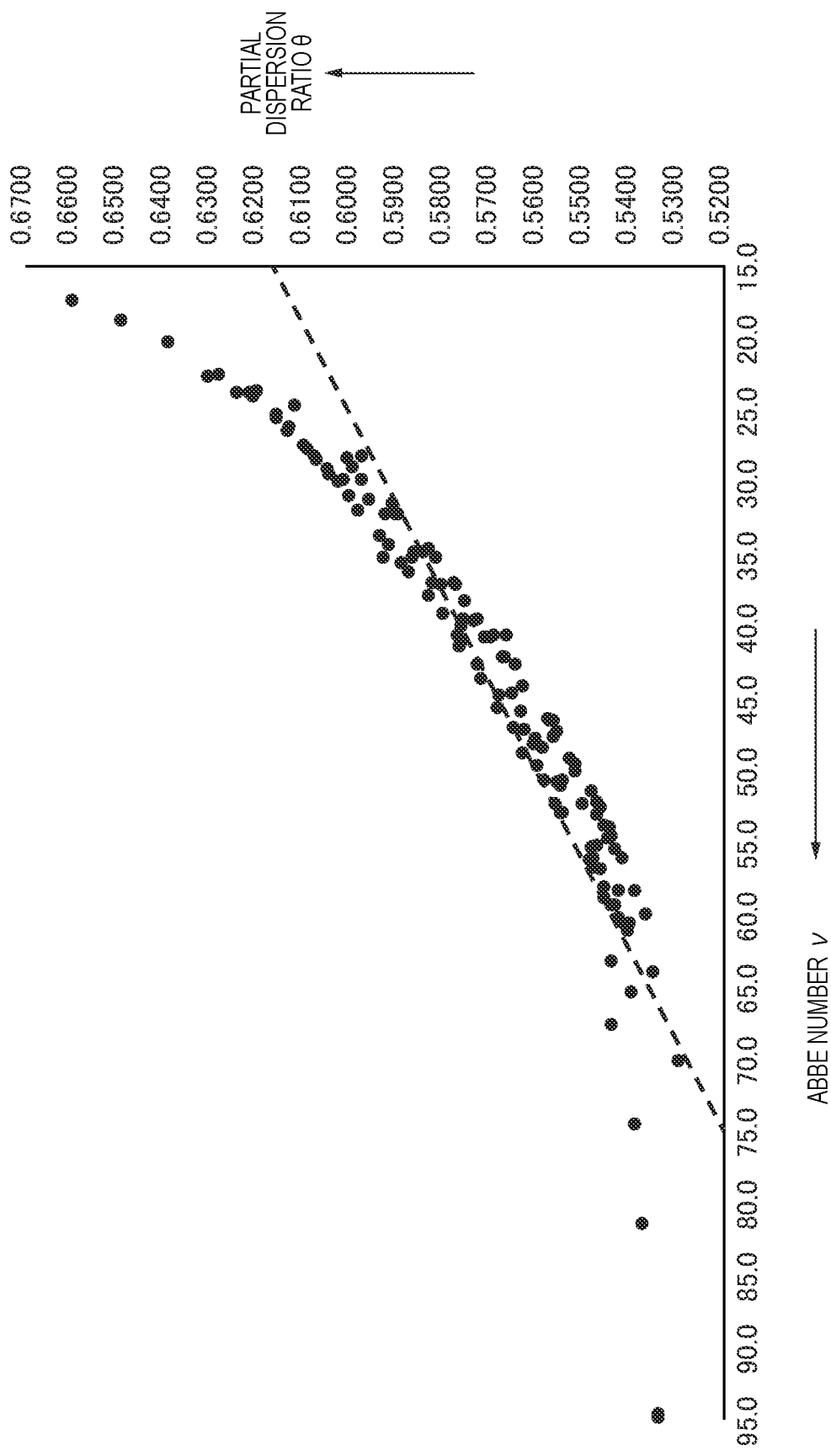
FIG. 18 is a schematic diagram showing the relationship between the Abbe number and the partial dispersion ratio in the optical material.

Here, FIG. 18 is a schematic diagram showing a relationship between the Abbe number v and the partial dispersion ratio θ in optical materials. As can be seen from the figure, the optical materials tend to exhibit anomalous dispersibility in which the partial dispersion ratio deviates from a straight line indicated by a broken line as the partial dispersion ratio increases.

When vd11p exceeds the upper limit of the inequality (13), it becomes difficult to suppress the variation of the secondary spectrum of the axial chromatic aberration caused by focusing within the allowable range. When vd11p falls below the lower limit of the inequality (13), the abnormal dispersion becomes excessively high, so that it becomes difficult to suppress the secondary spectrum of the axial chromatic aberration at the telephoto end within the allowable range.

When vd13n exceeds the upper limit of the inequality (14), it is difficult to suppress the axial chromatic aberration at the telephoto end within the allowable range. When vd13n falls below the lower limit of the inequality (14), it is difficult to suppress the secondary spectrum of axial chromatic aberration at the telephoto end within the allowable range.

When the inequality (15) is not satisfied, it is difficult to suppress the axial chromatic aberration at the telephoto end within the allowable range.

It is preferable that the zoom lens according to the embodiment of the present invention satisfy the following inequality, $$1.50 \le LD1/f1 \le 3.30 \quad (16)$$

where LD1 represents a thickness of the first lens unit L1 on the optical axis.

The inequality (16) defines a condition for obtaining a zoom lens having a small size and light weight and high optical performance. When the upper limit of the inequality (16) is not satisfied, the thickness of the first lens unit L1 becomes excessively long, and it becomes difficult to obtain a zoom lens with a small size and light weight. Alternatively, since the focal length of the first lens unit L1 becomes excessively short, it becomes difficult to suppress the variation of the aberration caused by focusing at the telephoto end within the allowable range. When the lower limit of the inequality (16) is not satisfied, the thickness of the first lens unit L1 becomes excessively short, so that it becomes difficult to have a large number of lenses required for making the variation of the aberration caused by focusing within the allowable range. Alternatively, since the focal length of the first lens unit L1 becomes excessively long, the amount of movement of the intermediate lens unit for zooming becomes excessively large, and it becomes difficult to obtain a zoom lens with a small size and light weight.

Here, the zoom lens according to the embodiment of the present invention is for a camera having 2Y as a diagonal image size (diagonal length) and that the following inequality is satisfied, $$41.2° \le \omega w \le 50.0° \quad (17)$$

where ωw represents a half angle of view at the wide angle end. Note that the half angle of view ωw is defined as the following expression, $$\omega w = \arctan(Y/fw)$$

where fw represents the focal length of the zoom lens at the wide angle end.

The inequality (17) defines a condition for obtaining a zoom lens having a wide angle of view and a small size and light weight. When the inequality (17) is satisfied, a wide angle can be achieved in various format sizes. When ωw exceeds the upper limit of the inequality (17), it becomes difficult to obtain a zoom lens with a small size and light weight.

Further, it is preferable that the zoom lens according to the embodiment of the present invention is for a camera having 2Y as a diagonal image size and that the following inequality is satisfied, $$4.30° \le \omega t \le 8.25° \quad (18)$$

where ωt represents a half angle of view at the telephoto end. Note that the half angle of view ωt is defined as the following expression, $$\omega t = \arctan(Y/ft)$$

where ft represents the focal length of the zoom lens at the telephoto end.

The inequality (18) defines a condition for obtaining a zoom lens having a narrow angle of view and a small size and light weight. When the inequality (18) is satisfied, telephoto can be achieved in various format sizes. When ωt falls below the lower limit of the inequality (18), it becomes difficult to obtain a zoom lens with a small size and light weight.

Further, it is preferable that the zoom lens according to the embodiment of the present invention satisfies the following inequality, $$0.280 \le fw/BFw \le 0.430 \quad (19)$$

where BFw represents the length on the optical axis from an image-side surface of a lens arranged closest to the image side having a finite focal length in the zoom lens to the image plane.

The inequality (19) defines a condition for obtaining a zoom lens having a wide angle of view and a small size and light weight. When the ratio exceeds the upper limit of the inequality (19), the focal length at the wide angle end becomes excessively long with respect to the back focus, so that it becomes difficult to obtain a zoom lens having a wide angle of view. When the ratio falls below the lower limit of the inequality (19), the back focus becomes excessively long with respect to the focal length at the wide angle end, and it becomes difficult to obtain a zoom lens with a small size and light weight.

In the zoom lens according to the embodiment of the present invention, the first lens unit L1 includes a first lens subunit L11 having a negative refractive power that does not move for focusing, a second lens subunit L12 having a positive refractive power that moves for focusing, and a third lens subunit L13 having a positive refractive power. With such a configuration, the variation of the aberration caused by focusing can be suppressed within the allowable range. Note that the configuration of the first lens unit L1 is not limited to the three lens subunits L11, L12, and L13, but for example, a plurality of lens subunits may be moved for focusing, or another lens subunit may be included.

In the zoom lens according to the embodiment of the present invention, the third lens subunit L13 is preferably composed of five or less lenses. When the third lens subunit L13 is composed of six or more lenses, the first lens unit L1 becomes large, and it becomes difficult to obtain a zoom lens with a small size and light weight.

Further, in the first lens unit L1 of the zoom lens according to the embodiment of the present invention, the third lens subunit L13 and one or more lens subunits arranged on the image side (rear side) of the third lens subunit L13 are preferably composed of five or less lenses in total. When the third lens subunit L13 and the one or more lens subunits arranged on the image side of the third lens subunit L13 are composed of six or more lenses, the first lens unit L1 becomes large, and it becomes difficult to obtain a zoom lens having a small size and a light weight.

In the zoom lens according to the embodiment of the present invention, the third lens subunit L13 preferably includes two or more negative lenses. When the number of negative lenses included in the third lens subunit L13 is one, the refractive power of the negative lens included in the third lens subunit L13 becomes too strong in order to perform chromatic aberration correction in the first lens unit L1, and it becomes difficult to correct various aberrations other than the chromatic aberration such as spherical aberration.

In the zoom lens according to the embodiment of the present invention, the first lens unit L1 and the rear lens unit are preferably fixed at the time of zooming. Thereby, the total optical length (a length from the frontmost surface to the rearmost surface of the optical system) is kept constant during zooming, so that the change in the position of the center of gravity can be reduced.

The inequalities (1) to (19) described above are more preferably set as the inequalities (1a) to (19a), respectively.

$$1.780 \leq (f1+bok1)/f1 \leq 2.100 \tag{1a}$$

$$2.30 \leq f1/fw \leq 3.20 \tag{2a}$$

$$7.2 \leq ft/fw \leq 10.0 \tag{3a}$$

$$2.370 \leq ft/f1 \leq 4.550 \tag{4a}$$

$$-4.50 \leq fG1/fw \leq -2.00 \tag{5a}$$

$$6.00 \leq fGp/fw \leq 15.00 \tag{6a}$$

$$-1.80 \leq fG1/f1 \leq -1.00 \tag{7a}$$

$$-1.30 \leq f11/f1 \leq -0.85 \tag{8a}$$

$$2.20 \leq f12/f1 \leq 3.40 \tag{9a}$$

$$1.435 \leq f13/f1 \leq 1.800 \tag{10a}$$

$$2.20 \leq Fnow \leq 3.00 \tag{11a}$$

$$1.76 \leq nd1n \leq 1.95 \tag{12a}$$

$$17.0 \leq vd11p \leq 22.0 \tag{13a}$$

$$23.0 \leq vd13n \leq 41.0 \tag{14a}$$

$$3.0 \leq vd13n - vd11p \leq 20.0 \tag{15a}$$

$$1.70 \leq LD1/f1 \leq 3.10 \tag{16a}$$

$$42.90° \leq \omega w \leq 50.00° \tag{17a}$$

$$4.50° \leq \omega t \leq 8.00° \tag{18a}$$

$$0.300 \leq fw/BFw \leq 0.400 \tag{19a}$$

Hereinafter, embodiments 1 to 8 of the zoom lens according to the embodiment of the present invention and numerical embodiments 1 to 8 corresponding thereto will be described in detail.

Embodiment 1

FIG. 1 is a cross-sectional view of the zoom lens according to Embodiment 1 of the present invention when focused on an object at infinity at a wide angle end. FIGS. 2A and 2B are diagrams showing aberrations of the zoom lens according to Embodiment 1 at the wide angle end and the telephoto end when focused on the object at infinity (see Numerical Embodiment 1 as to the focal lengths of the zoom lens).

Components of the zoom lens according to Embodiment 1 will be described with reference to FIG. 1.

The zoom lens according to Embodiment 1 includes, in order from the object side to the image side, a first lens unit L1 having a positive refractive power that does not move for zooming, three or more intermediate lens units (a second lens unit L2 having a negative refractive power, a third lens unit L3 having a negative refractive power, and a fourth lens unit L4 having a positive refractive power) that move during zooming, and a fifth lens unit L5 serving as a rear lens unit having a positive refractive power that does not move for zooming. In the zoom lens, an interval between adjacent lens units changes for zooming. An aperture stop SP that does not move for zooming is arranged adjacent to the object side of the fifth lens unit L5.

The first lens unit L1 includes, in order from the object side to the image side, a first lens subunit L11 having a negative refractive power, a second lens subunit L12 having a positive refractive power, and a third lens subunit L13 having a positive refractive power.

The first lens subunit L11 does not move for focusing. The second lens subunit L12 moves toward the image side for focusing from an infinity object to a close object. The third lens subunit L13 does not move for focusing.

The second lens unit L2 monotonously moves on the optical axis toward the image side during zooming from the wide angle end to the telephoto end. The third lens unit L3 moves on the optical axis along a locus convex toward the object side for zooming from the wide angle end to the telephoto end. The fourth lens unit L4 moves on the optical axis non-monotonously, for example as shown in FIG. 1, for zooming from the wide-angle end to the telephoto end. The fifth lens unit L5 does not move for zooming. Reference numeral IP denotes an image plane (plane on which an image is formed) of the zoom lens, and the image pickup element picks up an image (an image pickup is performed).

The first lens unit L1 includes first to eighteenth surfaces. The first lens subunit L11 includes first to sixth surfaces, and is composed of two negative lenses and one positive lens. The second lens subunit L12 includes seventh to eighth surfaces, and is composed of one positive lens having an aspherical surface on the image side. The third lens subunit L13 includes ninth to eighteenth surfaces, and is composed of four positive lenses and two negative lenses.

The second lens unit L2, the third lens unit L3, and the fourth lens unit L4, as three or more intermediate lens units, include nineteenth to thirty-third surfaces. The second lens unit L2 includes nineteenth to twenty-fifth surfaces, and is composed of three negative lenses and one positive lens. The third lens unit L3 includes twenty-sixth to twenty-eighth surfaces, and is composed of one negative lens and one positive lens. The fourth lens unit L4 includes twenty-ninth to thirty-third surfaces, and is composed of one negative lens and two positive lenses. The aperture stop SP corresponds to a thirty-fourth surface. The fifth lens unit L5 includes thirty-fifth to fiftieth surfaces, and is composed of four negative lenses and six positive lenses.

FIGS. 2A and 2B are diagrams showing aberrations in Embodiment 1 (Numerical Embodiment 1).

In the aberration diagrams of FIGS. 2A and 2B, a solid line, a two-dot chain line, a one-dot chain line, and a broken line in spherical aberration correspond to d-line (wavelength 587.6 nm), g-line (wavelength 435.8 nm), C-line (wavelength 656.3 nm), and F-line (wavelength 486.1 nm), respectively. A broken line and a solid line in astigmatism correspond to a meridional image plane and a sagittal image plane, respectively. A line in distortion corresponds to d-line. The solid line, the two-dot chain line, the one-dot chain line, and the broken line in chromatic aberration of magnification correspond to d-line, g-line, C-line, and F-line, respectively. Fno represents an F number, and ω represents a half angle of view. The spherical aberration is drawn with a full scale of ±0.200 mm on the abscissa. The astigmatism is drawn with a full scale of ±0.200 mm on the abscissa. The distortion is drawn with a full scale of ±5.000% on the abscissa. The magnification chromatic aberration is drawn with a full scale of ±0.050 mm on the abscissa. The same applies to aberration diagrams of Embodiments 2 to 8 described later.

Values of the inequalities (1) to (19) and values of variables included in the inequalities are listed in Table 1 described later. By satisfying the inequality, the zoom lens according to Embodiment 1 can provide a zoom lens beneficial in terms of a wide angle of view, a high zoom ratio, a small size and light weight, and high optical performance.

Embodiment 2

FIG. 3 is a cross-sectional view of the zoom lens according to Embodiment 2 when focusing on an object at infinity at the wide angle end. The components of the zoom lens according to Embodiment 2 will be described with reference to FIG. 3.

The zoom lens according to Embodiment 2 includes, in order from the object side to the image side, a first lens unit L1 having a positive refractive power that does not move for zooming, three or more intermediate lens units (a second lens unit L2 having a negative refractive power, a third lens unit L3 having a negative refractive power, and a fourth lens unit L4 having a positive refractive power) that move during zooming, and a fifth lens unit L5 serving as a rear lens unit having a positive refractive power that does not move for zooming. In the zoom lens, an interval between adjacent lens units changes for zooming. An aperture stop SP that does not move for zooming is arranged adjacent to the object side of the fifth lens unit.

The first lens unit L1 includes, in order from the object side to the image side, a first lens subunit L11 having a negative refractive power, a second lens subunit L12 having a positive refractive power, and a third lens subunit L13 having a positive refractive power.

The first lens subunit L11 does not move for focusing. The second lens subunit L12 moves toward the image side for focusing from an infinity object to a close object. The third lens subunit L13 does not move for focusing.

The second lens unit L2 monotonously moves on the optical axis toward the image side for zooming from the wide angle end to the telephoto end. The third lens unit L3 first moves (first) to the object side and then (second) to the image side on the optical axis for the zooming. The fourth lens unit L4 moves on the optical axis for the zooming (for example, non-monotonously as shown in FIG. 3).

The first lens unit L1 includes first to eighteenth surfaces. The first lens subunit L11 includes first to sixth surfaces, and is composed of two negative lenses and one positive lens. The second lens subunit L12 includes seventh to eighth surfaces, and is composed of one positive lens having an aspherical surface on the image side. The third lens subunit L13 includes ninth to eighteenth surfaces, and is composed of four positive lenses and two negative lenses.

The second lens unit L2, the third lens unit L3, and the fourth lens unit L4 which are the three or more intermediate lens units includes nineteenth to thirty-third surfaces. The second lens unit L2 includes nineteenth to twenty-fifth surfaces, and is composed of three negative lenses and one positive lens. The third lens unit L3 includes twenty-sixth to twenty-eighth surfaces, and is composed of one negative lens and one positive lens. The fourth lens unit L4 includes twenty-ninth to thirty-third surfaces, and is composed of one negative lens and two positive lenses. The aperture stop SP corresponds to a thirty-fourth surface. The fifth lens unit L5 includes thirty-fifth to fiftieth surfaces, and is composed of four negative lenses and six positive lenses.

Figure 4A:
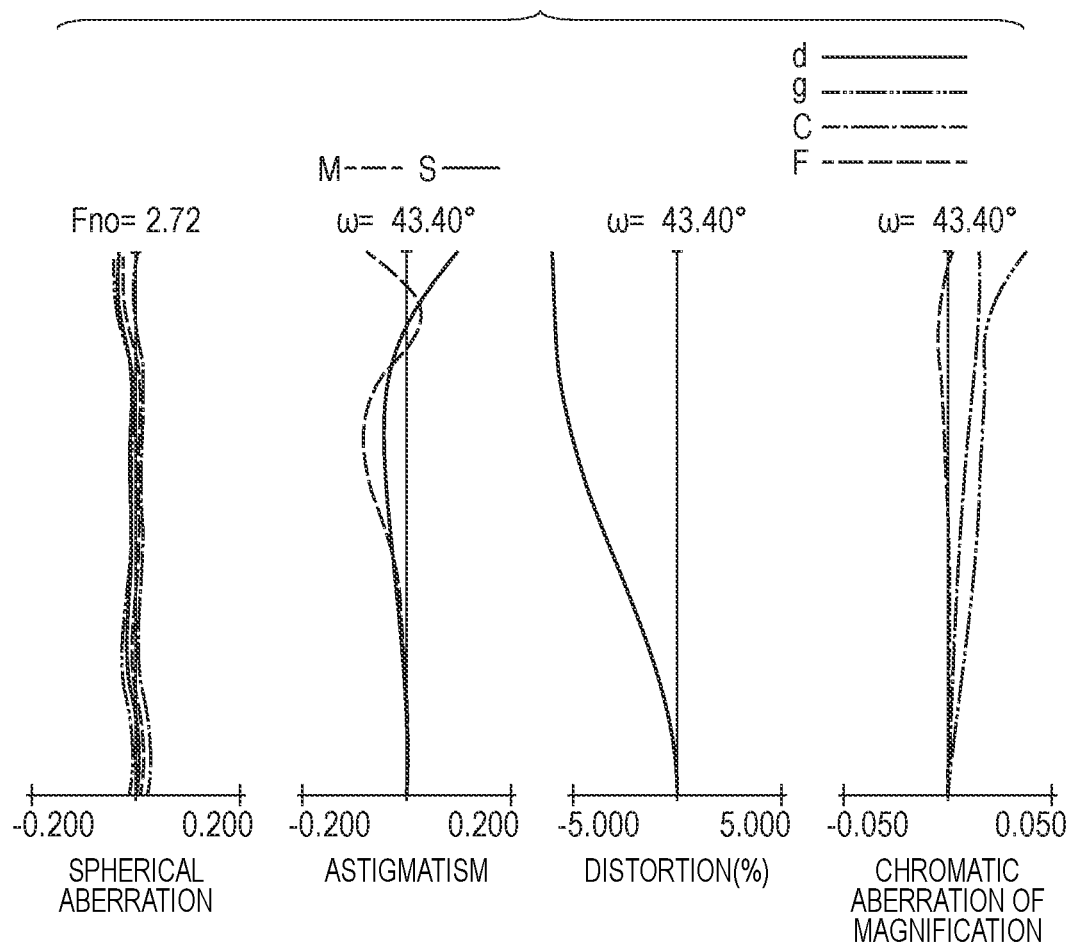
FIG. 4A is a diagram showing aberrations of the zoom lens according to Embodiment 2 when focused on the object at infinity at the wide angle end.
Figure 4B:
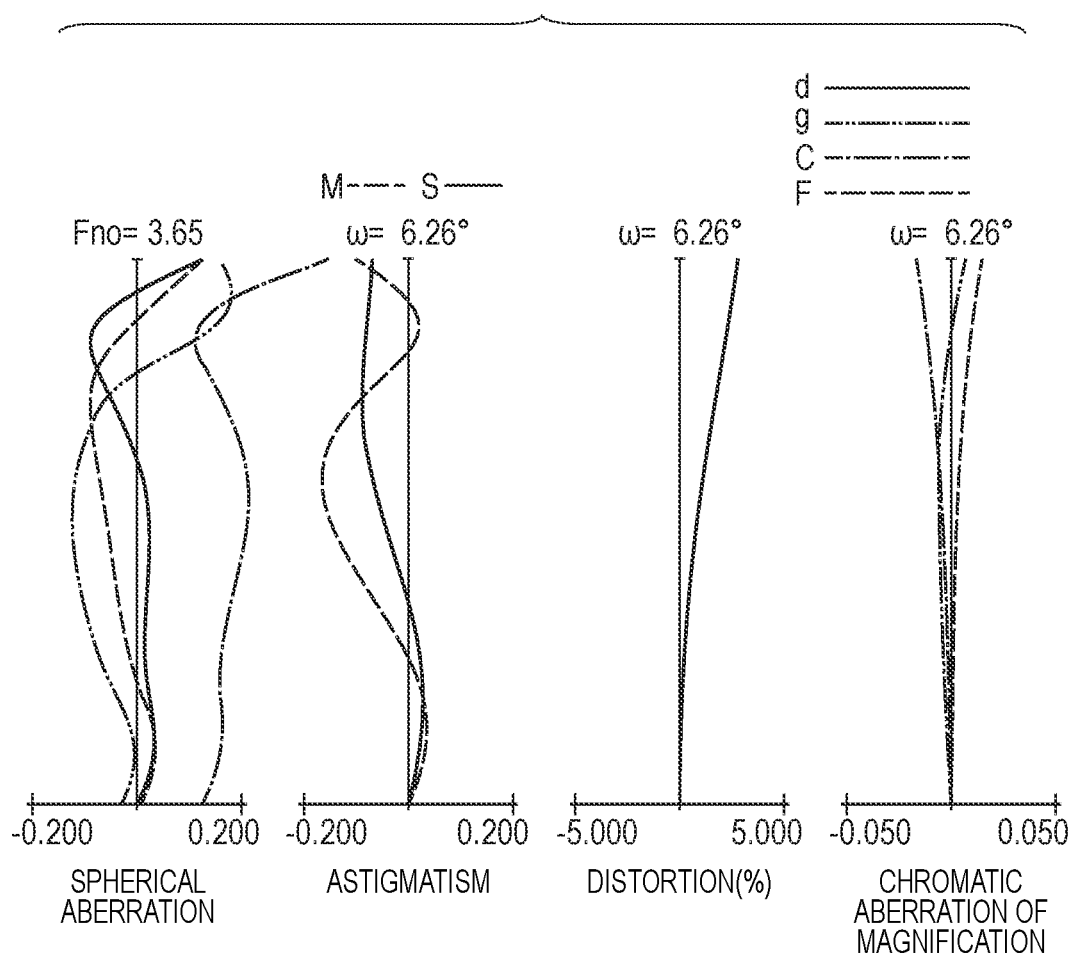
FIG. 4B is a diagram showing aberrations of the zoom lens according to Embodiment 2 when focused on the object at infinity at the telephoto end.

FIGS. 4A and 4B are diagrams illustrating aberrations at the wide-angle end and the telephoto end, respectively, of the zoom lens according to Embodiment 2, which are focused on an infinity object. The legend is similar to that described with reference to FIGS. 2A and 2B.

The values of the inequalities (1) to (19) and the values of the variables included in the inequality are listed in Table 1. By satisfying the inequality, the zoom lens according to this embodiment can provide a zoom lens beneficial in terms of a wide angle of view, a high zoom ratio, a small size and light weight, and high optical performance.

Embodiment 3

Figure 5:
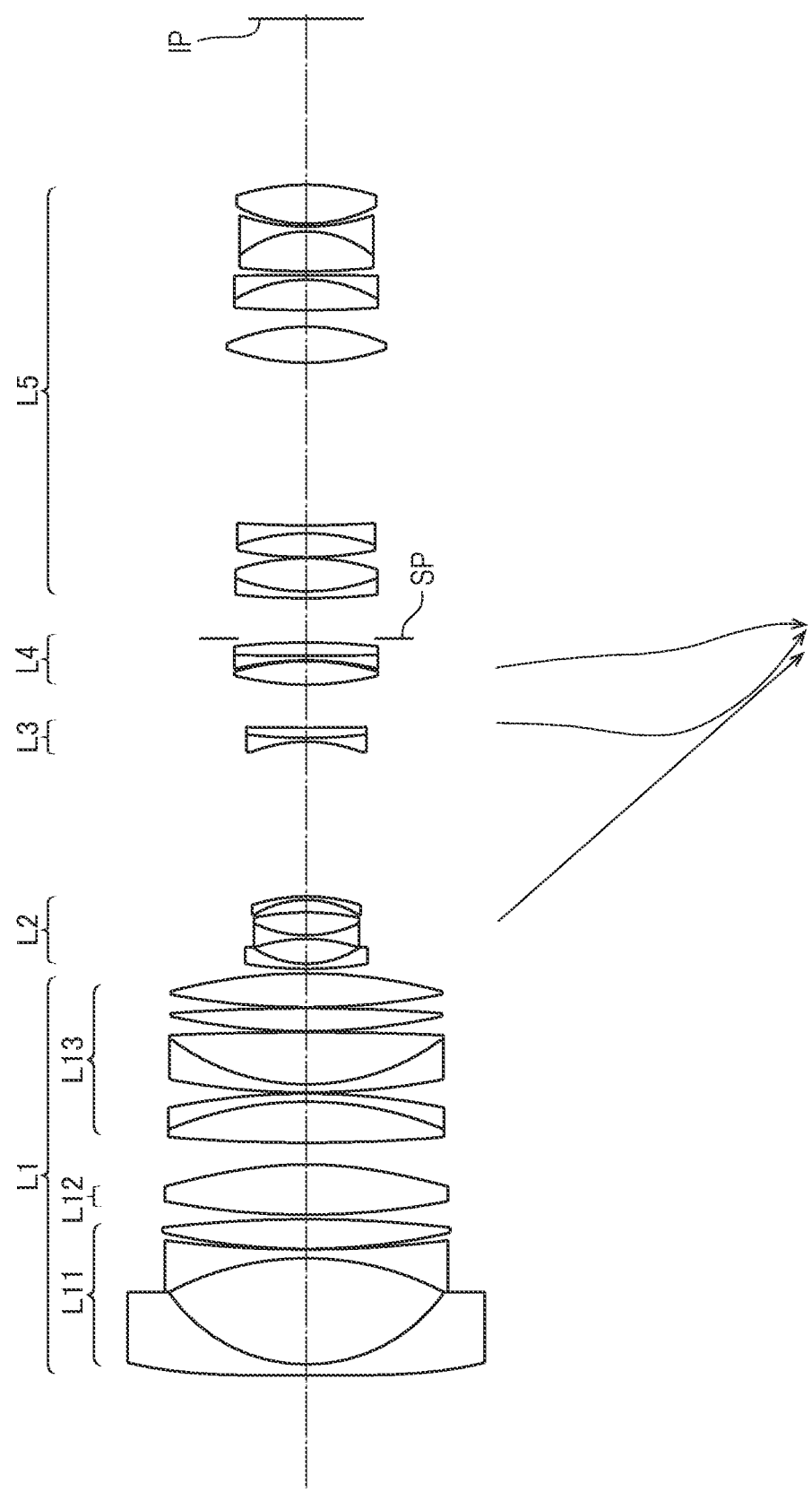
FIG. 5 is a cross-sectional view of the zoom lens according to Embodiment 3 when focused on the object at infinity at the wide angle end.

FIG. 5 is a cross-sectional view of a zoom lens according to Embodiment 3 when focused on an object at infinity at a wide angle end. The components of the zoom lens according to Embodiment 3 will be described with reference to FIG. 5.

The zoom lens according to Embodiment 3 includes, in order from the object side to the image side, a first lens unit L1 having a positive refractive power that does not move for zooming, three or more intermediate lens units (a second lens unit L2 having a negative refractive power, a third lens unit L3 having a negative refractive power, and a fourth lens unit L4 having a positive refractive power) that move during zooming, and a fifth lens unit L5 serving as a rear lens unit having a positive refractive power that does not move for zooming. In the zoom lens, an interval between adjacent lens units changes for zooming. An aperture stop SP is arranged adjacent to the image side of the fourth lens unit L4 and moves together with the fourth lens unit L4 during zooming.

The first lens unit L1 includes, in order from the object side to the image side, a first lens subunit L11 having a negative refractive power, a second lens subunit L12 having a positive refractive power, and a third lens subunit L13 having a positive refractive power.

The first lens subunit L11 does not move for focusing. The second lens subunit L12 moves toward the image side for focusing from an infinity object to a close object. The third lens subunit L13 moves toward the object side for focusing from the infinity object to the close object. Here, the ratio of the amount of movement of the second lens subunit L12 for focusing from the infinity object to the close object to the amount of movement of the third lens subunit L13 for focusing from the infinity object to the close object is 9:1.

The three or more intermediate lens units that move during zooming include, in order from the object side to the image side, the second lens unit L2 having the negative refractive power, the third lens unit L3 having the negative refractive power, and the fourth lens unit L4 having the positive refractive power. The second lens unit L2 monotonously moves on the optical axis toward the image side for zooming from the wide angle end to the telephoto end. For zooming from the wide angle end to the telephoto end, the third lens unit L3 moves on the optical axis first to the object side then to the image side. The fourth lens unit L4 moves on the optical axis for zooming from the wide angle end to the telephoto end (for example, non-monotonously as shown in FIG. 5).

The first lens unit L1 includes first to eighteenth surfaces. The first lens subunit L11 includes first to sixth surfaces, and is composed of two negative lenses and one positive lens. The second lens subunit L12 includes seventh to eighth surfaces, and is composed of one positive lens having an aspherical surface on the image side. The third lens subunit L13 includes ninth to eighteenth surfaces, and is composed of four positive lenses and two negative lenses.

The second lens unit L2, the third lens unit L3, and the fourth lens unit L4 which are the three or more intermediate lens units includes nineteenth to thirty-third surfaces. The second lens unit L2 includes nineteenth to twenty-fifth surfaces, and is composed of three negative lenses and one positive lens. The third lens unit L3 includes twenty-sixth to twenty-eighth surfaces, and is composed of one negative lens and one positive lens. The fourth lens unit L4 includes twenty-ninth to thirty-third surfaces, and is composed of one negative lens and two positive lenses. The aperture stop SP corresponds to a thirty-fourth surface. The fifth lens unit L5 includes thirty-fifth to fiftieth surfaces, and is composed of four negative lenses and six positive lenses.

Figure 6A:
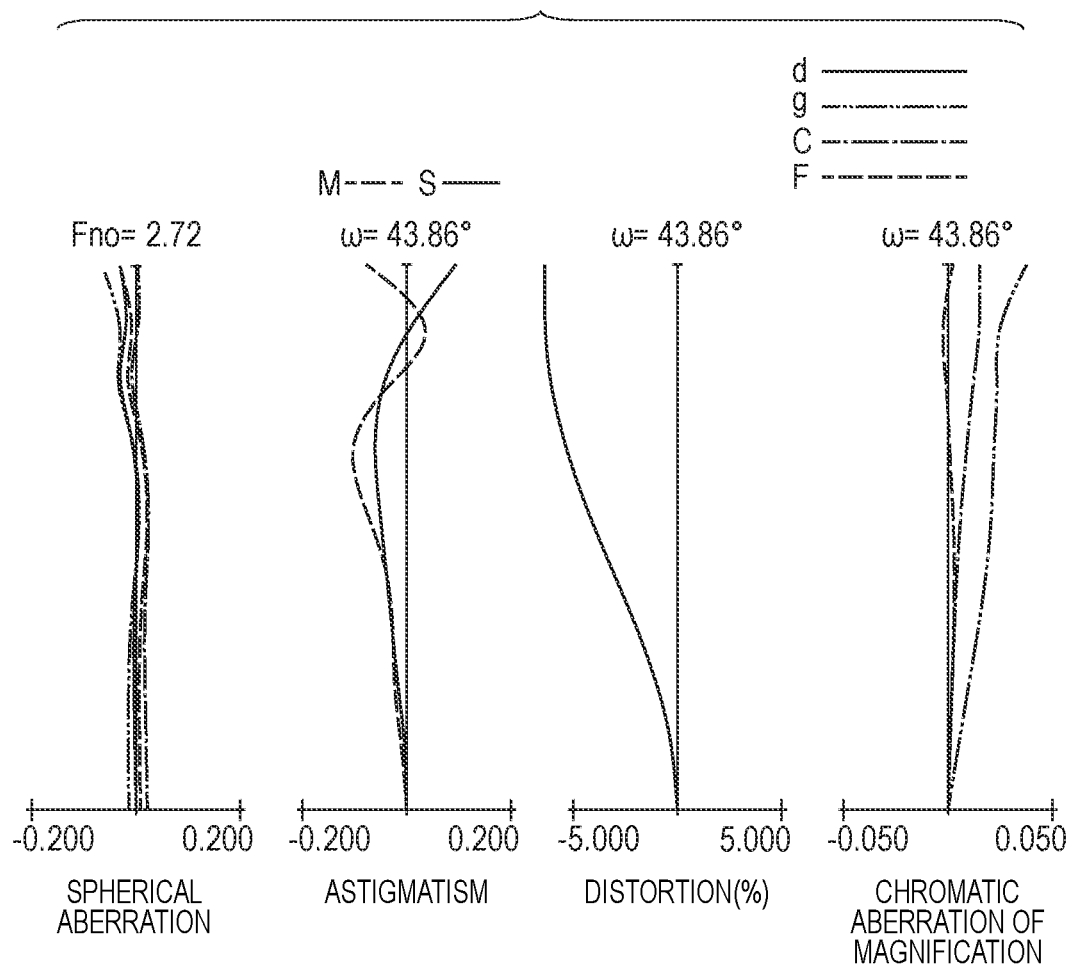
FIG. 6A is a diagram showing aberrations of the zoom lens according to Embodiment 3 when focused on the object at infinity at the wide angle end.
Figure 6B:
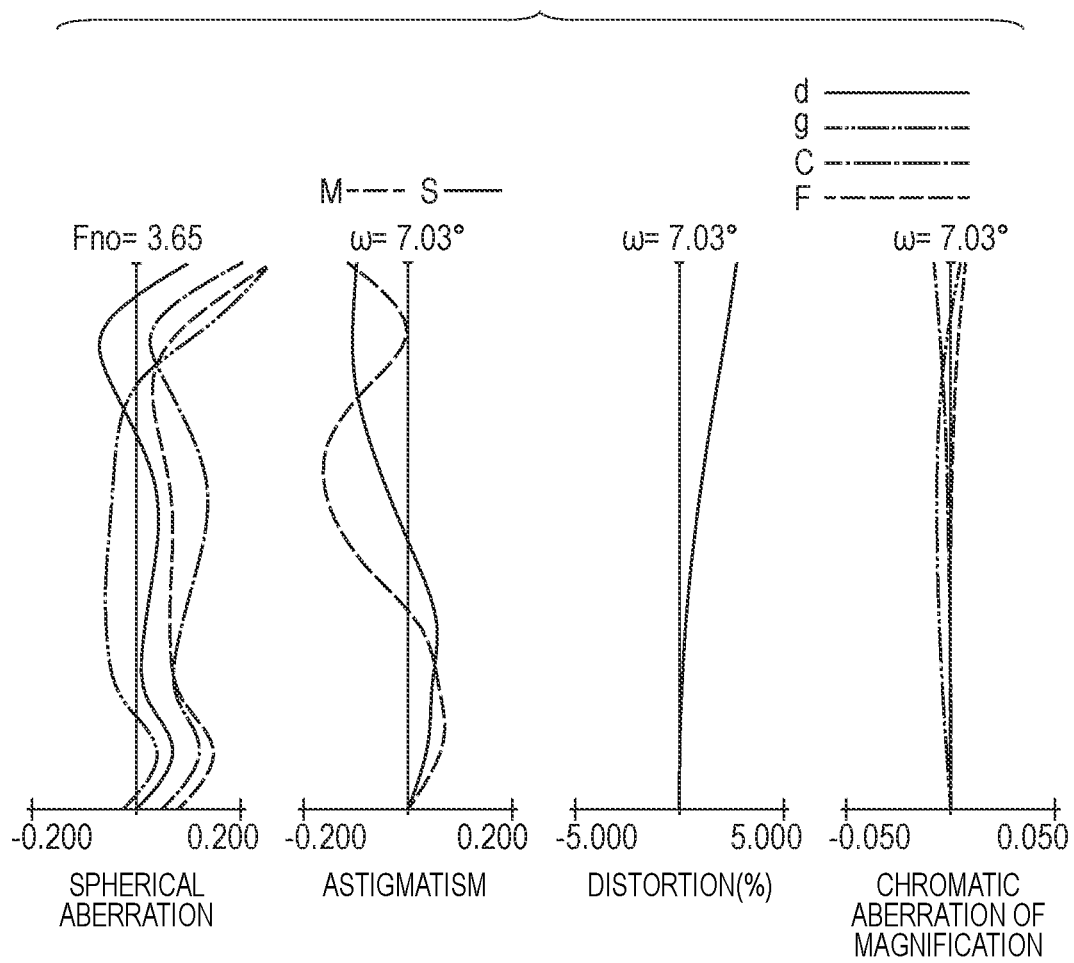
FIG. 6B is a diagram showing aberrations of the zoom lens according to Embodiment 3 when focused on the object at infinity at the telephoto end.

FIGS. 6A and 6B are diagrams showing aberrations at the wide angle end and the telephoto end, respectively, of the zoom lens according to Embodiment 3, in which the zoom lens focuses on an object at infinity. The legend is similar to that described with reference to FIGS. 2A and 2B.

The values of the inequalities (1) to (19) and the values of the variables included in the inequalities are listed in Table 1. By satisfying the inequality, the zoom lens according to this embodiment can provide a zoom lens beneficial in terms of a wide angle of view, a high zoom ratio, a small size and light weight, and high optical performance.

Embodiment 4

FIG. 7 is a cross-sectional view of a zoom lens according to Embodiment 4 when focused on an object at infinity at a wide angle end. Components of a zoom lens according to Embodiment 4 will be described with reference to FIG. 7.

The zoom lens according to Embodiment 4 includes, in order from the object side to the image side, a first lens unit L1 having a positive refractive power that does not move for zooming, three or more intermediate lens units (a second lens unit L2 having a negative refractive power, a third lens unit L3 having a negative refractive power, a fourth lens unit L4 having a negative refractive power, and a fifth lens unit L5 having a positive refractive power) that move during zooming, and a sixth lens unit L6 serving as a rear lens unit having a positive refractive power that does not move for zooming. In the zoom lens, an interval between adjacent lens units changes for zooming. An aperture stop SP is arranged adjacent to the object side of the sixth lens unit L6, and does not move for zooming.

The first lens unit L1 includes, in order from the object side to the image side, a first lens subunit L11 having a negative refractive power, a second lens subunit L12 having a positive refractive power, and a third lens subunit L13 having a positive refractive power.

The first lens subunit L11 does not move for focusing. The second lens subunit L12 moves toward the image side for focusing from an infinity object to a close object. The third lens subunit L13 moves toward the object side for focusing from an infinity object to a close object. Here, the ratio of the amount of movement of the second lens subunit L12 for focusing from the infinity object to the close object to the amount of movement of the third lens subunit L13 for focusing from the infinity object to the close object is 9:1.

The three or more intermediate lens units that move during zooming include, in order from the object side to the image side, the second lens unit L2 having the negative refractive power, the third lens unit L3 having the negative refractive power, the fourth lens unit L4 having the negative refractive power, and the fifth lens unit L5 having the positive refractive power.

The second lens unit L2 monotonously moves on the optical axis toward the image side for zooming from the wide angle end to the telephoto end. The third lens unit L3 monotonously moves on the optical axis toward the image side for zooming from the wide angle end to the telephoto end. For zooming from the wide angle end to the telephoto end, the fourth lens unit L4 moves on the optical axis first to the object side then to the image side. The fifth lens L5 moves on the optical axis for zooming from the wide angle end to the telephoto end (for example, non-monotonously as shown in FIG. 7).

The first lens unit L1 includes first to eighteenth surfaces. The first lens subunit L11 includes first to sixth surfaces, and is composed of two negative lenses and one positive lens. The second lens subunit L12 includes seventh to eighth surfaces, and is composed of one positive lens having an aspherical surface on the image side. The third lens subunit L13 includes ninth to eighteenth surfaces, and is composed of four positive lenses and two negative lenses.

The second lens unit L2, the third lens unit L3, the fourth lens unit L4, and the fifth lens unit L5, which are the three or more intermediate lens units, includes nineteenth to thirty-fifth surfaces. The second lens unit L2 includes nineteenth to twenty-third surfaces, and is composed of two negative lenses and one positive lens. The third lens unit L3 includes twenty-fourth to twenty-fifth surfaces, and is composed of one negative lens. The fourth lens unit L4 includes twenty-sixth to thirtieth surfaces, and is composed of two negative lenses and one positive lens. The fifth lens unit L5 includes thirty-first to thirty-fifth surfaces, and is composed of one negative lens and two positive lenses. The aperture stop SP corresponds to a thirty-sixth surface. The sixth lens unit L6 includes thirty-seventh to fifty-second surfaces, and is composed of four negative lenses and six positive lenses.

Figure 8A:
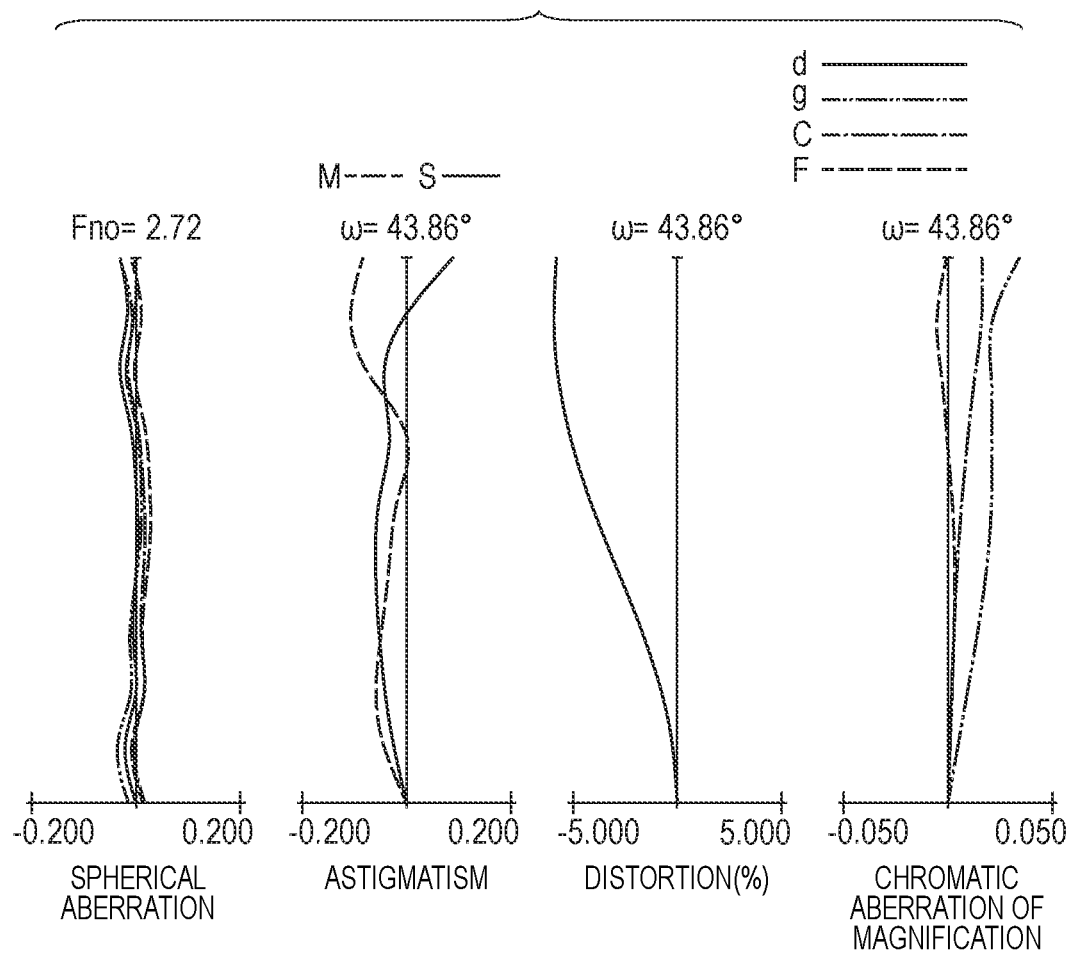
FIG. 8A is a diagram showing aberrations of the zoom lens according to Embodiment 4 when focused on the object at infinity at the wide angle end.
Figure 8B:
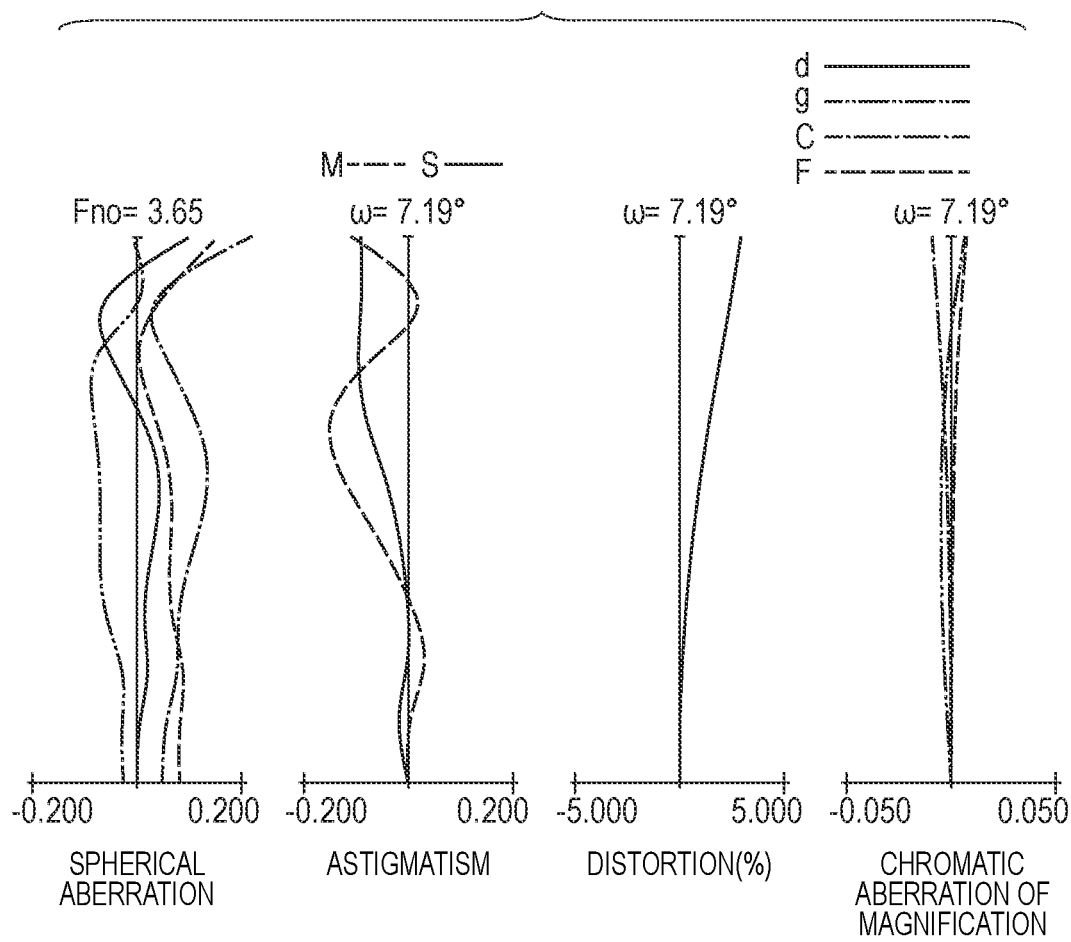
FIG. 8B is a diagram showing aberrations of the zoom lens according to Embodiment 4 when focused on the object at infinity at the telephoto end.

FIGS. 8A and 8B are diagrams illustrating aberrations at the wide-angle end and the telephoto end, respectively, of the zoom lens according to Embodiment 4, in which the zoom lens focuses on an object at infinity. The legend is similar to that described with reference to FIGS. 2A and 2B.

The values of the inequalities (1) to (19) and the values of the variables included in the inequalities are shown in Table 1. By satisfying the inequality, the zoom lens according to this embodiment can provide a zoom lens beneficial in terms of a wide angle of view, a high zoom ratio, a small size and light weight, and high optical performance.

Embodiment 5

Figure 9:
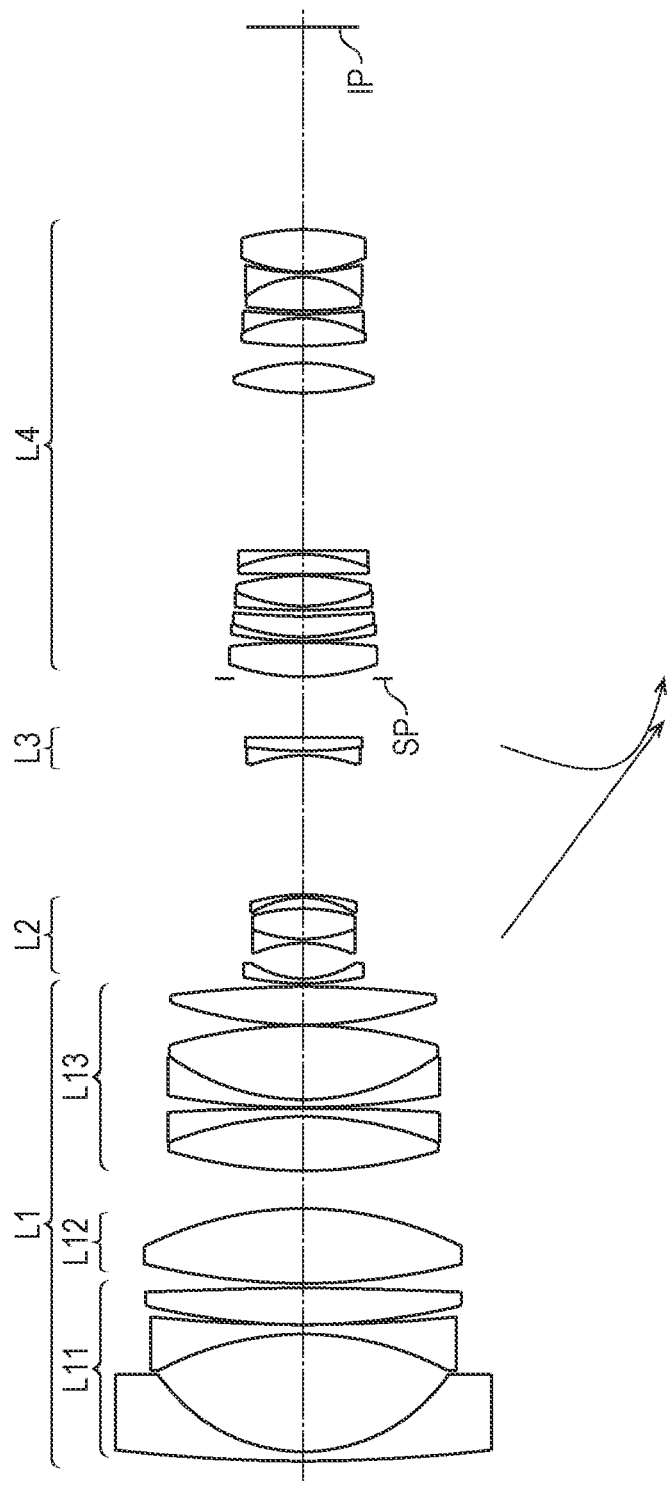
FIG. 9 is a cross-sectional view of the zoom lens according to Embodiment 5 when focused on the object at infinity at the wide angle end.

FIG. 9 is a cross-sectional view of a zoom lens according to Embodiment 5 when focused on an object at infinity at a wide angle end. With reference to FIG. 9, components of the zoom lens according to Embodiment 5 will be described.

The zoom lens according to Embodiment 5 includes, in order from the object side to the image side, a first lens unit L1 having a positive refractive power which does not move for zooming, two or more intermediate lens units (a second lens unit L2 having a negative refractive power and a third lens unit L3 having a negative refractive power) which move during zooming, and a fourth lens unit L4 as a rear lens unit having a positive refractive power which does not move for zooming. In a zoom lens, an interval between adjacent lens units changes for zooming. An aperture stop SP is arranged adjacent to the object side of the fourth lens unit L4 and does not move for zooming.

The first lens unit L1 includes, in order from the object side to the image side, a first lens subunit L11 having a negative refractive power, a second lens subunit L12 having a positive refractive power, and a third lens subunit L13 having a positive refractive power.

The first lens subunit L11 does not move for focusing. The second lens subunit L12 moves toward the image side for focusing on from an infinity object to a close object. The third lens subunit L13 does not move for focusing.

The two or more intermediate lens units that move during zooming include, in order from the object side to the image side, the second lens unit L2 having the negative refractive power and the third lens unit L3 having the negative refractive power. The second lens unit L2 monotonously moves on the optical axis toward the image side for zooming from the wide angle end to the telephoto end. For zooming from the wide angle end to the telephoto end, the third lens unit L3 moves on the optical axis first to the object side then to the image side.

The first lens unit L1 includes first to sixteenth surfaces. The first lens subunit L11 includes first to sixth surfaces, and is composed of two negative lenses and one positive lens. The second lens subunit L12 includes seventh to eighth surfaces, and is composed of one positive lens having an aspherical surface on the image side. The third lens subunit L13 includes ninth surface to sixteenth surfaces, and is composed of three positive lenses and two negative lenses.

The second lens unit L2 and the third lens unit L3, which are the two or more intermediate lenses, includes seventeenth to twenty-sixth surfaces. The second lens unit L2 includes seventeenth to twenty-third surfaces, and is composed of three negative lenses and one positive lens. The third lens unit L3 includes twenty-fourth to twenty-sixth surfaces, and is composed of one negative lens and one positive lens.

An aperture stop SP corresponds to a twenty-seventh surface. The fourth lens unit L4 includes twenty-eighth to forty-eighth surfaces, and is composed of five negative lenses and eight positive lenses.

Figure 10A:
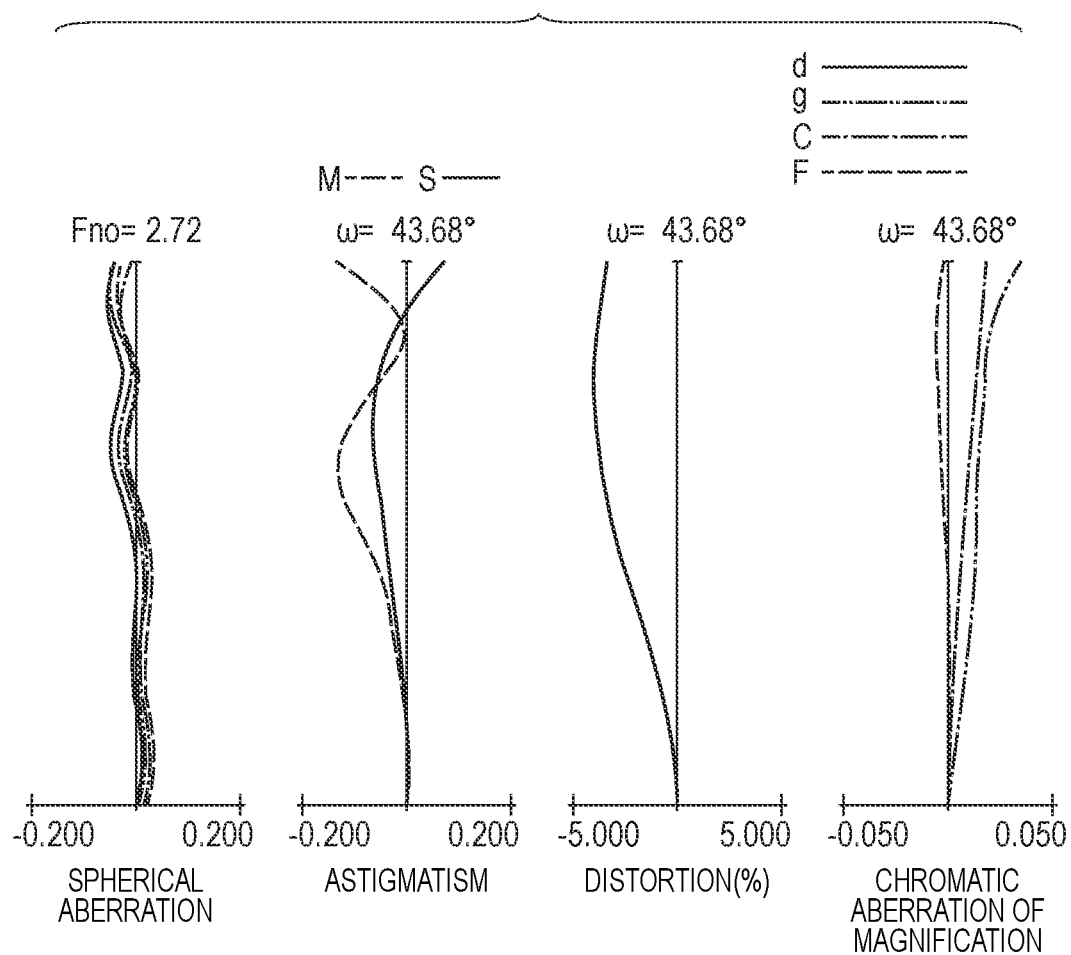
FIG. 10A is a diagram showing aberrations of the zoom lens according to Embodiment 5 when focused on the object at infinity at the wide angle end.
Figure 10B:
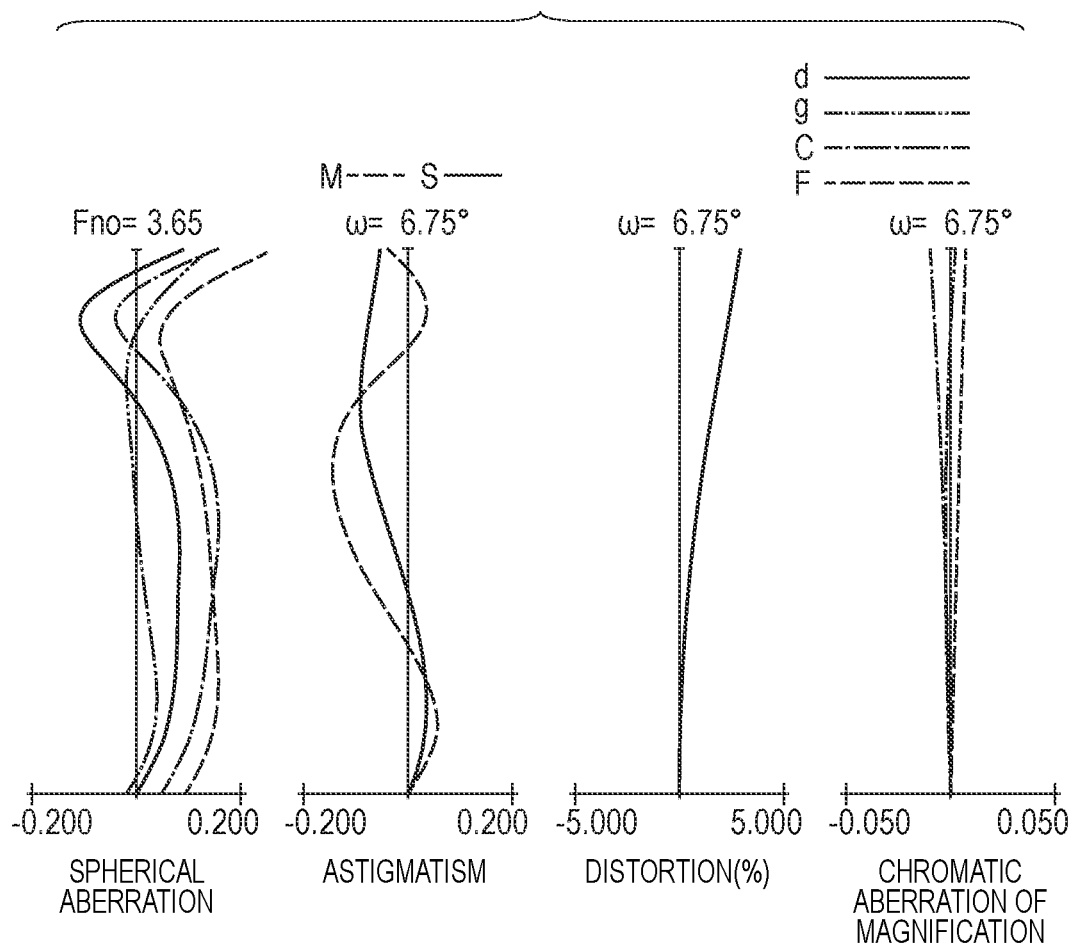
FIG. 10B is a diagram showing aberrations of the zoom lens according to Embodiment 5 when focused on the object at infinity at the telephoto end.

FIGS. 10A and 10B are diagrams showing aberrations at the wide angle end and at the telephoto end, respectively, focusing on an infinity object of the zoom lens according to Embodiment 5 (refer to Numerical Embodiment 5 for respective focal lengths). The legend is similar to that described with reference to FIGS. 2A and 2B.

The values of the inequalities (1) to (19) and the values of the variables included in the inequalities are listed in Table 1. By satisfying the inequality, the zoom lens according to this embodiment can provide a zoom lens beneficial in terms of a wide angle of view, a high zoom ratio, a small size and light weight, and high optical performance.

Embodiment 6

Figure 11:
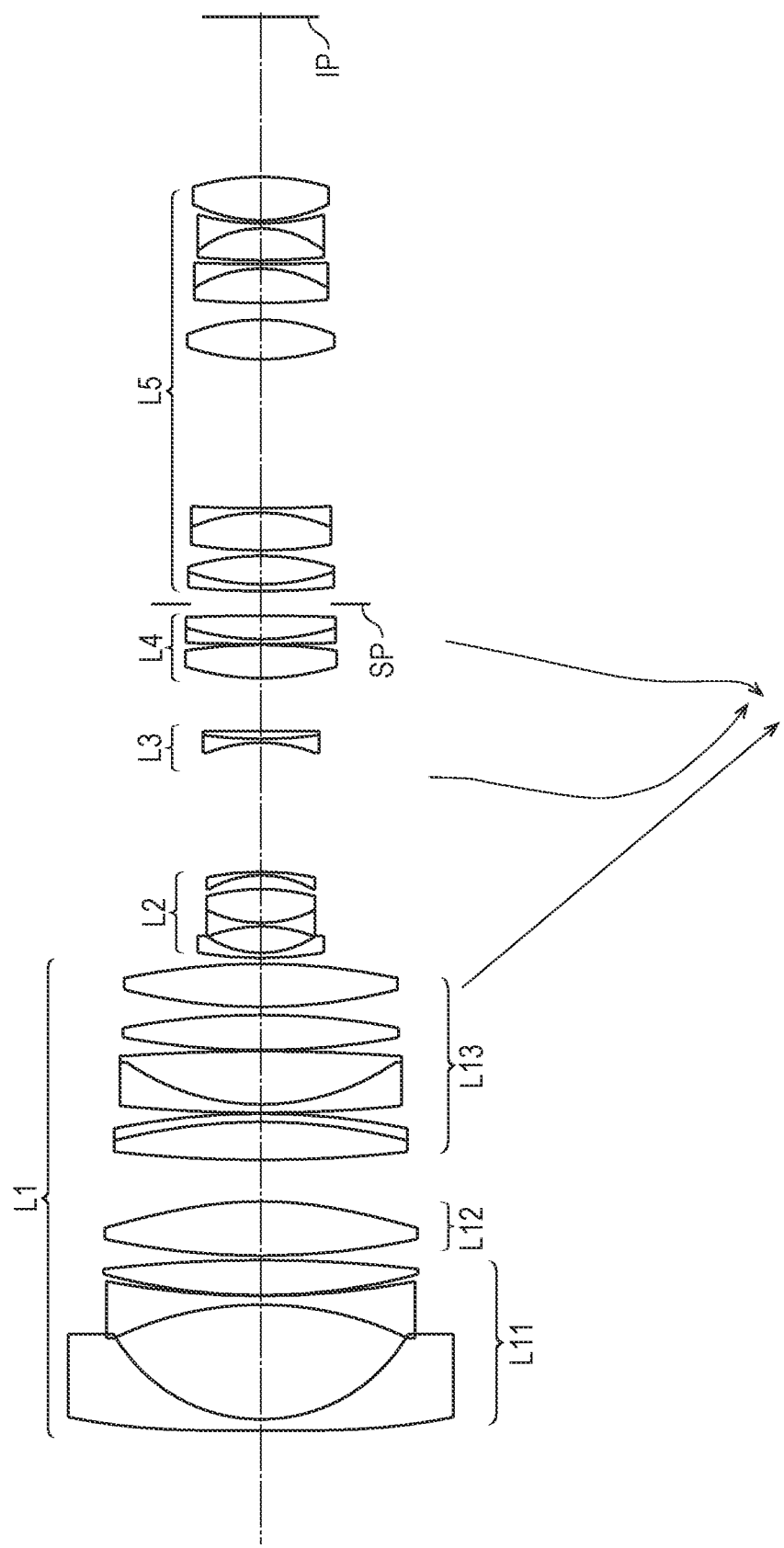
FIG. 11 is a cross-sectional view of the zoom lens according to Embodiment 6 when focused on the object at infinity at the wide angle end.

FIG. 11 is a cross-sectional view of a zoom lens according to Embodiment 6 when focused on an object at infinity at a wide angle end. Components of the zoom lens according to Embodiment 6 will be described with reference to FIG. 11.

The zoom lens according to Embodiment 6 includes, in order from the object side to the image side, a first lens unit L1 having a positive refractive power that does not move for zooming, three or more intermediate lens units (a second lens unit L2 having a negative refractive power, a third lens unit L3 having a negative refractive power, and a fourth lens unit L4 having a positive refractive power) that move during zooming, and a fifth lens unit L5 serving as a rear lens unit having a positive refractive power that does not move for zooming. In the zoom lens, an interval between adjacent lens units changes for zooming. An aperture stop SP is arranged adjacent to the image side of the fourth lens unit L4 and moves integrally with the fourth lens unit L4 during zooming.

The first lens unit L1 includes, in order from the object side to the image side, a first lens subunit L11 having a negative refractive power, a second lens subunit L12 having a positive refractive power, and a third lens subunit L13 having a positive refractive power.

The first lens subunit L11 does not move for focusing. The second lens subunit L12 moves toward the image side for focusing on from an infinity object to a close object. The third lens subunit L13 does not move for focusing.

The three or more intermediate lens units that move during zooming include, in order from the object side to the image side, the second lens unit L2 having the negative refractive power, the third lens unit L3 having the negative refractive power, and the fourth lens unit L4 having the positive refractive power. The second lens unit L2 monotonously moves on the optical axis toward the image side for zooming from the wide angle end to the telephoto end. For zooming from the wide angle end to the telephoto end, the third lens unit L3 moves on the optical axis first to the object side then to the image side. The fourth lens unit L4 moves on the optical axis for zooming from the wide angle end to the telephoto end (for example, non-monotonously as shown in FIG. 11).

The first lens unit L1 includes first to eighteenth surfaces. The first lens subunit L11 includes first to sixth surfaces, and is composed of two negative lenses and one positive lens. The second lens subunit L12 includes seventh to eighth surfaces, and is composed of one positive lens having an aspherical surface on the image side. The third lens subunit L13 includes ninth to eighteenth surfaces, and is composed of four positive lenses and two negative lenses.

The second lens unit, the third lens unit, and the fourth lens unit, which are the three or more intermediate lens units, include nineteenth to thirty-fourth surfaces. The second lens unit L2 includes nineteenth to twenty-fifth surfaces, and is composed of three negative lenses and one positive lens. The third lens unit L3 includes twenty-sixth to twenty-eighth surfaces, and is composed of one negative lens and one positive lens. The fourth lens unit L4 includes twenty-ninth to thirty-third surfaces, and is composed of one negative lens and two positive lenses.

The aperture stop SP corresponds to a thirty-fourth surface. The fifth lens unit L5 includes thirty-fifth to fiftieth surfaces, and is composed of four negative lenses and six positive lenses.

Figure 12B:
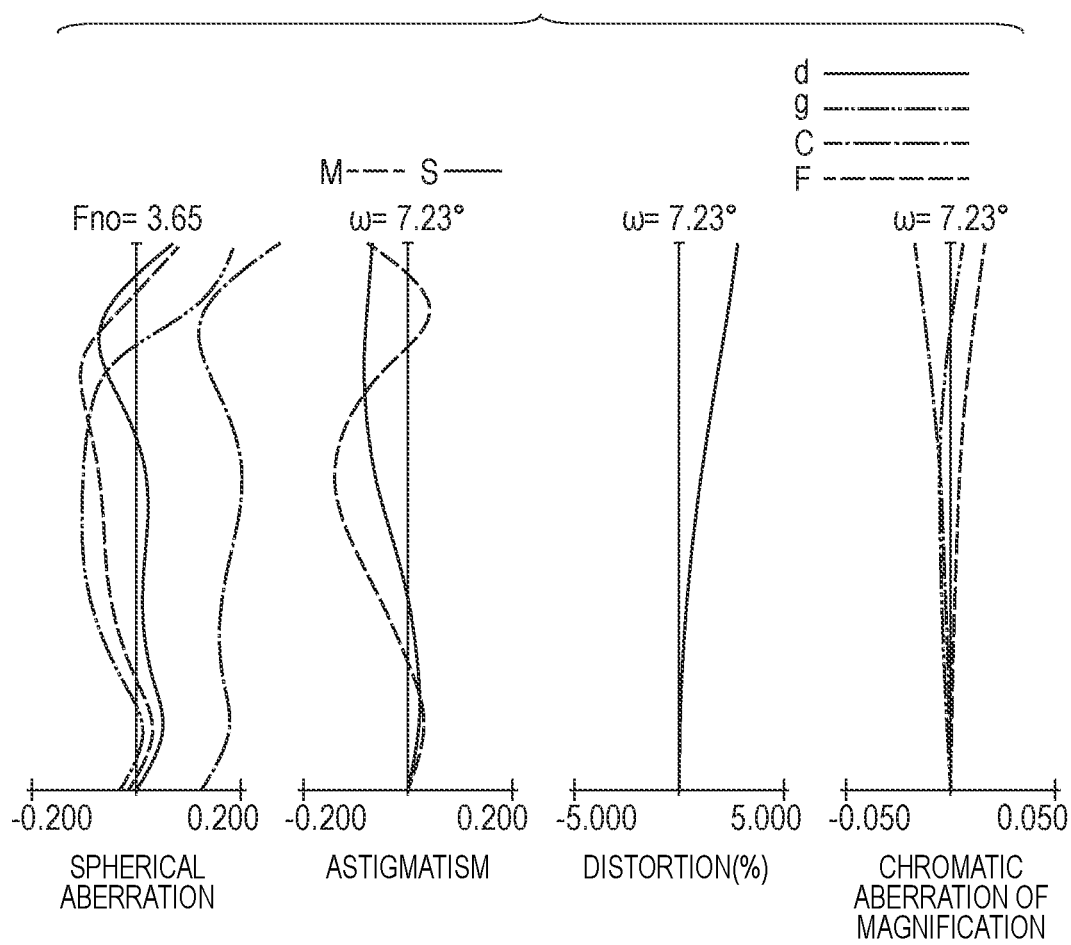
FIG. 12B is a diagram showing aberrations of the zoom lens according to Embodiment 6 when focused on the object at infinity at the telephoto end.

FIGS. 12A and 12B are diagrams showing aberrations at the wide angle end and at the telephoto end, respectively, focusing on an infinity object of the zoom lens according to Embodiment 6 (refer to Numerical Embodiment 6 for respective focal lengths). The legend is similar to that described with reference to FIGS. 2A and 2B.

The values of the inequalities (1) to (19) and the values of the variables included in the inequalities are listed in Table 1. By satisfying the inequality, the zoom lens according to this embodiment can provide a zoom lens beneficial in terms of a wide angle of view, a high zoom ratio, a small size and light weight, and high optical performance.

Embodiment 7

FIG. 13 is a cross-sectional view of a zoom lens according to Embodiment 7 when focused on an object at infinity at a wide angle end. The components of the zoom lens will be described in order from the object side to the image side with reference to FIG. 13.

The zoom lens according to Embodiment 7 includes, in order from the object side to the image side, a first lens unit L1 having a positive refractive power that does not move for zooming, three or more intermediate lens units (a second lens unit L2 having a negative refractive power, a third lens unit L3 having a negative refractive power, and a fourth lens unit L4 having a positive refractive power) that move during zooming, and a fifth lens unit L5 serving as a rear lens unit having a positive refractive power that does not move for zooming. In the zoom lens, an interval between adjacent lens units changes for zooming. An aperture stop SP is arranged between the fourth lens unit L4 and the fifth lens unit L5.

The first lens unit L1 includes, in order from the object side to the image side, a first lens subunit L11 having a negative refractive power, a second lens subunit L12 having a positive refractive power, and a third lens subunit L13 having a positive refractive power.

The first lens subunit L11 does not move for focusing. The second lens subunit L12 moves toward the image side for focusing on from an infinity object to a close object. The third lens subunit L13 does not move for focusing.

The three or more intermediate lens units that move during zooming include, in order from the object side to the image side, the second lens unit L2 having the negative refractive power, the third lens unit L3 having the negative refractive power, and the fourth lens unit L4 having the positive refractive power.

The second lens unit L2 monotonously moves on the optical axis toward the image side for zooming from the wide angle end to the telephoto end. For zooming from the wide angle end to the telephoto end, the third lens unit L3 moves on the optical axis first to the object side then to the image side. The fourth lens unit L4 moves on the optical axis for zooming from the wide angle end to the telephoto end (for example, non-monotonously as shown in FIG. 13).

Reference numeral SP denotes an aperture stop which moves on the optical axis independently of the movement of the lens unit during zooming from the wide angle end to the telephoto end. That is, during zooming, an interval between the aperture stop SP and the fourth lens unit L4 and an interval between the aperture stop SP and the fifth lens unit L5 change.

The first lens unit L1 includes first to eighteenth surfaces. The first lens subunit L11 includes first to sixth surfaces, and is composed of two negative lenses and one positive lens. The second lens subunit L12 includes seventh to eighth surfaces, and is composed of one positive lens having an aspherical surface on the image side. The third lens subunit L13 includes ninth to eighteenth surface, and includes four positive lenses and two negative lenses.

The second lens unit L2, the third lens unit L3, and the fourth lens unit L4, which are the three or more intermediate lens units, include nineteenth to thirty-fourth surfaces. The second lens unit L2 includes nineteenth to twenty-fifth surfaces, and is composed of three negative lenses and one positive lens. The third lens unit L3 includes twenty-sixth to twenty-eighth surfaces, and is composed of one negative lens and one positive lens. The fourth lens unit L4 includes twenty-ninth to thirty-third surfaces, and is composed of one negative lens and two positive lenses.

An aperture stop SP corresponds to the thirty-fourth surface. The fifth lens unit L5 includes thirty-fifth to fiftieth surfaces, and is composed of four negative lenses and six positive lenses.

Figure 14B:
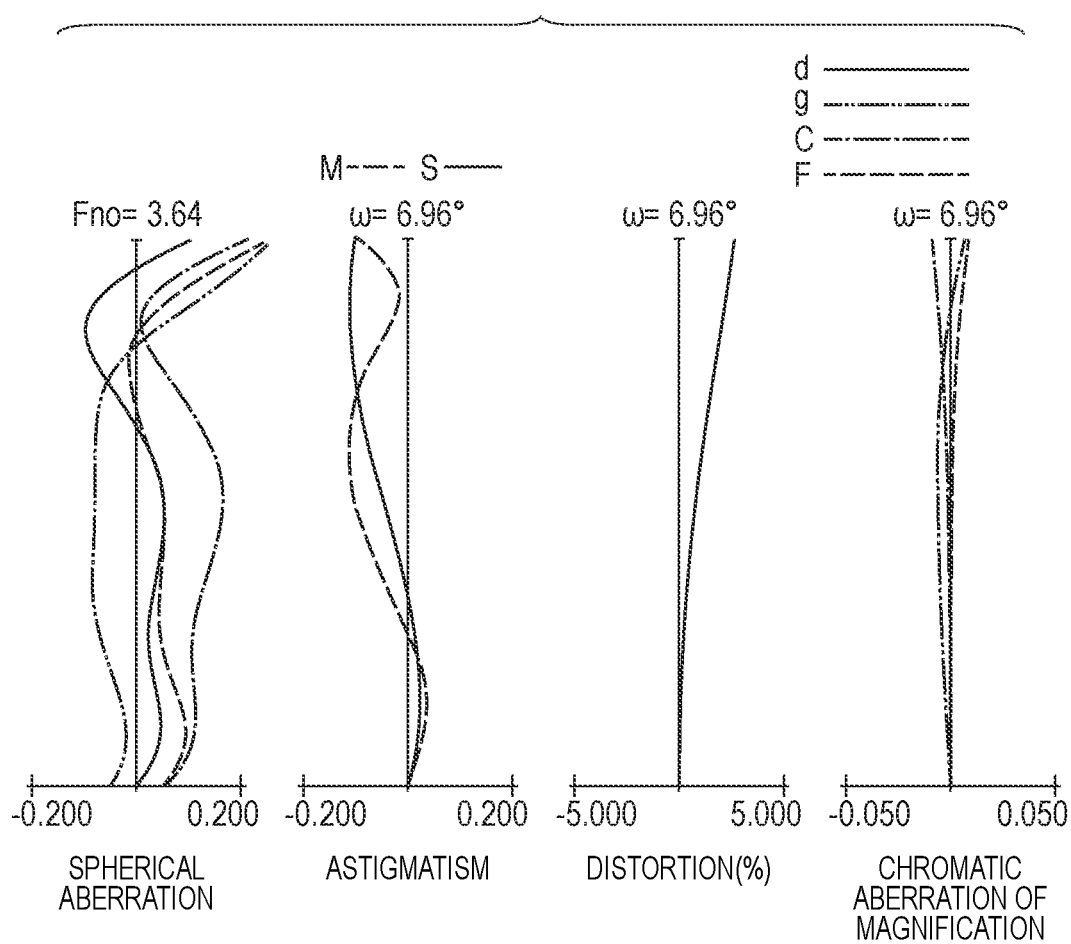
FIG. 14B is a diagram showing aberrations of the zoom lens according to Embodiment 7 when focused on the object at infinity at the telephoto end.

FIGS. 14A and 14B are diagrams showing aberrations at the wide angle end and at the telephoto end, respectively, focusing on an infinity object of the zoom lens according to Embodiment 7 (refer to Numerical Embodiment 7 for respective focal lengths). The legend is similar to that described with reference to FIGS. 2A and 2B.

The values of the inequalities (1) to (19) and the values of the variables included in the inequalities are listed in Table 1. By satisfying the inequality, the zoom lens according to this embodiment can provide a zoom lens beneficial in terms of a wide angle of view, a high zoom ratio, a small size and light weight, and high optical performance.

Embodiment 8

FIG. 15 is a cross-sectional view of a zoom lens according to Embodiment 8 when focused on an object at infinity at a wide angle end. The components of the zoom lens will be described in order from the object side to the image side with reference to FIG. 15.

The zoom lens according to Embodiment 8 includes, in order from the object side to the image side, a first lens unit L1 having a positive refractive power that does not move for zooming, three or more intermediate lens units (a second lens unit L2 having a negative refractive power, a third lens unit L3 having a negative refractive power, a fourth lens unit L4 having a negative refractive power, and a fifth lens unit L5 having a positive refractive power) that move during zooming, and a sixth lens unit L6 serving as a rear lens unit having a positive refractive power that does not move for zooming. In the zoom lens, an interval between adjacent lens units changes for zooming. An aperture stop SP is arranged on the object side of the sixth lens unit L6, and does not move for zooming.

The first lens unit L1 includes, in order from the object side to the image side, a first lens subunit L11 having a negative refractive power, a second lens subunit L12 having a positive refractive power, and a third lens subunit L13 having a positive refractive power.

The first lens subunit L11 does not move for focusing. The second lens subunit L12 moves toward the image side for focusing from an infinity object to a close object. The third lens subunit L13 does not move for focusing.

The three or more intermediate lens units that move during zooming include, in order from the object side to the image side, the second lens unit L2 having the negative refractive power, the third lens unit L3 having the negative refractive power, the fourth lens unit L4 having the negative refractive power, and the fifth lens unit L5 having the positive refractive power.

The second lens unit L2 monotonously moves on the optical axis toward the image side during zooming from the wide angle end to the telephoto end. The third lens unit L3 monotonously moves on the optical axis toward the image side during zooming from the wide angle end to the telephoto end. During zooming from the wide angle end to the telephoto end, the fourth lens unit L4 moves on the optical axis first to the object side then to the image side. The fifth lens unit L5 moves on the optical axis at the time of zooming from the wide angle end to the telephoto end (for example, non-monotone as shown in FIG. 15).

The first lens unit L1 includes first to eighteenth surfaces. The first lens subunit L11 includes first to sixth surfaces, and is composed of two negative lenses and one positive lens. The second lens subunit L12 includes seventh to eighth surfaces, and is composed of one positive lens having an aspherical surface on the image side. The third lens subunit L13 includes ninth to eighteenth surfaces, and is composed of four positive lenses and two negative lenses.

The second lens unit L2, the third lens unit L3, the fourth lens unit L4, and the fifth lens unit L5, which are the three or more intermediate lens units, include nineteenth to thirty-fourth surfaces. The second lens unit L2 includes nineteenth to twenty-third surfaces, and is composed of two negative lenses and one positive lens. The third lens unit L3 includes twenty-fourth to twenty-fifth surfaces, and is composed of one negative lens. The fourth lens unit L4 includes twenty-sixth to twenty-eighth surfaces, and is composed of one negative lens and one positive lens. The fifth lens unit L5 includes twenty-ninth to thirty-third surfaces, and is composed of one negative lens and two positive lenses. An aperture stop SP corresponds to a thirty-fourth surface. The sixth lens unit L6 includes thirty-fifth to fiftieth surfaces, and is composed of four negative lenses and six positive lenses.

Figure 16A:
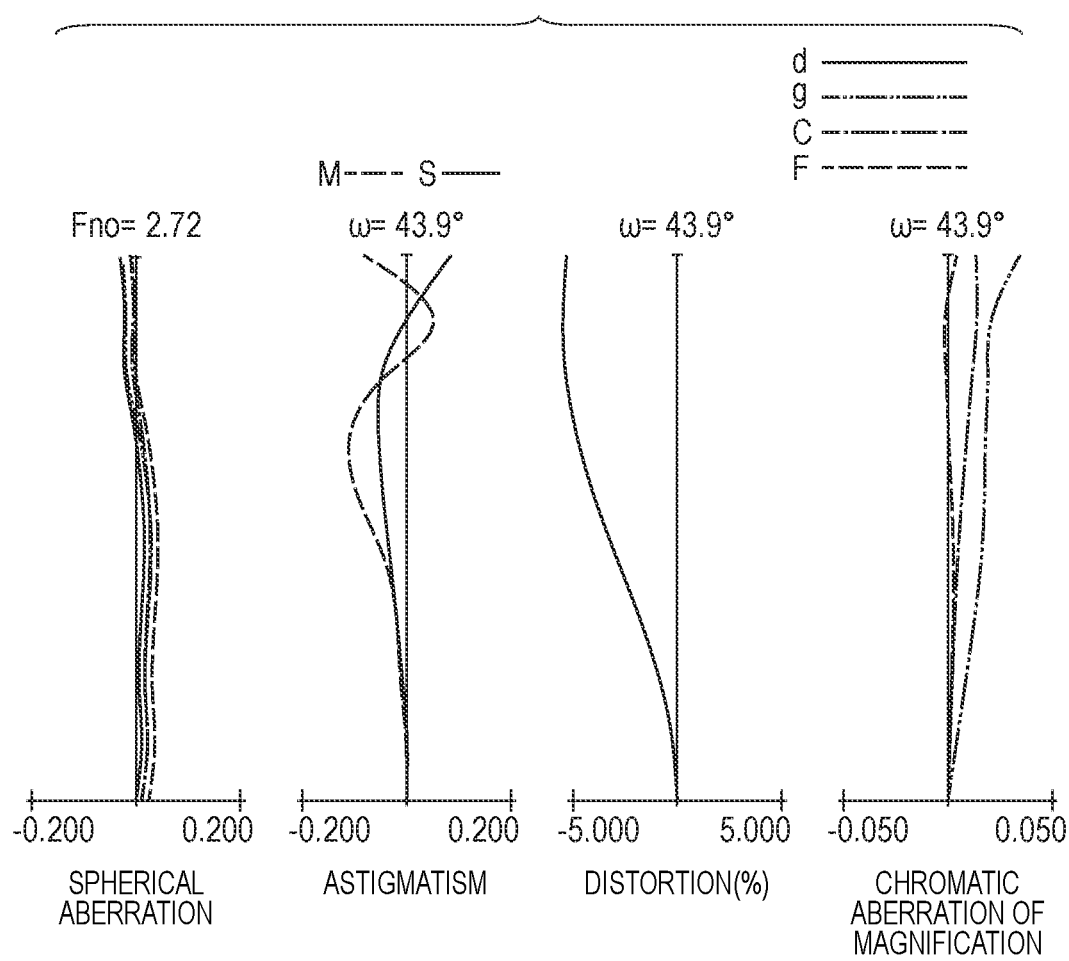
FIG. 16A is a diagram showing aberrations of the zoom lens according to Embodiment 8 when focused on the object at infinity at the wide angle end.
Figure 16B:
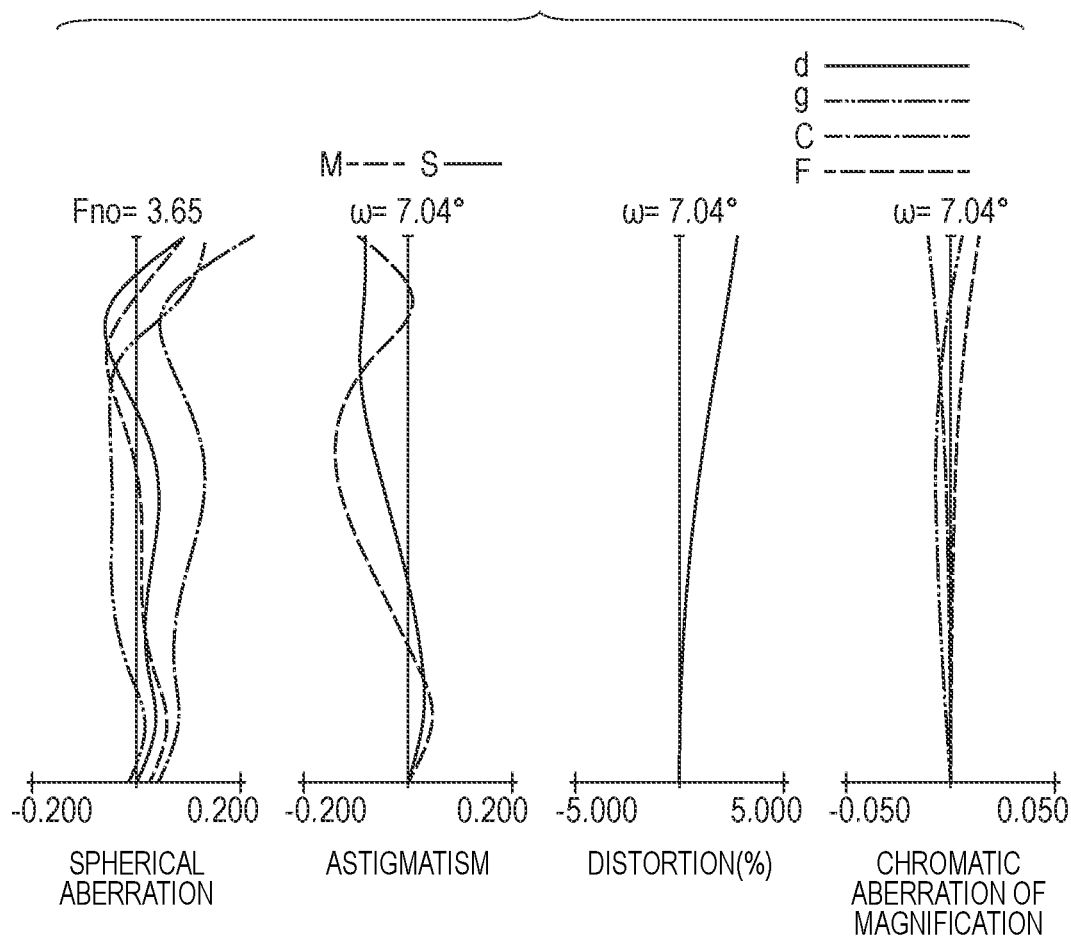
FIG. 16B is a diagram showing aberrations of the zoom lens according to Embodiment 8 when focused on the object at infinity at the telephoto end.

FIGS. 16A and 16B are diagrams showing aberrations at the wide angle end and at the telephoto end, respectively, in which the zoom lens according to Embodiment 8 focuses on an object at infinity. The legend is similar to that described with reference to FIGS. 2A and 2B.

The values of the inequalities (1) to (19) and the values of the variables included in the inequalities are listed in Table 1. By satisfying the inequality, the zoom lens according to this embodiment can provide a zoom lens beneficial in terms of a wide angle of view, a high zoom ratio, a small size and light weight, and high optical performance.

In the first to eighth embodiments, the rear lens unit does not move, but the rear lens unit or a part of the rear lens unit (lens subunit) may move for the purpose of aberration correction, focus adjustment, and the like. Even in this manner, the above-described effects can be obtained, and such modifications are easy for those skilled in the art. For example, in Embodiment 1 (Numerical Embodiment 1), a portion including the forty-first to fiftieth surfaces of the rear lens unit L5 may move. Since a substantially afocal light beam is incident on the forty-first surface from the object side, even if the portion moves, the optical characteristics other than the back focus are substantially invariant. Therefore, the portion can be used as a lens subunit that moves in order to compensate for a change in focus. It should be noted that the factors of the focus change to which the rear lens unit or a lens subunit of the rear lens unit moves to compensate may include, for example, at least one of a manufacturing error of the zoom lens, a temperature change, and a posture change.

Image Pickup Apparatus

Next, referring to FIG. 17, an image pickup apparatus (broadcast camera) using the zoom lens of each embodiment as an image pickup optical system will be described.

Figure 17:
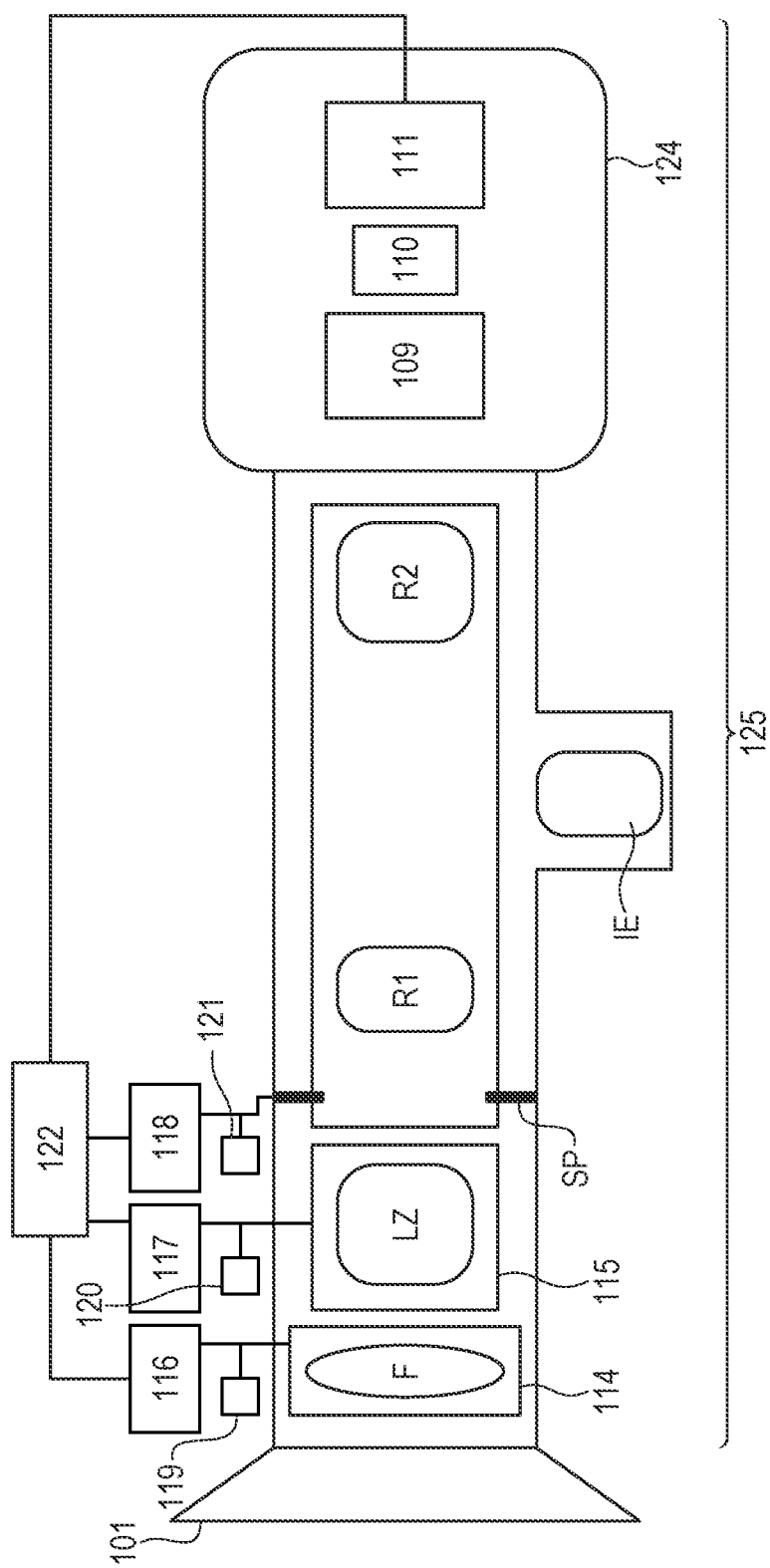
FIG. 17 is a diagram illustrating a configuration example of an image pickup apparatus.

FIG. 17 is a configuration diagram of an image pickup apparatus. In FIG. 17, reference numeral 101 denotes the zoom lens according to any one of Embodiments 1 to 8. Reference numeral 124 denotes a camera body. The zoom lens 101 is attachable to and detachable from the camera body 124. Reference numeral 125 denotes an image pickup apparatus constituted by mounting the zoom lens 101 to the camera body 124. A zoom lens 101 includes a first lens unit F, a zoom unit LZ, and lens units R1 and R2 for image forming. The first lens unit F includes a second lens subunit L12 that moves during focusing, a first lens subunit L11 that does not move for focusing, and a third lens subunit L13.

The zoom unit LZ includes a lens unit that moves during zooming. An aperture stop SP, the lens unit R1, and the lens unit R2 are arranged closer to the image side than the zoom unit LZ. A lens unit IE can be inserted into and extracted from the optical path between the lens unit R1 and the lens unit R2. By inserting the lens unit IE between the lens unit R1 and the lens unit R2, the focal length range of the entire system of the zoom lens 101 is shifted.

Reference numerals 114 and 115 denote drive mechanisms such as helicoids and cams for driving the first lens unit F and the zoom unit LZ in the optical axis direction. Reference numerals 116 to 118 denote motors (drive means) that electrically drive the drive mechanisms 114 and 115 and the aperture stop SP.

Reference numerals 119 to 121 denote detectors such as encoders, potentiometers, and photosensors for detecting the positions of the first lens unit F and the zoom unit LZ on the optical axis and the aperture diameter of the aperture stop SP.

In the camera body 124, reference numeral 109 denotes an optical filter and a glass block corresponding to a color separation optical system in the camera body 124, and reference numeral 110 denotes an image pickup element (photoelectric conversion element) such as a CCD sensor or a CMOS sensor that receives an object image formed by the zoom lens 101. Reference numerals 111 and 122 denote control units such as a CPU for controlling various kinds of driving of the camera body 124 and the zoom lens 101.

Thus, by using the zoom lens of each embodiment, an image pickup apparatus having a high optical performance can be realized.

Although preferred embodiments of the present invention have been described above, the present invention is not limited to these embodiments, and various modifications and changes can be made without departing from the scope of the present invention.

The details of numerical values according to the respective numerical examples are shown below.

In each numerical embodiment, r is a radius of curvature of each surface, d is the distance between the surfaces, nd or Nd is the absolute refractive index at 1 atm with respect to d-line of the Fraunhofer line, and vd is the Abbe number with respect to d-line. The "half angle of view" ω is represented by the expression ω=arctan (Y/fw), where 2Y is a diagonal image size of the camera in which the zoom lens is used, and fw is the focal length of the zoom lens at the wide angle end. The "maximum image height" corresponds to a half, Y (e.g., 14.80 mm), of the diagonal image size 2Y (e.g., 29.60 mm). BF is a back focus (length in air). The last three surfaces are surfaces of a glass block such as a filter. The Abbe number vd is given by:

$$vd=(Nd-1)/(NF-NC)$$

where NF, Nd, and NC represent refractive indices of F-line, d-line, and C-line of the Fraunhofer line, respectively.

The shape of the aspherical surface (deviation amount from the reference spherical surface) is expressed as follows, $$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16} + A3H^3 + A5H^5 + A7H^7 + A9H^9 + A11H^{11} + A13H^{13} + A15H^{15}$$

where an X-axis is the direction of the optical axis, an H-axis is in the direction orthogonal to the direction of the optical axis, and a light traveling direction is positive, R represents a paraxial curvature radius, k represents a conic constant, and A3, A4, A5, A6, A7, A8, A9, A10, A11, A12, A13, A14, A15 and A16 represent aspherical coefficients, respectively. Note that "e-Z" means "×10$^{-Z}$". Further, "*" attached to the right of the surface number indicates that the surface is an aspheric surface.

Numerical Embodiment 1

Unit mm

Surface Data

| Surface number | r | d | nd | vd | θgF |
|---|---|---|---|---|---|
| 1* | 4757.030 | 2.80 | 1.80100 | 35.0 | 0.5864 |
| 2 | 43.063 | 27.48 | | | |
| 3 | −75.597 | 2.20 | 1.63854 | 55.4 | 0.5484 |
| 4 | 239.886 | 0.15 | | | |
| 5 | 157.499 | 7.69 | 1.95906 | 17.5 | 0.6598 |
| 6 | −383.207 | 1.13 | | | |
| 7 | 200.472 | 13.03 | 1.53775 | 74.7 | 0.5392 |
| 8* | −92.576 | 5.51 | | | |
| 9 | 270.694 | 10.71 | 1.48749 | 70.2 | 0.5300 |
| 10 | −95.188 | 2.10 | 1.84666 | 23.8 | 0.6205 |
| 11 | −199.911 | 0.20 | | | |
| 12 | 145.369 | 2.10 | 1.80518 | 25.4 | 0.6161 |
| 13 | 56.865 | 13.53 | 1.43875 | 94.7 | 0.5340 |
| 14 | −1365.080 | 0.20 | | | |
| 15 | 206.147 | 6.00 | 1.43387 | 95.1 | 0.5373 |
| 16 | −334.432 | 0.20 | | | |
| 17 | 186.419 | 8.81 | 1.76385 | 48.5 | 0.5589 |
| 18 | −138.559 | (variable) | | | |
| 19* | 113.971 | 1.25 | 2.00100 | 29.1 | 0.5997 |
| 20 | 24.186 | 6.46 | | | |

-continued

Unit mm

| | | | | | |
|---|---|---|---|---|---|
| 21 | −41.222 | 0.90 | 1.59522 | 67.7 | 0.5442 |
| 22 | 30.642 | 6.03 | 1.85478 | 24.8 | 0.6122 |
| 23 | −62.383 | 3.17 | | | |
| 24 | −25.353 | 0.90 | 1.83481 | 42.7 | 0.5648 |
| 25 | −44.360 | (variable) | | | |
| 26 | −37.021 | 0.90 | 1.60300 | 65.4 | 0.5401 |
| 27 | 98.137 | 2.03 | 1.85478 | 24.8 | 0.6122 |
| 28 | 728.324 | (variable) | | | |
| 29* | 70.998 | 6.13 | 1.90525 | 35.0 | 0.5848 |
| 30 | −103.934 | 0.20 | | | |
| 31 | −315.843 | 1.20 | 1.95375 | 32.3 | 0.5905 |
| 32 | 166.347 | 3.47 | 1.61800 | 63.3 | 0.5441 |
| 33 | −137.368 | (variable) | | | |
| 34(stop) | ∞ | 1.80 | | | |
| 35 | 168.020 | 1.80 | 2.00100 | 29.1 | 0.5997 |
| 36 | 49.624 | 8.61 | 1.49700 | 81.5 | 0.5375 |
| 37 | −58.231 | 0.20 | | | |
| 38 | 88.195 | 6.21 | 1.51633 | 64.1 | 0.5353 |
| 39 | −53.581 | 2.00 | 1.83481 | 42.7 | 0.5648 |
| 40 | 243.630 | 41.99 | | | |
| 41 | 64.451 | 8.16 | 1.43875 | 94.7 | 0.5340 |
| 42 | −49.102 | 4.20 | | | |
| 43 | 255.432 | 7.95 | 1.80810 | 22.8 | 0.6307 |
| 44 | −35.562 | 1.10 | 2.00100 | 29.1 | 0.5997 |
| 45 | −1466.352 | 1.00 | | | |
| 46 | 161.235 | 10.33 | 1.51742 | 52.4 | 0.5564 |
| 47 | −26.752 | 1.20 | 1.89190 | 37.1 | 0.5780 |
| 48 | 51.269 | 0.72 | | | |
| 49 | 37.558 | 10.15 | 1.48749 | 70.2 | 0.5300 |
| 50 | −58.875 | 42.54 | | | |
| Image plane | ∞ | | | | |

Aspherical Surface Data

1st surface

K = −2.00000e+00 A 4 = 9.46087e−07 A 6 = 1.98046e−09 A 8 = 6.52397e−12 A10 = 8.28901e−15 A12 = −1.35643e−19
A14 = −1.86398e−21 A16 = −5.54763e−26
A 3 = −1.81264e−06 A 5 = −2.33898e−08 A 7 = −1.25328e−10
A 9 = −2.69889e−13 A11 = −1.52146e−16 A13 = 8.26328e−20 A15 = 1.72135e−23

8th surface

K = −1.02997e+00 A 4 = 5.48630e−07 A 6 = 2.34979e−10
A 8 = −1.89359e−15 A10 = −6.91188e−16 A12 = −7.25113e−20
A 3 = −3.10939e−07 A 5 = −1.89555e−09 A 7 = −1.00407e−11 A 9 = 1.71125e−14 A11 = 1.12862e−17

19th surface

K = −2.00013e+00 A 4 = 4.92053e−06 A 6 = −5.35701e−08
A 8 = −2.79944e−09 A10 = −1.33097e−11 A12 = −3.74615e−15
A 3 = −1.29064e−06 A 5 = −9.34903e−08 A 7 = 1.78894e−08 A 9 = 2.53904e−10 A11 = 3.63938e−13

29th surface

K = 8.99851e−01 A 4 = −2.76907e−06 A 6 = −1.06240e−07
A 8 = −2.88426e−09 A10 = −1.28512e−11 A12 = 1.83249e−15 A14 = 1.77924e−17 A16 = 3.66574e−21
A 3 = −3.97104e−07 A 5 = 2.76818e−07 A 7 = 2.21858e−08 A 9 = 2.43469e−10 A11 = 3.46270e−13 A13 = −4.90518e−16
A15 = −3.48843e−19

Various Data
Zoom Ratio 7.79

| | Wide angle end | Middle | Telephoto end |
|---|---|---|---|
| Focal length | 15.40 | 45.00 | 120.00 |
| F-number | 2.72 | 2.71 | 3.65 |
| Half angle of view | 43.86 | 18.21 | 7.03 |

-continued

| Unit mm | | | |
|---|---|---|---|
| Image height | 14.80 | 14.80 | 14.80 |
| Total lens length | 347.55 | 347.55 | 347.55 |
| BF | 42.54 | 42.54 | 42.54 |
| d18 | 1.15 | 37.22 | 55.04 |
| d25 | 39.95 | 4.59 | 3.36 |
| d28 | 10.52 | 14.59 | 0.79 |
| d33 | 9.50 | 4.72 | 1.92 |

-continued

| Unit mm | | |
|---|---|---|
| Zoom lens unit data | | |
| Unit | Leading surface | Focal length |
| 1 | 1 | 46.81 |
| 2 | 19 | −24.89 |
| 3 | 26 | −67.11 |
| 4 | 29 | 49.01 |
| 5 | 34 | 96.11 |

Numerical Embodiment 2

| Unit mm | | | | | |
|---|---|---|---|---|---|
| Surface Data | | | | | |
| Surface number | r | d | nd | vd | θgF |
| 1* | −97517.603 | 2.80 | 1.79360 | 37.1 | 0.5828 |
| 2 | 47.565 | 28.34 | | | |
| 3 | −91.172 | 2.20 | 1.64000 | 60.1 | 0.5370 |
| 4 | 231.205 | 0.15 | | | |
| 5 | 159.057 | 8.00 | 1.95906 | 17.5 | 0.6598 |
| 6 | −563.831 | 1.13 | | | |
| 7 | 193.066 | 13.74 | 1.49700 | 81.5 | 0.5375 |
| 8* | −99.305 | 7.09 | | | |
| 9 | 492.040 | 9.42 | 1.48749 | 70.2 | 0.5300 |
| 10 | −138.765 | 2.10 | 1.84666 | 23.8 | 0.6205 |
| 11 | −181.879 | 0.20 | | | |
| 12 | 311.431 | 2.10 | 1.84666 | 23.8 | 0.6205 |
| 13 | 61.101 | 16.86 | 1.49700 | 81.5 | 0.5375 |
| 14 | −674.762 | 0.20 | | | |
| 15 | 179.867 | 8.46 | 1.43875 | 94.7 | 0.5340 |
| 16 | −264.733 | 0.20 | | | |
| 17 | 140.768 | 12.00 | 1.76385 | 48.5 | 0.5589 |
| 18 | −157.528 | (variable) | | | |
| 19* | 149.683 | 1.25 | 2.00100 | 29.1 | 0.5997 |
| 20 | 25.187 | 8.26 | | | |
| 21 | −35.252 | 0.90 | 1.59522 | 67.7 | 0.5442 |
| 22 | 36.531 | 5.98 | 1.85478 | 24.8 | 0.6122 |
| 23 | −47.432 | 2.57 | | | |
| 24 | −26.833 | 0.90 | 1.83481 | 42.7 | 0.5648 |
| 25 | −52.895 | (variable) | | | |
| 26 | −37.409 | 0.90 | 1.60300 | 65.4 | 0.5401 |
| 27 | 84.844 | 2.15 | 1.85478 | 24.8 | 0.6122 |
| 28 | 595.765 | (variable) | | | |
| 29* | 56.893 | 7.06 | 1.90525 | 35.0 | 0.5848 |
| 30 | −126.351 | 0.20 | | | |
| 31 | 268.076 | 1.20 | 1.95375 | 32.3 | 0.5905 |
| 32 | 49.468 | 6.24 | 1.61800 | 63.3 | 0.5441 |
| 33 | 558.749 | (variable) | | | |
| 34(stop) | ∞ | 1.50 | | | |
| 35 | 198.423 | 1.77 | 2.00100 | 29.1 | 0.5997 |
| 36 | 60.471 | 7.34 | 1.49700 | 81.5 | 0.5375 |
| 37 | −60.090 | 0.95 | | | |
| 38 | 98.790 | 11.42 | 1.51633 | 64.1 | 0.5353 |
| 39 | −47.588 | 1.38 | 1.83481 | 42.7 | 0.5648 |
| 40 | 395.221 | 39.57 | | | |
| 41 | 58.875 | 10.70 | 1.43875 | 94.7 | 0.5340 |
| 42 | −48.447 | 4.20 | | | |
| 43 | 162.348 | 9.03 | 1.80810 | 22.8 | 0.6307 |
| 44 | −31.389 | 1.10 | 2.00100 | 29.1 | 0.5997 |
| 45 | 377.292 | 1.00 | | | |
| 46 | 227.074 | 8.02 | 1.51742 | 52.4 | 0.5564 |
| 47 | −24.601 | 1.20 | 1.89190 | 37.1 | 0.5780 |
| 48 | 64.373 | 0.19 | | | |
| 49 | 37.901 | 11.05 | 1.48749 | 70.2 | 0.5300 |
| 50 | −58.875 | 40.00 | | | |
| Image plane | ∞ | | | | |

-continued

| Unit mm |
|---|

| Aspherical Surface Data |
|---|

| 1st surface |
|---|

K = 4.00308e+06 A 4 = 7.13698e−07 A 6 = 2.27291e−09 A 8 = 6.70852e−12 A10 = 8.24557e−15 A12 = −1.34492e−19 A14 = −1.85709e−21 A16 = −5.75372e−26
A 3 = −1.64166e−06 A 5 = −2.79170e−08 A 7 = −1.34591e−10 A 9 = −2.69292e−13 A11 = −1.52847e−16 A13 = 8.28073e−20 A15 = 1.72194e−23

| 8th surface |
|---|

K = 8.02218e−02 A 4 = 7.23021e−07 A 6 = 2.04129e−10 A 8 = −2.81197e−13 A10 = −1.36597e−15 A12 = −1.36816e−19
A 3 = −2.46466e−07 A 5 = −1.41861e−09 A 7 = −7.93646e−12 A 9 = 3.74398e−14 A11 = 2.19377e−17

| 19th surface |
|---|

K = −6.29688e+01 A 4 = 6.50455e−06 A 6 = −4.76913e−08 A 8 = −2.45525e−09 A10 = −1.48055e−11 A12 = −4.95311e−15
A 3 = 3.12266e−07 A 5 = 3.50879e−08 A 7 = 1.35743e−08 A 9 = 2.55951e−10 A11 = 4.36524e−13

| 29th surface |
|---|

K = 3.80324e−02 A 4 = −2.71715e−06 A 6 = −1.13699e−07 A 8 = −2.91756e−09 A10 = −1.28417e−11 A12 = 1.78390e−15 A14 = 1.78561e−17 A16 = 2.71927e−21
A 3 = −4.69498e−07 A 5 = 2.97582e−07 A 7 = 2.30589e−08 A 9 = 2.42840e−10 A11 = 3.51459e−13 A13 = −5.03975e−16 A15 = −3.14802e−19

| Various Data | | |
|---|---|---|
| Zoom Ratio | | 8.63 |

| | Wide angle end | Middle | Telephoto end |
|---|---|---|---|
| Focal length | 15.65 | 46.99 | 135.01 |
| F-number | 2.72 | 2.71 | 3.65 |
| Half angle of view | 43.40 | 17.48 | 6.26 |
| Image height | 14.80 | 14.80 | 14.80 |
| Total lens length | 364.68 | 364.68 | 364.68 |
| BF | 40.00 | 40.00 | 40.00 |
| d18 | 1.40 | 35.29 | 52.03 |
| d25 | 35.74 | 1.30 | 3.63 |
| d28 | 15.18 | 18.87 | 0.80 |
| d33 | 9.36 | 6.21 | 5.20 |

| Zoom lens unit data | | |
|---|---|---|
| Unit | Leading surface | Focal length |
| 1 | 1 | 44.88 |
| 2 | 19 | −24.14 |
| 3 | 26 | −68.52 |
| 4 | 29 | 53.18 |
| 5 | 34 | 95.74 |

Numerical Embodiment 3

| Unit mm | | | | | |
|---|---|---|---|---|---|
| Surface Data | | | | | |
| Surface number | r | d | nd | vd | θgF |
| 1* | 4757.030 | 2.80 | 1.80100 | 35.0 | 0.5864 |
| 2 | 43.063 | 27.48 | | | |
| 3 | −75.597 | 2.20 | 1.63854 | 55.4 | 0.5484 |
| 4 | 279.965 | 0.15 | | | |
| 5 | 163.987 | 7.69 | 1.95906 | 17.5 | 0.6598 |
| 6 | −320.772 | 1.13 | | | |
| 7 | 190.118 | 13.03 | 1.53775 | 74.7 | 0.5392 |
| 8* | −98.840 | 5.51 | | | |
| 9 | 401.642 | 10.71 | 1.48749 | 70.2 | 0.5300 |

-continued

| \multicolumn{6}{c|}{Unit mm} |
|---|---|---|---|---|---|
| 10 | −90.800 | 2.10 | 1.84666 | 23.8 | 0.6205 |
| 11 | −171.934 | 0.20 | | | |
| 12 | 182.750 | 2.10 | 1.80518 | 25.4 | 0.6161 |
| 13 | 57.726 | 13.53 | 1.43875 | 94.7 | 0.5340 |
| 14 | −770.935 | 0.20 | | | |
| 15 | 159.541 | 6.00 | 1.43387 | 95.1 | 0.5373 |
| 16 | −453.397 | 0.20 | | | |
| 17 | 185.323 | 8.81 | 1.76385 | 48.5 | 0.5589 |
| 18 | −132.294 | (variable) | | | |
| 19* | 113.971 | 1.25 | 2.00100 | 29.1 | 0.5997 |
| 20 | 24.186 | 6.46 | | | |
| 21 | −41.222 | 0.90 | 1.59522 | 67.7 | 0.5442 |
| 22 | 30.642 | 6.03 | 1.85478 | 24.8 | 0.6122 |
| 23 | −62.383 | 3.17 | | | |
| 24 | −25.353 | 0.90 | 1.83481 | 42.7 | 0.5648 |
| 25 | −44.360 | (variable) | | | |
| 26 | −38.406 | 0.90 | 1.53775 | 74.7 | 0.5392 |
| 27 | 127.237 | 2.68 | 1.85478 | 24.8 | 0.6122 |
| 28 | 667.742 | (variable) | | | |
| 29* | 66.593 | 6.13 | 1.90525 | 35.0 | 0.5848 |
| 30 | −64.439 | 0.20 | | | |
| 31 | −78.104 | 1.20 | 1.95375 | 32.3 | 0.5905 |
| 32 | 1444.439 | 3.47 | 1.61800 | 63.3 | 0.5441 |
| 33 | −154.076 | 1.00 | | | |
| 34(stop) | ∞ | (variable) | | | |
| 35 | 168.020 | 1.80 | 2.00100 | 29.1 | 0.5997 |
| 36 | 49.624 | 8.61 | 1.49700 | 81.5 | 0.5375 |
| 37 | −58.231 | 0.20 | | | |
| 38 | 88.195 | 6.21 | 1.51633 | 64.1 | 0.5353 |
| 39 | −53.581 | 2.00 | 1.83481 | 42.7 | 0.5648 |
| 40 | 243.630 | 41.99 | | | |
| 41 | 61.033 | 9.38 | 1.43875 | 94.7 | 0.5340 |
| 42 | −50.126 | 4.20 | | | |
| 43 | 255.432 | 7.95 | 1.80810 | 22.8 | 0.6307 |
| 44 | −35.562 | 1.10 | 2.00100 | 29.1 | 0.5997 |
| 45 | −1466.352 | 1.00 | | | |
| 46 | 161.235 | 10.33 | 1.51742 | 52.4 | 0.5564 |
| 47 | −26.752 | 1.20 | 1.89190 | 37.1 | 0.5780 |
| 48 | 51.269 | 0.72 | | | |
| 49 | 37.558 | 10.15 | 1.48749 | 70.2 | 0.5300 |
| 50 | −58.875 | 42.87 | | | |
| Image plane | ∞ | | | | |

| Aspherical Surface Data |
|---|
| 1st surface |

K = −2.00000e+00 A 4 = 9.46087e−07 A 6 = 1.98046e−09 A 8 = 6.52397e−12 A10 = 8.28901e−15 A12 = −1.35643e−19 A14 = −1.86398e−21 A16 = −5.54763e−26
A 3 = −1.81264e−06 A 5 = −2.33898e−08 A 7 = −1.25328e−10 A 9 = −2.69889e−13 A11 = −1.52146e−16 A13 = 8.26328e−20 A15 = 1.72135e−23

| 8th surface |
|---|

K = −1.73472e+00 A 4 = 1.56357e−07 A 6 = −4.81413e−09 A 8 = −4.53396e−12 A10 = 2.15972e−15 A12 = −1.64695e−18 A14 = 1.73307e−21
A 3 = 7.34189e−07 A 5 = 5.71705e−08 A 7 = 2.24211e−10 A 9 = −3.49507e−14 A11 = 4.18420e−17 A13 = −3.72718e−20 A15 = −1.61616e−23

| 19th surface |
|---|

K = −2.00013e+00 A 4 = 4.92053e−06 A 6 = −5.35701e−08 A 8 = −2.79944e−09 A10 = −1.33097e−11 A12 = −3.74615e−15
A 3 = −1.29064e−06 A 5 = −9.34903e−08 A 7 = 1.78894e−08 A 9 = 2.53904e−10 A11 = 3.63938e−13

| 29th surface |
|---|

K = 6.86656e+00 A 4 = −5.52331e−06 A 6 = −7.98772e−08 A 8 = −2.64295e−09 A10 = −1.35601e−11 A12 = 3.38220e−15 A14 = 1.09085e−17 A16 = 3.66574e−21
A 3 = 3.56173e−07 A 5 = 2.12892e−07 A 7 = 1.78300e−08 A 9 = 2.46522e−10 A11 = 3.40292e−13 A13 = −4.30457e−16 A15 = −2.11316e−19

| Unit mm |
| --- |
| Various Data |

| Zoom Ratio | | 7.79 | |
| --- | --- | --- | --- |
| | Wide angle end | Middle | Telephoto end |
| Focal length | 15.40 | 44.77 | 120.00 |
| F-number | 2.72 | 2.71 | 3.65 |
| Half angle of view | 43.86 | 18.29 | 7.03 |
| Image height | 14.80 | 14.80 | 14.80 |
| Total lens length | 350.30 | 350.30 | 350.30 |
| BF | 42.87 | 42.87 | 42.87 |
| d18 | 1.15 | 37.22 | 55.04 |
| d25 | 39.95 | 3.54 | 5.01 |
| d28 | 11.07 | 16.19 | −0.30 |
| d34 | 10.30 | 5.52 | 2.72 |

| Zoom lens unit data | | |
| --- | --- | --- |
| Unit | Leading surface | Focal length |
| 1 | 1 | 46.70 |
| 2 | 19 | −24.89 |
| 3 | 26 | −78.12 |
| 4 | 29 | 53.07 |
| 5 | 35 | 94.48 |

Numerical Embodiment 4

| Unit mm |
| --- |
| Surface Data |

| Surface number | r | d | nd | vd | θgF |
| --- | --- | --- | --- | --- | --- |
| 1* | 4757.030 | 2.80 | 1.80100 | 35.0 | 0.5864 |
| 2 | 43.063 | 27.48 | | | |
| 3 | −75.597 | 2.20 | 1.63854 | 55.4 | 0.5484 |
| 4 | 207.466 | 0.15 | | | |
| 5 | 142.462 | 7.69 | 1.95906 | 17.5 | 0.6598 |
| 6 | −383.425 | 1.13 | | | |
| 7 | 341.901 | 13.03 | 1.53775 | 74.7 | 0.5392 |
| 8* | −82.708 | 5.51 | | | |
| 9 | 838.984 | 10.71 | 1.48749 | 70.2 | 0.5300 |
| 10 | −74.224 | 2.10 | 1.84666 | 23.8 | 0.6205 |
| 11 | −179.753 | 0.20 | | | |
| 12 | 118.820 | 2.10 | 1.80518 | 25.4 | 0.6161 |
| 13 | 58.210 | 13.53 | 1.43875 | 94.7 | 0.5340 |
| 14 | −1777.795 | 0.20 | | | |
| 15 | 522.808 | 6.00 | 1.43387 | 95.1 | 0.5373 |
| 16 | −173.912 | 0.20 | | | |
| 17 | 176.805 | 8.81 | 1.76385 | 48.5 | 0.5589 |
| 18 | −142.630 | (variable) | | | |
| 19* | 113.971 | 1.25 | 2.00100 | 29.1 | 0.5997 |
| 20 | 24.186 | 6.46 | | | |
| 21 | −41.222 | 0.90 | 1.59522 | 67.7 | 0.5442 |
| 22 | 30.642 | 6.03 | 1.85478 | 24.8 | 0.6122 |
| 23 | −62.383 | (variable) | | | |
| 24 | −25.353 | 0.90 | 1.83481 | 42.7 | 0.5648 |
| 25 | −44.360 | (variable) | | | |
| 26 | −38.404 | 0.90 | 1.49700 | 81.6 | 0.5320 |
| 27 | −125.456 | 1.75 | 1.85478 | 24.8 | 0.6122 |
| 28 | −76.241 | 0.505 | | | |
| 29 | −62.839 | 0.60 | 1.51633 | 64.1 | 0.5353 |
| 30 | −294.929 | (variable) | | | |
| 31* | 63.384 | 6.13 | 1.90525 | 35.0 | 0.5848 |
| 32 | −120.998 | 0.20 | | | |
| 33 | 122.127 | 1.20 | 1.95375 | 32.3 | 0.5905 |
| 34 | 55.181 | 3.47 | 1.61800 | 63.3 | 0.5441 |
| 35 | 117.100 | (variable) | | | |
| 36(stop) | ∞ | 1.80 | | | |

-continued

| Unit mm | | | | | |
|---|---|---|---|---|---|
| 37 | 168.020 | 1.80 | 2.00100 | 29.1 | 0.5997 |
| 38 | 49.624 | 8.61 | 1.49700 | 81.5 | 0.5375 |
| 39 | −58.231 | 0.20 | | | |
| 40 | 88.195 | 6.21 | 1.51633 | 64.1 | 0.5353 |
| 41 | −53.581 | 2.00 | 1.83481 | 42.7 | 0.5648 |
| 42 | 243.630 | 41.99 | | | |
| 43 | 64.654 | 12.08 | 1.43875 | 94.7 | 0.5340 |
| 44 | −49.392 | 4.20 | | | |
| 45 | 255.432 | 7.95 | 1.80810 | 22.8 | 0.6307 |
| 46 | −35.562 | 1.10 | 2.00100 | 29.1 | 0.5997 |
| 47 | −1466.352 | 1.00 | | | |
| 48 | 161.235 | 10.33 | 1.51742 | 52.4 | 0.5564 |
| 49 | 26.752 | 1.20 | 1.89190 | 37.1 | 0.5780 |
| 50 | 51.269 | 0.72 | | | |
| 51 | 37.558 | 10.15 | 1.48749 | 70.2 | 0.5300 |
| 52 | −58.875 | 42.76 | | | |
| Image plane | ∞ | | | | |

| Aspherical Surface Data |
|---|
| 1st surface |

K = −2.00000e+00 A 4 = 9.46087e−07 A 6 = 1.98046e−09 A 8 = 6.52397e−12 A10 = 8.28901e−15 A12 = −1.35643e−19 A14 = −1.86398e−21 A16 = −5.54763e−26
A 3 = −1.81264e−06 A 5 = −2.33898e−08 A 7 = −1.25328e−10 A 9 = −2.69889e−13 A11 = −1.52146e−16 A13 = 8.26328e−20 A15 = 1.72135e−23

| 8th surface |
|---|

K = −9.93582e−01 A 4 = 5.18140e−07 A 6 = 2.32819e−09 A 8 = 3.16726e−12 A10 = −3.24978e−15 A12 = 2.63264e−18 A14 = 3.54338e−22
A 3 = −3.53879e−07 A 5 = −2.02687e−08 A 7 = −1.31804e−10 A 9 = 3.30800e−14 A11 = 1.39091e−17 A13 = −6.56226e−20 A15 = 2.92112e−24

| 19th surface |
|---|

K = −2.00013e+00 A 4 = 4.92053e−06 A 6 = −5.35701e−08 A 8 = −2.79944e−09 A10 = −1.33097e−11 A12 = −3.74615e−15
A 3 = −1.29064e−06 A 5 = −9.34903e−08 A 7 = 1.78894e−08 A 9 = 2.53904e−10 A11 = 3.63938e−13

| 31st surface |
|---|

K = −3.33567e+00 A 4 = −4.51545e−06 A 6 = −2.93371e−07 A 8 = −3.45335e−09 A10 = −1.15898e−11 A12 = −4.11734e−16 A14 = 2.51975e−17 A16 = 3.66574e−21
A 3 = 5.10612e−06 A 5 = 1.44917e−06 A 7 = 3.81614e−08 A 9 = 2.31795e−10 A11 = 3.62158e−13 A13 = −5.59857e−16 A15 = −4.87822e−19

| Various Data | | |
|---|---|---|
| Zoom Ratio | | 7.62 |
| | Wide angle end | Middle | Telephoto end |

| | Wide angle end | Middle | Telephoto end |
|---|---|---|---|
| Focal length | 15.40 | 44.39 | 117.40 |
| F-number | 2.72 | 2.71 | 3.65 |
| Half angle of view | 43.86 | 18.44 | 7.19 |
| Image height | 14.80 | 14.80 | 14.80 |
| Total lens length | 357.38 | 357.38 | 357.38 |
| BF | 42.76 | 42.76 | 42.76 |
| d18 | 1.15 | 38.69 | 57.23 |
| d23 | 3.27 | 4.09 | 4.50 |
| d25 | 46.65 | 5.36 | 5.00 |
| d30 | 8.58 | 16.29 | 0.50 |
| d35 | 9.50 | 4.72 | 1.92 |

| Zoom lens unit data | | |
|---|---|---|
| Unit | Leading surface | Focal length |
| 1 | 1 | 47.41 |
| 2 | 19 | −48.32 |
| 3 | 24 | −72.44 |
| 4 | 26 | −91.18 |
| 5 | 31 | 54.03 |
| 6 | 36 | 97.26 |

Numerical Embodiment 5

| | | Unit mm | | | |
|---|---|---|---|---|---|
| | | Surface Data | | | |
| Surface number | r | d | nd | vd | θgF |
| 1* | −92919.747 | 2.80 | 1.79360 | 37.1 | 0.5828 |
| 2 | 46.213 | 31.28 | | | |
| 3 | −80.185 | 2.20 | 1.64000 | 60.1 | 0.5370 |
| 4 | 405.904 | 0.15 | | | |
| 5 | 173.393 | 9.60 | 1.95906 | 17.5 | 0.6598 |
| 6 | −773.241 | 1.13 | | | |
| 7 | 172.093 | 19.91 | 1.49700 | 81.5 | 0.5375 |
| 8* | −78.558 | 10.00 | | | |
| 9 | 123.276 | 14.37 | 1.48749 | 70.2 | 0.5300 |
| 10 | −95.930 | 2.10 | 1.84666 | 23.8 | 0.6205 |
| 11 | −619.664 | 0.20 | | | |
| 12 | 206.684 | 2.10 | 1.83400 | 37.2 | 0.5776 |
| 13 | 60.426 | 19.56 | 1.49700 | 81.5 | 0.5375 |
| 14 | −122.636 | 0.20 | | | |
| 15 | 104.587 | 9.94 | 1.76385 | 48.5 | 0.5589 |
| 16 | −280.164 | (variable) | | | |
| 17* | 92.902 | 1.25 | 2.00100 | 29.1 | 0.5997 |
| 18 | 24.609 | 9.48 | | | |
| 19 | −31.994 | 0.90 | 1.59522 | 67.7 | 0.5442 |
| 20 | 36.193 | 8.16 | 1.85478 | 24.8 | 0.6122 |
| 21 | −48.866 | 2.99 | | | |
| 22 | −24.869 | 0.90 | 1.83481 | 42.7 | 0.5648 |
| 23 | −48.330 | (variable) | | | |
| 24 | −40.414 | 0.90 | 1.60300 | 65.4 | 0.5401 |
| 25 | 110.404 | 3.63 | 1.85478 | 24.8 | 0.6122 |
| 26 | −14128.833 | (variable) | | | |
| 27(stop) | ∞ | 0.50 | | | |
| 28* | 54.485 | 9.23 | 1.90525 | 35.0 | 0.5848 |
| 29 | −154.589 | 0.20 | | | |
| 30 | 100.561 | 1.20 | 1.95375 | 32.3 | 0.5905 |
| 31 | 52.020 | 5.42 | 1.61800 | 63.3 | 0.5441 |
| 32 | 182.937 | 1.50 | | | |
| 33 | 187.161 | 1.20 | 2.00100 | 29.1 | 0.5997 |
| 34 | 43.575 | 8.14 | 1.49700 | 81.5 | 0.5375 |
| 35 | −67.084 | 0.20 | | | |
| 36 | 481.309 | 5.40 | 1.51633 | 64.1 | 0.5353 |
| 37 | −45.307 | 1.10 | 1.83481 | 42.7 | 0.5648 |
| 38 | −493.901 | 41.51 | | | |
| 39 | 64.427 | 8.29 | 1.43875 | 94.7 | 0.5340 |
| 40 | −48.192 | 4.20 | | | |
| 41 | 114.073 | 7.27 | 1.80810 | 22.8 | 0.6307 |
| 42 | −35.273 | 1.10 | 2.00100 | 29.1 | 0.5997 |
| 43 | 143.661 | 1.00 | | | |
| 44 | 108.863 | 8.74 | 1.51742 | 52.4 | 0.5564 |
| 45 | −24.659 | 1.20 | 1.89190 | 37.1 | 0.5780 |
| 46 | 57.755 | 0.20 | | | |
| 47 | 37.405 | 11.11 | 1.48749 | 70.2 | 0.5300 |
| 48 | −58.875 | 42.94 | | | |
| Image plane | ∞ | | | | |

Aspherical Surface Data

1st surface

K = 3.46751e+06 A 4 = 8.62280e−07 A 6 = 2.48788e−09 A 8 = 6.95151e−12 A10 = 8.28791e−15 A12 = −1.43312e−19 A14 = −1.84997e−21 A16 = −5.76677e−26
A 3 = −1.85081e−06 A 5 = −3.36003e−08 A 7 = −1.43335e−10 A 9 = −2.72926e−13 A11 = −1.53480e−16 A13 = 8.29901e−20 A15 = 1.71165e−23

8th surface

K = 6.25317e−02 A 4 = 6.87046e−07 A 6 = 1.43125e−10 A 8 = −5.94175e−13 A10 = −1.43053e−15 A12 = −1.27881e−19
A 3 = −3.17271e−07 A 5 = −2.26600e−09 A 7 = −2.96547e−13 A 9 = 4.40694e−14 A11 = 2.17723e−17

17th surface

K = −2.05119e+01 A 4 = 7.57415e−06 A 6 = −5.34569e−08 A 8 = −2.44195e−09 A10 = −1.54366e−11 A12 = −5.17011e−15
A 3 = −3.02380e−07 A 5 = 1.19870e−07 A 7 = 1.34864e−08 A 9 = 2.61585e−10 A11 = 4.59275e−13

-continued

| Unit mm |
| --- |

| 28th surface |
| --- |

K = −5.48566e−01  A 4 = −2.15123e−06  A 6 = −1.22194e−07  A 8 = −2.95187e−09  A10 = −1.28067e−11  A12 = 1.70021e−15  A14 = 1.75859e−17  A16 = 2.66443e−21
A 3 = −5.74786e−07  A 5 = 3.37741e−07  A 7 = 2.38781e−08  A 9 = 2.43059e−10  A11 = 3.50023e−13  A13 = −4.93893e−16  A15 = −3.12553e−19

| Various Data | | |
| --- | --- | --- |
| Zoom Ratio | | 8.06 |
| | Wide angle end | Middle | Telephoto end |
| Focal length | 15.50 | 45.43 | 125.00 |
| F-number | 2.72 | 2.72 | 3.65 |
| Half angle of view | 43.68 | 18.04 | 6.75 |
| Image height | 14.80 | 14.80 | 14.80 |
| Total lens length | 368.92 | 368.92 | 368.92 |
| BF | 42.94 | 42.94 | 42.94 |
| d16 | 1.15 | 32.05 | 47.32 |
| d23 | 36.78 | 1.30 | 5.41 |
| d26 | 15.60 | 20.18 | 0.80 |

| Zoom lens unit data | | |
| --- | --- | --- |
| Unit | Leading surface | Focal length |
| 1 | 1 | 41.79 |
| 2 | 17 | −23.55 |
| 3 | 24 | −79.63 |
| 4 | 27 | 52.22 |

Numerical Embodiment 6

| Unit mm | | | | | |
| --- | --- | --- | --- | --- | --- |
| Surface Data | | | | | |
| Surface number | r | d | nd | vd | θgF |
| 1* | −89413.671 | 2.80 | 1.79360 | 37.1 | 0.5828 |
| 2 | 43.169 | 29.32 | | | |
| 3 | −85.464 | 2.20 | 1.64000 | 60.1 | 0.5370 |
| 4 | 207.517 | 0.15 | | | |
| 5 | 149.813 | 8.99 | 1.92286 | 18.9 | 0.6495 |
| 6 | −350.031 | 1.13 | | | |
| 7 | 188.369 | 13.87 | 1.49700 | 81.55 | 0.5375 |
| 8* | −94.494 | 10.34 | | | |
| 9 | 328.251 | 9.69 | 1.48749 | 70.2 | 0.5300 |
| 10 | −147.291 | 2.10 | 1.84666 | 23.8 | 0.6205 |
| 11 | −183.332 | 0.20 | | | |
| 12 | 359.780 | 2.10 | 1.84666 | 23.8 | 0.6205 |
| 13 | 59.688 | 13.61 | 1.49700 | 81.5 | 0.5375 |
| 14 | −470.525 | 0.20 | | | |
| 15 | 187.907 | 9.01 | 1.43875 | 94.7 | 0.5340 |
| 16 | −183.294 | 2.00 | | | |
| 17 | 137.951 | 10.99 | 1.76385 | 48.5 | 0.5589 |
| 18 | −164.814 | (variable) | | | |
| 19* | 111.441 | 1.25 | 2.00100 | 29.1 | 0.5997 |
| 20 | 24.326 | 6.93 | | | |
| 21 | −36.958 | 0.90 | 1.59522 | 67.7 | 0.5442 |
| 22 | 30.033 | 8.62 | 1.85478 | 24.8 | 0.6122 |
| 23 | −52.167 | 3.60 | | | |
| 24 | −26.178 | 0.90 | 1.83481 | 42.7 | 0.5648 |
| 25 | −62.620 | (variable) | | | |
| 26 | −37.952 | 0.90 | 1.60300 | 65.4 | 0.5401 |
| 27 | 102.754 | 2.05 | 1.85478 | 24.8 | 0.6122 |
| 28 | 3587.812 | (variable) | | | |
| 29* | 57.540 | 8.76 | 1.90525 | 35.0 | 0.5848 |
| 30 | −123.886 | 0.20 | | | |
| 31 | 717.433 | 1.20 | 1.95375 | 32.3 | 0.5905 |

-continued

| | | Unit mm | | | |
|---|---|---|---|---|---|
| 32 | 62.604 | 5.99 | 1.61800 | 63.3 | 0.5441 |
| 33 | −441.313 | 3.00 | | | |
| 34(stop) | ∞ | (variable) | | | |
| 35 | 165.568 | 1.80 | 2.00100 | 29.1 | 0.5997 |
| 36 | 54.607 | 7.28 | 1.49700 | 81.5 | 0.5375 |
| 37 | −61.491 | 0.90 | | | |
| 38 | 102.223 | 9.26 | 1.51633 | 64.1 | 0.5353 |
| 39 | −44.173 | 1.11 | 1.83481 | 42.7 | 0.5648 |
| 40 | 287.865 | 37.96 | | | |
| 41 | 57.232 | 10.58 | 1.43875 | 94.7 | 0.5340 |
| 42 | −48.113 | 4.16 | | | |
| 43 | 157.256 | 8.88 | 1.80810 | 22.8 | 0.6307 |
| 44 | −30.967 | 1.10 | 2.00100 | 29.1 | 0.5997 |
| 45 | 451.915 | 1.00 | | | |
| 46 | 176.815 | 8.41 | 1.51742 | 52.4 | 0.5564 |
| 47 | −25.166 | 1.20 | 1.89190 | 37.1 | 0.5780 |
| 48 | 58.270 | 0.91 | | | |
| 49 | 37.662 | 11.12 | 1.48749 | 70.2 | 0.5300 |
| 50 | −58.875 | 40.24 | | | |
| Image plane | ∞ | | | | |

| Aspherical Surface Data |
|---|
| 1st surface |

K = 3.46351e+06 A 4 = 8.89298e−07 A 6 = 2.22014e−09 A 8 = 6.64596e−12 A10 = 8.25887e−15 A12 = −1.29611e−19 A14 = −1.86084e−21 A16 = −5.65689e−26
A 3 = −1.04177e−06 A 5 = −2.67053e−08 A 7 = −1.32296e−10 A 9 = −2.69735e−13 A11 = −1.52521e−16 A13 = 8.27153e−20 A15 = 1.72111e−23

| 8th surface |
|---|

K = −4.11347e−01 A 4 = 7.73068e−07 A 6 = 1.98062e−10 A 8 = −3.68208e−13 A10 = −1.32661e−15 A12 = −1.29935e−19
A 3 = 7.84263e−08 A 5 = −1.05783e−09 A 7 = −7.44048e−12 A 9 = 3.86879e−14 A11 = 2.08018e−17

| 19th surface |
|---|

K = −1.63671e+01 A 4 = 5.01302e−06 A 6 = −4.33711e−08 A 8 = −2.43207e−09 A10 = −1.48570e−11 A12 = −4.67044e−15
A 3 = 3.47434e−07 A 5 = 4.42491e−08 A 7 = 1.34016e−08 A 9 = 2.54880e−10 A11 = 4.35183e−13

| 29th surface |
|---|

K = −5.68897e−01 A 4 = −2.11632e−06 A 6 = −1.12321e−07 A 8 = −2.93486e−09 A10 = −1.28336e−11 A12 = 1.89637e−15 A14 = 1.73771e−17 A16 = 2.45582e−21
A 3 = −9.14979e−07 A 5 = 2.56470e−07 A 7 = 2.32919e−08 A 9 = 2.42773e−10 A11 = 3.52411e−13 A13 = −5.09488e−16 A15 = −2.88355e−19

| Various Data | | |
|---|---|---|
| Zoom Ratio | | 7.38 |

| | Wide angle end | Middle | Telephoto end |
|---|---|---|---|
| Focal length | 15.83 | 43.95 | 116.78 |
| F-number | 2.72 | 2.72 | 3.65 |
| Half angle of view | 43.07 | 18.61 | 7.22 |
| Image height | 14.80 | 14.80 | 14.80 |
| Total lens length | 360.75 | 360.75 | 360.75 |
| BF | 40.24 | 40.24 | 40.24 |
| d18 | 1.50 | 29.82 | 43.81 |
| d25 | 32.90 | 4.07 | 3.25 |
| d28 | 13.46 | 16.48 | 0.80 |
| d34 | 4.00 | 1.49 | 4.00 |

| Zoom lens unit data | | |
|---|---|---|
| Unit | Leading surface | Focal length |
| 1 | 1 | 39.01 |
| 2 | 19 | −22.42 |

-continued

| | Unit mm | |
|---|---|---|
| 3 | 26 | −73.20 |
| 4 | 29 | 49.90 |
| 5 | 35 | 99.64 |

Numerical Embodiment 7

| Unit mm |
|---|

| Surface Data | | | | | |
|---|---|---|---|---|---|
| Surface number | r | d | nd | vd | θgF |
| 1* | 802.648 | 2.80 | 1.80100 | 35.0 | 0.5864 |
| 2 | 42.334 | 28.82 | | | |
| 3 | −70.803 | 2.20 | 1.63854 | 55.4 | 0.5484 |
| 4 | 253.576 | 0.15 | | | |
| 5 | 162.711 | 7.81 | 1.95906 | 17.55 | 0.6598 |
| 6 | −378.441 | 1.38 | | | |
| 7 | 193.823 | 15.69 | 1.53775 | 74.7 | 0.5392 |
| 8* | −92.436 | 6.03 | | | |
| 9 | 331.302 | 11.96 | 1.48749 | 70.2 | 0.5300 |
| 10 | −88.518 | 2.10 | 1.84666 | 23.8 | 0.6205 |
| 11 | −167.390 | 0.20 | | | |
| 12 | 129.429 | 2.10 | 1.80518 | 25.4 | 0.6161 |
| 13 | 56.391 | 11.08 | 1.43875 | 94.7 | 0.5340 |
| 14 | 282.158 | 0.20 | | | |
| 15 | 164.743 | 7.14 | 1.43387 | 95.1 | 0.5373 |
| 16 | −264.424 | 0.20 | | | |
| 17 | 216.988 | 8.39 | 1.76385 | 48.5 | 0.5589 |
| 18 | −139.131 | (variable) | | | |
| 19* | 67.940 | 1.25 | 2.00100 | 29.1 | 0.5997 |
| 20 | 23.570 | 7.12 | | | |
| 21 | −41.938 | 0.90 | 1.59522 | 67.7 | 0.5442 |
| 22 | 29.876 | 5.75 | 1.85478 | 24.8 | 0.6122 |
| 23 | −80.323 | 2.45 | | | |
| 24 | −25.598 | 0.90 | 1.83481 | 42.7 | 0.5648 |
| 25 | −44.148 | (variable) | | | |
| 26 | −38.333 | 0.90 | 1.60300 | 65.4 | 0.5401 |
| 27 | 110.410 | 3.01 | 1.85478 | 24.8 | 0.6122 |
| 28 | 1191.968 | (variable) | | | |
| 29* | 72.032 | 5.30 | 1.90525 | 35.0 | 0.5848 |
| 30 | −145.830 | 0.20 | | | |
| 31 | −314.945 | 1.20 | 1.95375 | 32.3 | 0.5905 |
| 32 | 447.811 | 3.56 | 1.61800 | 63.3 | 0.5441 |
| 33 | −111.378 | (variable) | | | |
| 34(stop) | ∞ | (variable) | | | |
| 35 | 167.521 | 1.10 | 2.00100 | 29.1 | 0.5997 |
| 36 | 47.984 | 8.31 | 1.49700 | 81.5 | 0.5375 |
| 37 | −65.103 | 0.57 | | | |
| 38 | 97.838 | 6.56 | 1.51633 | 64.1 | 0.5353 |
| 39 | −51.367 | 1.10 | 1.83481 | 42.7 | 0.5648 |
| 40 | 520.552 | 46.29 | | | |
| 41 | 71.881 | 8.00 | 1.43875 | 94.7 | 0.5340 |
| 42 | −50.471 | 4.20 | | | |
| 43 | 109.502 | 9.45 | 1.80810 | 22.8 | 0.6307 |
| 44 | −37.460 | 1.10 | 2.00100 | 29.1 | 0.5997 |
| 45 | 116.922 | 0.99 | | | |
| 46 | 86.066 | 11.09 | 1.51742 | 52.4 | 0.5564 |
| 47 | −25.435 | 1.20 | 1.89190 | 37.1 | 0.5780 |
| 48 | 52.611 | 1.94 | | | |
| 49 | 39.946 | 8.80 | 1.48749 | 70.2 | 0.5300 |
| 50 | −50.176 | 40.10 | | | |
| Image plane | ∞ | | | | |

-continued

| Unit mm |
|---|

| Aspherical Surface Data |
|---|

| 1st surface |
|---|

K = −1.07693e+03 A 4 = 1.12115e−06 A 6 = 1.91940e−09 A 8 = 6.59131e−12 A10 = 8.27377e−15 A12 = −1.35783e−19 A14 = −1.86448e−21 A16 = −5.53455e−26
A 3 = −1.50134e−06 A 5 = −2.59911e−08 A 7 = −1.25281e−10 A 9 = −2.69925e−13 A11 = −1.52237e−16 A13 = 8.26987e−20 A15 = 1.72102e−23

| 8th surface |
|---|

K = −5.61776e−01 A 4 = 6.01042e−07 A 6 = 4.01879e−10 A 8 = 2.18544e−13 A10 = −8.57671e−16 A12 = −1.01545e−19
A 3 = −2.02504e−07 A 5 = −3.58450e−09 A 7 = −1.86015e−11 A 9 = 1.73697e−14 A11 = 1.51797e−17

| 19th surface |
|---|

K = −2.92314e+00 A 4 = 5.28329e−06 A 6 = −5.13287e−08 A 8 = −2.68675e−09 A10 = −1.33504e−11 A12 = −3.61948e−15
A 3 = −2.04612e−06 A 5 = −8.07752e−08 A 7 = 1.71289e−08 A 9 = 2.48784e−10 A11 = 3.67585e−13

| 29th surface |
|---|

K = 1.85043e+00 A 4 = −2.62570e−06 A 6 = −1.00120e−07 A 8 = −2.83515e−09 A10 = −1.28862e−11 A12 = 1.83187e−15 A14 = 1.77472e−17 A16 = 3.41386e−21
A 3 = 7.03908e−08 A 5 = 2.56255e−07 A 7 = 2.14014e−08 A 9 = 2.42290e−10 A11 = 3.48440e−13 A13 = −4.91305e−16 A15 = −3.42057e−19

| Various Data | | | |
|---|---|---|---|
| Zoom ratio | | 7.47 | |
| | Wide angle end | Middle | Telephoto end |
| Focal length | 15.91 | 45.76 | 118.84 |
| F-number | 2.72 | 2.72 | 3.65 |
| Half angle of view | 42.93 | 17.92 | 7.10 |
| Image height | 14.80 | 14.80 | 14.80 |
| Total lens length | 356.08 | 356.08 | 356.08 |
| d18 | 1.50 | 38.75 | 57.16 |
| d25 | 44.44 | 6.63 | 2.19 |
| d28 | 11.81 | 16.16 | 2.81 |
| d33 | 4.71 | 0.59 | 0.50 |
| d34 | 2.00 | 2.34 | 1.81 |

| Zoom lens unit data | | |
|---|---|---|
| Unit | Leading surface | Focal length |
| 1 | 1 | 48.43 |
| 2 | 19 | −26.49 |
| 3 | 26 | −70.58 |
| 4 | 29 | 49.92 |
|  | 34 | ∞ |
| 5 | 35 | 109.30 |

Numerical Embodiment 8

| Unit mm | | | | | |
|---|---|---|---|---|---|
| Surface Data | | | | | |
| Surface number | r | d | nd | vd | θgF |
| 1* | 31009.925 | 2.80 | 1.80100 | 35.0 | 0.5864 |
| 2 | 43.248 | 28.09 | | | |
| 3 | −75.259 | 2.20 | 1.65160 | 58.5 | 0.5390 |
| 4 | 319.253 | 0.15 | | | |
| 5 | 168.188 | 8.84 | 1.89286 | 20.4 | 0.6393 |
| 6 | −235.321 | 1.13 | | | |
| 7 | 154.953 | 13.15 | 1.53775 | 74.7 | 0.5392 |
| 8* | −104.494 | 6.03 | | | |

-continued

| Unit mm | | | | | |
|---|---|---|---|---|---|
| 9 | 962.112 | 7.69 | 1.43875 | 94.7 | 0.5340 |
| 10 | −112.855 | 2.10 | 1.85478 | 24.8 | 0.6122 |
| 11 | −195.432 | 0.20 | | | |
| 12 | 149.662 | 2.10 | 1.80518 | 25.4 | 0.6161 |
| 13 | 56.047 | 15.24 | 1.43875 | 94.7 | 0.5340 |
| 14 | −595.811 | 0.52 | | | |
| 15 | 189.224 | 6.89 | 1.43387 | 95.1 | 0.5373 |
| 16 | −418.849 | 0.20 | | | |
| 17 | 177.934 | 8.70 | 1.76385 | 48.5 | 0.5589 |
| 18 | −146.341 | (variable) | | | |
| 19* | 118.284 | 1.25 | 2.00100 | 29.1 | 0.5997 |
| 20 | 24.302 | 6.57 | | | |
| 21 | −38.096 | 0.90 | 1.59522 | 67.7 | 0.5442 |
| 22 | 32.271 | 5.94 | 1.85478 | 24.8 | 0.6122 |
| 23 | −59.594 | (variable) | | | |
| 24 | −24.804 | 0.90 | 1.83481 | 42.7 | 0.5648 |
| 25 | −39.952 | (variable) | | | |
| 26 | −36.316 | 0.90 | 1.60300 | 65.4 | 0.5401 |
| 27 | 89.118 | 2.11 | 1.85478 | 24.8 | 0.6122 |
| 28 | 547.801 | (variable) | | | |
| 29* | 68.309 | 6.83 | 1.90525 | 35.0 | 0.5848 |
| 30 | −112.002 | 0.20 | | | |
| 31 | −525.814 | 1.20 | 1.95375 | 32.3 | 0.5905 |
| 32 | 130.251 | 3.66 | 1.61800 | 63.3 | 0.5441 |
| 33 | −160.400 | (variable) | | | |
| 34(stop) | ∞ | 1.80 | | | |
| 35 | 177.658 | 1.80 | 2.00100 | 29.1 | 0.5997 |
| 36 | 51.018 | 11.07 | 1.49700 | 81.5 | 0.5375 |
| 37 | −59.460 | 0.20 | | | |
| 38 | 100.498 | 9.14 | 1.51633 | 64.1 | 0.5353 |
| 39 | −50.019 | 1.10 | 1.83481 | 42.7 | 0.5648 |
| 40 | 674.822 | 41.24 | | | |
| 41 | 64.337 | 8.11 | 1.43875 | 94.7 | 0.5340 |
| 42 | −48.022 | 2.73 | | | |
| 43 | 273.905 | 8.80 | 1.80810 | 22.8 | 0.6307 |
| 44 | −35.243 | 1.10 | 2.00100 | 29.1 | 0.5997 |
| 45 | −1291.761 | 0.71 | | | |
| 46 | 211.047 | 8.98 | 1.51742 | 52.4 | 0.5564 |
| 47 | −26.335 | 1.20 | 1.89190 | 37.1 | 0.5780 |
| 48 | 52.567 | 0.41 | | | |
| 49 | 37.385 | 11.11 | 1.48749 | 70.2 | 0.5300 |
| 50 | −58.875 | 42.99 | | | |
| Image plane | ∞ | | | | |

Aspherical Surface Data

1st surface

K = 3.99787e+05 A 4 = 1.03414e−06 A 6 = 1.93082e−09 A 8 = 6.60034e−12 A10 = 8.26805e−15 A12 = −1.38059e−19 A14 = −1.86068e−21 A16 = −5.61800e−26
A 3 = −1.66838e−06 A 5 = −2.38278e−08 A 7 = −1.27098e−10 A 9 = −2.69268e−13 A11 = −1.52572e−16 A13 = 8.28003e−20 A15 = 1.71920e−23

8th surface

K = −1.20590e+00 A 4 = 6.04613e−07 A 6 = 1.30338e−10 A 8 = −2.17710e−13 A10 = −6.40065e−16 A12 = −5.65209e−20
A 3 = −2.75867e−07 A 5 = −1.66535e−09 A 7 = −4.31108e−12 A 9 = 1.98180e−14 A11 = 9.48792e−18

19th surface

K = 7.21080e+00 A 4 = 4.55833e−06 A 6 = −5.10680e−08 A 8 = −2.79624e−09 A10 = −1.33211e−11 A12 = −3.83738e−15
A 3 = −1.52940e−06 A 5 = −1.24957e−07 A 7 = 1.78561e−08 A 9 = 2.53114e−10 A11 = 3.67957e−13

29th surface

K = −1.76940e−01 A 4 = −2.43116e−06 A 6 = −1.07245e−07 A 8 = −2.89273e−09 A10 = −1.28573e−11 A12 = 1.75278e−15 A14 = 1.80412e−17 A16 = 3.81973e−21
A 3 = −3.61691e−07 A 5 = 2.85560e−07 A 7 = 2.23171e−08 A 9 = 2.43693e−10 A11 = 3.47248e−13 A13 = −4.89533e−16 A15 = −3.61594e−19

-continued

| Unit mm | | | |
|---|---|---|---|
| Various Data | | | |
| Zoom Ratio | | 7.78 | |
| | Wide angle end | Middle | Telephoto end |
| Focal length | 15.40 | 45.00 | 119.76 |
| F-number | 2.72 | 2.71 | 3.65 |
| Half angle of view | 43.86 | 18.21 | 7.04 |
| Image height | 14.80 | 14.80 | 14.80 |
| Total lens length | 353.98 | 353.98 | 353.98 |
| BF | 42.99 | 42.99 | 42.99 |
| d18 | 1.15 | 37.59 | 55.59 |
| d23 | 3.28 | 3.09 | 3.53 |
| d25 | 40.18 | 4.72 | 2.08 |
| d28 | 10.59 | 14.36 | 1.23 |
| d33 | 9.78 | 5.24 | 2.56 |

| Zoom lens unit data | | |
|---|---|---|
| Unit | Leading surface | Focal length |
| 1 | 1 | 46.95 |
| 2 | 19 | −45.90 |
| 3 | 24 | −80.55 |
| 4 | 26 | −65.14 |
| 5 | 29 | 49.31 |
| 6 | 34 | 96.37 |

Table 1 shows results of calculations of the inequalities based on the lens data of the numerical embodiments 1-8 described above.

TABLE 1

| | Condition | Lower limit | Upper limit | Embodiment 1 | 2 | 3 | 4 | 5 | 6 | 7 | 8 |
|---|---|---|---|---|---|---|---|---|---|---|---|
| (1) | (f1 + bok1)/f1 | 1.700 | 2.200 | 1.865 | 1.824 | 1.875 | 1.927 | 1.871 | 1.891 | 1.911 | 1.875 |
| (2) | f1/fw | 1.50 | 4.00 | 3.040 | 2.868 | 3.033 | 3.078 | 2.696 | 2.464 | 3.043 | 3.049 |
| (3) | ft/fw | 7.1 | 10.0 | 7.79 | 8.63 | 7.79 | 7.62 | 8.06 | 7.38 | 7.47 | 7.78 |
| (4) | ft/f1 | 2.10 | 8.00 | 2.563 | 3.008 | 2.569 | 2.476 | 2.991 | 2.994 | 2.454 | 2.551 |
| (5) | fG1/fw | −5.50 | −1.60 | −3.524 | −3.828 | −3.524 | −3.524 | −3.755 | −3.434 | −3.512 | −3.511 |
| (6) | fGp/fw | 5.80 | 20.60 | 7.611 | 8.311 | 7.405 | 7.083 | 9.575 | 7.243 | 7.509 | 7.208 |
| (7) | fG1/f1 | −2.10 | −0.80 | −1.16 | −1.33 | −1.16 | −1.14 | −1.39 | −1.39 | −1.15 | −1.15 |
| (8) | f11/f1 | −1.50 | −0.75 | −0.99 | −1.15 | −1.04 | −0.99 | −1.13 | −1.25 | −0.94 | −1.06 |
| (9) | f12/f1 | 2.00 | 4.40 | 2.56 | 2.99 | 2.63 | 2.64 | 2.67 | 3.30 | 2.45 | 2.52 |
| (10) | f13/f1 | 1.30 | 1.80 | 1.54 | 1.54 | 1.55 | 1.54 | 1.78 | 1.69 | 1.57 | 1.62 |
| (11) | Fnow | 2.00 | 3.50 | 2.720 | 2.720 | 2.720 | 2.720 | 2.720 | 2.720 | 2.720 | 2.720 |
| (12) | nd1n | 1.75 | 2.00 | 1.773 | 1.782 | 1.773 | 1.773 | 1.779 | 1.782 | 1.773 | 1.778 |
| (13) | ν d11p | 17.0 | 25.0 | 17.47 | 17.47 | 17.47 | 17.47 | 17.47 | 18.90 | 17.47 | 20.36 |
| (14) | ν d13n | 20.0 | 50.0 | 23.78 25.42 | 23.78 23.78 | 23.78 25.42 | 23.78 25.42 | 23.78 37.16 | 23.78 23.78 | 23.78 25.42 | 24.80 25.42 |
| (15) | ν d13n − ν d11p | 3.0 | 25.0 | 6.31 7.95 | 6.31 6.31 | 6.31 7.95 | 6.31 7.95 | 6.31 19.69 | 4.88 4.88 | 6.31 7.95 | 4.44 5.06 |
| (16) | LD1/f1 | 1.50 | 3.30 | 2.22 | 2.56 | 2.22 | 2.19 | 3.00 | 3.04 | 2.24 | 2.26 |
| (17) | ωw | 41.20 | 50.00 | 43.862 | 43.401 | 43.862 | 43.862 | 43.676 | 43.071 | 42.926 | 43.861 |
| (18) | ωt | 4.30 | 8.25 | 7.03 | 6.26 | 7.03 | 7.19 | 6.75 | 7.22 | 7.10 | 7.04 |
| (19) | fw/BFw | 0.280 | 0.430 | 0.362 | 0.391 | 0.359 | 0.360 | 0.361 | 0.393 | 0.397 | 0.358 |
| | f1 | | | 46.814 | 44.878 | 46.702 | 47.406 | 41.793 | 39.006 | 48.428 | 46.954 |
| | bok1 | | | 40.5091 | 36.9978 | 40.8422 | 43.9331 | 36.3975 | 34.7412 | 44.1023 | 41.0948 |
| | fw | | | 15.400 | 15.650 | 15.400 | 15.400 | 15.500 | 15.832 | 15.912 | 15.401 |
| | ft | | | 119.999 | 135.007 | 119.999 | 117.400 | 125.000 | 116.779 | 118.840 | 119.764 |
| | fG1 | | | −54.267 | −59.905 | −54.267 | −54.267 | −58.202 | −54.369 | −55.886 | −54.071 |
| | fGp | | | 117.203 | 130.060 | 114.030 | 109.084 | 148.415 | 114.671 | 119.490 | 111.001 |
| | f11 | | | −46.146 | −51.670 | −48.422 | −46.903 | −47.421 | −48.679 | −45.373 | −49.739 |
| | f12 | | | 119.630 | 134.034 | 122.871 | 125.189 | 111.464 | 128.709 | 118.662 | 118.149 |
| | f13 | | | 72.032 | 69.229 | 72.475 | 73.115 | 74.366 | 65.953 | 75.974 | 76.053 |
| | Fno_w | | | 2.72 | 2.72 | 2.72 | 2.72 | 2.72 | 2.72 | 2.72 | 2.72 |
| | ν d11p | | | 17.47 | 17.47 | 17.47 | 17.47 | 17.47 | 18.9 | 17.47 | 20.36 |
| | ν d13n | | | 23.78 25.42 | 23.78 23.78 | 23.78 25.42 | 23.78 25.42 | 23.78 37.16 | 23.78 23.78 | 23.78 25.42 | 24.8 25.42 |

TABLE 1-continued

| Condition | Lower limit | Upper limit | Embodiment | | | | | | | |
|---|---|---|---|---|---|---|---|---|---|---|
| | | | 1 | 2 | 3 | 4 | 5 | 6 | 7 | 8 |
| LD1 | | | 103.832 | 114.981 | 103.832 | 103.832 | 125.539 | 118.699 | 108.266 | 106.027 |
| ω_w | | | 43.862 | 43.401 | 43.862 | 43.862 | 43.676 | 43.071 | 42.926 | 43.861 |
| ω_t | | | 7.031 | 6.256 | 7.031 | 7.185 | 6.752 | 7.223 | 7.099 | 7.045 |
| BFw | | | 42.5358 | 40.0045 | 42.8732 | 42.7593 | 42.9374 | 40.2440 | 40.1022 | 42.9906 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-076139, filed May 2, 2022, which is hereby incorporated by reference herein in its entirety.

What is claimed is:

1. A zoom lens comprising in order from an object side to an image side, a first lens unit having a positive refractive power that does not move for zooming, three or more intermediate lens units that move during zooming, and a rear lens unit having a positive refractive power,
    wherein each interval between adjacent lens units changes during zooming,
    wherein the zoom lens includes an aperture stop in the rear lens unit, in a lens unit arranged adjacent to the rear lens unit, or between the lens unit arranged adjacent to the rear lens unit and the rear lens unit,
    wherein the first lens unit includes in order from the object side to the image side, a first lens subunit having a negative refractive power that does not move for focusing, a second lens subunit having a positive refractive power that moves for focusing, and a third lens subunit having a positive refractive power,
    wherein following inequalities are satisfied, $1.700 \leq (f1+bok1)/f1 \leq 2.200$ $1.50 \leq f1/fw \leq 4.00$ $7.1 \leq ft/fw \leq 10.0$ where f1 represents a focal length of the first lens unit, bok1 represents a length on an optical axis from a surface arranged at a most image-side of the first lens unit to a rear principal point of the first lens unit, fw represents a focal length of the zoom lens at a wide angle end, and ft represents a focal length of the zoom lens at a telephoto end.

2. The zoom lens according to claim 1, wherein the following inequality is satisfied, $2.10 \leq ft/f1 \leq 8.00$.

3. The zoom lens according to claim 1, wherein the first lens unit includes a lens G1 having a negative refractive power arranged closest to the object side, and
    wherein the following inequality is satisfied, $-5.50 \leq fG1/fw \leq -1.60$ where fG1 represents a focal length of the lens G1.

4. The zoom lens according to claim 1, wherein the first lens subunit includes a lens Gp having a focal length represented by fGp that satisfies the following inequality, $5.80 \leq fGp/fw \leq 20.60$.

5. The zoom lens according to claim 1, wherein the first lens unit includes a lens G1 having a negative refractive power arranged closest to the object side having a focal length represented by fG1 that satisfies the following inequality, $-2.10 \leq fG1/f1 \leq -0.80$.

6. The zoom lens according to claim 1, wherein the following inequality is satisfied, $-1.50 \leq f11/f1 \leq -0.75$ where f11 represents a focal length of the first lens subunit.

7. The zoom lens according to claim 1, wherein the following inequality is satisfied, $2.00 \leq f12/f1 \leq 4.40$ where f12 represents a focal length of the second lens subunit.

8. The zoom lens according to claim 1, wherein the following inequality is satisfied, $1.30 \leq f13/f1 \leq 1.80$ where f13 represents a focal length of the third lens subunit.

9. The zoom lens according to claim 1, wherein the following inequality is satisfied, $2.00 \leq Fnow \leq 3.50$ where Fnow represents an F number of the zoom lens at the wide angle end.

10. The zoom lens according to claim 1, wherein the following inequality is satisfied, $1.75 \leq nd1n \leq 2.00$ where nd1n represents an average value of refractive indices with respect to d-line of all negative lenses included in the first lens unit.

11. The zoom lens according to claim 1, wherein the first lens subunit includes a positive lens L11p having an Abbe number with respect to d-line represented by vd11p that satisfies the following inequality, $17.0 \leq vd11p \leq 25.0$.

12. The zoom lens according to claim 1, wherein the third lens subunit includes a negative lens L13n having an Abbe number with respect to d-line represented by vd13n that satisfies the following inequality, $20.0 \leq vd13n \leq 50.0$.

13. The zoom lens according to claim 1, wherein the first lens subunit includes a positive lens L11p and the third lens subunit includes a negative lens L13n, and the following inequality is satisfied, $3.0 \leq vd13n - vd11p \leq 25.0$ where vd11p represents an Abbe number for d-line of the positive lens L11p and vd13n represents an Abbe number for d-line of the negative lens L13n.

14. The zoom lens according to claim 1, wherein the following inequality is satisfied, $$1.50 \le LD1/f1 \le 3.30$$

where LD1 represents a thickness of the first lens unit on the optical axis.

15. The zoom lens according to claim 1, wherein the third lens subunit includes five or less lenses.

16. The zoom lens according to claim 1, wherein the following inequality is satisfied, $$0.280 \le fw/BFw \le 0.430$$

where BFw represents a length on the optical axis from an image side surface of a lens having a finite focal length and arranged closest to the image side in the zoom lens to the image plane.

17. An image pickup apparatus comprising a zoom lens, and
an image pickup element for picking up an image formed by the zoom lens,
wherein the zoom lens comprises in order from an object side to an image side, a first lens unit having a positive refractive power that does not move for zooming, three or more intermediate lens units that move during zooming, and a rear lens unit having a positive refractive power,
wherein each interval between adjacent lens units changes during zooming,
wherein the zoom lens includes an aperture stop in the rear lens unit, in a lens unit arranged adjacent to the rear lens unit, or between the lens unit arranged adjacent to the rear lens unit and the rear lens unit,
wherein the first lens unit includes in order from the object side to the image side, a first lens subunit having a negative refractive power that does not move for focusing, a second lens subunit having a positive refractive power that moves for focusing, and a third lens subunit having a positive refractive power,
wherein following inequalities are satisfied, $$1.700 \le (f1+bok1)/f1 \le 2.200$$

$$1.50 \le f1/fw \le 4.00$$

$$7.1 \le ft/fw \le 10.0$$

where f1 represents a focal length of the first lens unit, bok1 represents a length on an optical axis from a surface arranged at a most image-side of the first lens unit to a rear principal point of the first lens unit, fw represents a focal length of the zoom lens at a wide angle end, and ft represents a focal length of the zoom lens at a telephoto end.

18. The image pickup apparatus according to claim 17, wherein the following inequality is satisfied, $$41.2° \le \omega w \le 50.0°$$

where ωw represents a half angle of view at the wide angle end of the zoom lens, and is represented by the following expression, $$\omega w = \arctan(Y/fw)$$

where 2Y represents a diagonal length of the image pickup element.

19. The image pickup apparatus according to claim 17, wherein the following inequality is satisfied, $$4.30° \le \omega t \le 8.25°$$

where ωt represents a half angle of view at the telephoto end of the zoom lens, and is represented by the following expression, $$\omega t = \arctan(Y/ft)$$

where 2Y represents a diagonal length of the image pickup element.

* * * * *